(12) United States Patent
LaPray et al.

(10) Patent No.: US 10,995,201 B2
(45) Date of Patent: May 4, 2021

(54) ARTICLES FORMED WITH BIODEGRADABLE MATERIALS AND STRENGTH CHARACTERISTICS OF THE SAME

(71) Applicant: BiologiQ, Inc., Idaho Falls, ID (US)

(72) Inventors: Bradford LaPray, Idaho Falls, ID (US); Wenji Quan, Idaho Falls, ID (US); Donald R. Allen, Idaho Falls, ID (US)

(73) Assignee: BiologiQ, Inc., Idaho Falls, ID (US)

( * ) Notice: Subject to any disclaimer, the term of this patent is extended or adjusted under 35 U.S.C. 154(b) by 0 days.

(21) Appl. No.: 15/481,806

(22) Filed: Apr. 7, 2017

(65) Prior Publication Data

US 2017/0210889 A1    Jul. 27, 2017

Related U.S. Application Data

(63) Continuation-in-part of application No. 14/853,725, filed on Sep. 14, 2015, and a continuation-in-part of application No. 14/853,780, filed on Sep. 14, 2015.

(60) Provisional application No. 62/442,432, filed on Jan. 4, 2017, provisional application No. 62/440,399, filed on Dec. 29, 2016, provisional application No. 62/187,231, filed on Jun. 30, 2015.

(51) Int. Cl.
*C08L 3/02* (2006.01)
*C08L 23/08* (2006.01)

(52) U.S. Cl.
CPC ................. *C08L 3/02* (2013.01); *C08L 23/08* (2013.01); *C08L 2207/066* (2013.01)

(58) Field of Classification Search
CPC ....................................................... C08L 23/06
See application file for complete search history.

(56) References Cited

U.S. PATENT DOCUMENTS

| | | |
|---|---|---|
| 3,270,874 A | 9/1966 | Hilton |
| 3,865,603 A | 2/1975 | Szymanski |
| 4,016,117 A | 4/1977 | Griffin |
| 5,026,745 A | 6/1991 | Weil |
| 5,095,054 A | 3/1992 | Lay et al. |
| 5,314,934 A | 5/1994 | Tomka |
| 5,449,708 A | 9/1995 | Schiltz |
| 5,462,983 A | 10/1995 | Bloembergen |
| 5,510,401 A | 4/1996 | Dehennau et al. |
| 5,714,445 A | 2/1998 | Trinh |

(Continued)

FOREIGN PATENT DOCUMENTS

| | | |
|---|---|---|
| CA | 1031088 | 5/1978 |
| CN | 1603361 | 4/2005 |

(Continued)

OTHER PUBLICATIONS

Applicant's Transmittal Letter dated Sep. 26, 2018 (Year: 2018).*

(Continued)

*Primary Examiner* — Arrie L Reuther
(74) *Attorney, Agent, or Firm* — Workman Nydegger

(57) ABSTRACT

Described herein are strength characteristics and biodegradation of articles produced using one or more petrochemical-based polymers and one or more carbohydrate-based polymers. A compatibilizer can optionally be included in the article. In some cases, the article can include a film or bag.

17 Claims, 22 Drawing Sheets

(56) References Cited

U.S. PATENT DOCUMENTS

| | | |
|---|---|---|
| 6,211,325 B1 | 4/2001 | Sun |
| 6,472,497 B2 | 10/2002 | Loercks et al. |
| 6,605,657 B1 | 8/2003 | Favis et al. |
| 6,783,854 B2 | 8/2004 | Bond |
| 6,818,295 B2 | 11/2004 | Bond et al. |
| 6,841,597 B2 | 1/2005 | Bastioli et al. |
| 6,844,380 B2 | 1/2005 | Favis et al. |
| 6,946,506 B2 | 9/2005 | Bond et al. |
| 7,608,649 B2 * | 10/2009 | Sun ................. C08L 3/02 524/47 |
| 7,666,261 B2 | 2/2010 | Bailey et al. |
| 7,740,952 B2 | 6/2010 | Hausmann |
| 7,998,888 B2 | 8/2011 | Shi |
| 8,188,185 B2 | 5/2012 | Wang |
| 8,232,348 B2 | 7/2012 | Changping |
| 8,283,006 B2 | 10/2012 | Wang |
| 8,329,501 B1 | 12/2012 | Robinson et al. |
| 8,329,601 B2 | 12/2012 | Shi |
| 8,466,337 B2 | 6/2013 | Wang |
| 8,802,754 B2 | 8/2014 | Nie |
| 8,807,254 B2 | 8/2014 | Manus |
| 8,889,945 B2 | 11/2014 | Wang |
| 8,927,611 B2 | 1/2015 | Voolapalli et al. |
| 8,927,617 B2 | 1/2015 | Funk |
| 8,969,224 B2 | 3/2015 | Masuda et al. |
| 9,056,968 B2 | 6/2015 | Matsuo et al. |
| 9,273,207 B2 | 3/2016 | Bastioli |
| 9,327,438 B2 | 5/2016 | Wang |
| 9,464,188 B2 | 10/2016 | Wang |
| 9,884,471 B2 | 2/2018 | Neuman et al. |
| 10,131,783 B2 | 11/2018 | Schmidt et al. |
| 10,214,634 B2 | 2/2019 | Lapray et al. |
| 10,239,292 B2 | 3/2019 | Nissenbaum et al. |
| 10,752,759 B2 | 8/2020 | Lapray et al. |
| 2002/0006989 A1 | 1/2002 | Bastioli |
| 2002/0168517 A1 | 11/2002 | Husemann et al. |
| 2002/0168518 A1 | 11/2002 | Bond et al. |
| 2002/0188041 A1 | 12/2002 | Bond et al. |
| 2003/0077444 A1 | 4/2003 | Bond et al. |
| 2003/0166779 A1 | 9/2003 | Khemani |
| 2008/0103232 A1 | 5/2008 | Lake |
| 2008/0287592 A1 * | 11/2008 | Favis ................. C08J 3/005 524/500 |
| 2009/0048368 A1 | 2/2009 | Bash |
| 2010/0159777 A1 | 6/2010 | Wang |
| 2010/0311874 A1 * | 12/2010 | Mentink ........... C08G 18/3206 524/48 |
| 2011/0287929 A1 | 11/2011 | Smith |
| 2012/0059097 A1 | 3/2012 | Liao |
| 2012/0139154 A1 | 6/2012 | Huneault |
| 2012/0283364 A1 | 11/2012 | Sarazin et al. |
| 2012/0316257 A1 | 12/2012 | Bastioli |
| 2013/0001289 A1 | 1/2013 | Tedford |
| 2013/0157031 A1 * | 6/2013 | Wang ................. B29C 47/8805 428/220 |
| 2013/0157032 A1 | 6/2013 | Wang |
| 2014/0011921 A1 * | 1/2014 | Bash ................. C08L 3/02 524/52 |
| 2014/0079935 A1 | 3/2014 | Broyles |
| 2014/0272370 A1 | 9/2014 | Broyles |
| 2016/0107426 A1 | 4/2016 | Leufgens |
| 2017/0002184 A1 | 1/2017 | Lapray et al. |
| 2017/0002185 A1 | 1/2017 | Lapray et al. |
| 2017/0218184 A1 | 8/2017 | Lapray et al. |
| 2017/0283597 A1 | 10/2017 | LaPray |
| 2017/0362418 A1 | 12/2017 | Lapray et al. |
| 2018/0100060 A1 | 4/2018 | LaPray |
| 2019/0194426 A1 | 6/2019 | Lapray et al. |
| 2019/0256681 A1 | 8/2019 | Lapray et al. |
| 2019/0276664 A1 | 9/2019 | LaPray |
| 2019/0315942 A1 | 10/2019 | LaPray |
| 2019/0315947 A1 | 10/2019 | LaPray |
| 2020/0339781 A1 | 10/2020 | Lapray et al. |
| 2020/0339784 A1 | 10/2020 | Lapray et al. |
| 2020/0339803 A1 | 10/2020 | Allen et al. |
| 2020/0377705 A1 | 12/2020 | LaPray et al. |

FOREIGN PATENT DOCUMENTS

| | | |
|---|---|---|
| CN | 101589097 | 11/2009 |
| CN | 102153786 A | 8/2011 |
| CN | 102329436 A | 1/2012 |
| CN | 101805499 B | 5/2012 |
| CN | 102850626 | 1/2013 |
| CN | 103289165 | 9/2013 |
| CN | 103819794 A | 5/2014 |
| CN | 103987504 | 8/2014 |
| CN | 103998195 | 8/2014 |
| CN | 105966014 | 9/2016 |
| CN | 103627153 B | 2/2018 |
| CN | 107793619 A | 3/2018 |
| CN | 105670239 B | 6/2018 |
| CN | 108276744 | 7/2018 |
| EP | 326517 | 7/1994 |
| EP | 1930487 A1 | 6/2008 |
| EP | 2762307 | 8/2014 |
| GB | 2272699 | 5/1994 |
| JP | S49055740 | 5/1974 |
| JP | S50086543 | 7/1975 |
| JP | H07126449 | 5/1995 |
| JP | H07258488 | 10/1995 |
| JP | H09041224 | 2/1997 |
| JP | 10-259083 A | 9/1998 |
| JP | H11322962 | 11/1999 |
| JP | 2003518541 | 6/2003 |
| JP | 3539955 | 7/2004 |
| JP | 2005089718 | 4/2005 |
| JP | 2005264111 | 9/2005 |
| JP | 2010150305 | 7/2010 |
| JP | 2010260923 | 11/2010 |
| JP | 2011042032 | 3/2011 |
| JP | 2011511121 | 4/2011 |
| JP | 2011213836 | 10/2011 |
| JP | 2012148507 | 8/2012 |
| JP | 5544303 | 7/2014 |
| JP | 2018502744 | 2/2018 |
| JP | 2018525467 | 9/2018 |
| TW | 201538529 | 10/2015 |
| WO | 0148078 | 7/2001 |
| WO | 2003014164 | 11/2004 |
| WO | 2006116861 | 11/2006 |
| WO | 2007/027163 A2 | 3/2007 |
| WO | 2009073197 | 6/2009 |
| WO | 2009103052 | 8/2009 |
| WO | 2011020170 | 2/2011 |
| WO | 2012088585 | 7/2012 |
| WO | 2013116945 | 8/2013 |
| WO | 2014089321 | 6/2014 |
| WO | 2014190395 | 12/2014 |
| WO | WO-2014190935 A1 * | 12/2014 ............ A61K 36/02 |
| WO | 2015028943 | 3/2015 |
| WO | 2016109196 | 7/2016 |
| WO | 2016/134994 A1 | 9/2016 |
| WO | 2018/125897 A1 | 7/2018 |
| WO | 2018187784 | 10/2018 |

OTHER PUBLICATIONS

Tokiwa, et al., "Biodegradability of Plastics" in the International Journal of Molecular Sciences, Aug. 26, 2009, vol. 10, pp. 3722-3742.

Ibbrucker, Constance "Can Additives make plastics biodegradable?" Bioplastics Magazine Jan. 2017, 1 page.

Ibbrucker, Constance "Oxo-degradable plastics increasingly under fire in Europe" European Bioplastics, http://www.european-bioplastics.org/oxo-degradable-plastics-increasingly-under-fire-in-europe/ Feb. 28, 2017, 5 pages.

"'Oxo-Biodegradable' Plastics and Other Plastics with Additives for Degradation" European Bioplastics BackGround Oct. 2015, 5 pages.

"BPI Position on Degradable Additives" Feb. 2010, 6 pages.

(56) References Cited

OTHER PUBLICATIONS

"The SPC Position Against Biodegradability Additives for Petroleum-Based Plastics" Sustainable Packaging Coalition, http://www.sustainablepackaging.org/content/?type=5&id=position-against-biodegradability-additives-for-petroleum-based-plastics Retreived on Sep. 19, 2017, 5 pages.

"APR Position Statement—Degradable Additives Use in Bottles, Forms and Films" The Association of Postconsumer Plastic Recyclers, http://plasticsrecycling.org/about/position-statements, Apr. 27, 2015, 1 page.

U.S. Appl. No. 15/691,588, filed Aug. 30, 2017, LaPray.

Ojeda, Telmo, et al., "Polymer Degradation and Stability" Available as early as Dec. 16, 2010 at www.elsevier.com/locat/polydegstab, 5 pages.

Thakore, I.M., et al., "Studies on Biodegradability, morphology and thermo-mechanical properties of LDPE/modified starch blends" published in *The European Polymer Journal*, vol. 37 2001, pp. 151-160.

Vargha, et al., "Behavior of Polyethylene Films in Soil" published in *Periodica Polytechnica Chemical Engineering*, Nov. 5, 2015 pp. 60-68.

Li, Gang, et al., "Biodegradation of Thermoplastic Starch and its Blends with Poly(lactic acid) and Polyethylene: Influence of Morphology" published in *Macromolecular Journals of Chemistry and Physics*, 2011 pp. 1147-1154.

"Compostable Plastics 101: An Overview of Compostable Plastics Sponsored by the California Organics Recycling Council" based on information and belief, available at least as early as 2012, 23 pages.

Yoshida, et al., "A Bacterium that Degrades and Assimilates Poly(ehylene terphthalate)" Sciense Magazine vol. 351 Issue 6278 Mar. 11, 2016 pp. 1196-1199.

"Discover Polysaccharides" Available at http://polysac3db.cermav.cnrs.fr/discover_starch.html; Accessed Feb. 16, 2017, 10 pages.

Office Action for U.S. Appl. No. 14/853,780 dated Nov. 6, 2017.

Final Office Action for U.S. Appl. No. 14/853,725 dated Nov. 8, 2017.

International Search Report and Written Opinion for PCT PCT/US2017/068492 dated Mar. 16, 2018, 14 pages.

U.S. Appl. No. 15/481,823, filed Apr. 7, 2017, LaPray.

U.S. Appl. No. 15/628,379, filed Jun. 20, 2017, LaPray.

PCT Search Report dated Sep. 14, 2016 for PCT/US2016/040092, 1 page.

PCT Search Report dated Sep. 15, 2016 for PCT/US2016/040104, 1 page.

Kalambur, et al., "An Overview of Starch-Based Plastic Blends from Reactive Extrusion" Journal of Plastic Film and Sheeting, 2006, vol. 22, pp. 39-58.

Wootthikanokkhan, et al., "Effect of Blending Conditions on Mechanical, Thermal, and Rheological Properties of Plasticized Poly(lactic acid)/Maleated Thermoplastic Starch Blends," Journal of Applied Polymer Science, 2012, vol. 124, pp. 1012-1019.

Tang, et al., "Recent Advances in Starch, Polyvinyl Alcohol Based Polymer Blends, Nanocomposites and their Biodegradability" Carbohydrate Polymers, 2011, vol. 85, pp. 7-16.

Turley "Coca-Cola Collaborates on Bio-PET Project" ChemistryWorld, Jun. 11, 2012, accessed Apr. 6, 2017 at https://www.chemistryworld.com/news/coca-cola-collaborates-on-bio-pet-project/5091.article, 2 pages.

Braskem "Life Cycle Assessment of Green Plastic" Available as early as Mar. 28, 2017, accessed at http://www.braskem.com_site.aspx_plastic-green, 18 pages.

De Guzman "Coca-Cola produces 100% Bio-Based PET Bottle" Green Chemicals Blog, Jun. 9, 2015, 3 pages, accessed on Mar. 28, 2017 at https://greenchemicalsblog.com/2015/06/09/coca-cola-produces-100-bio-based-pet-bottle/ 3 pages.

U.S. Appl. No. 14/853,780, dated Oct. 12, 2016, Office Action.

U.S. Appl. No. 14/853,725, dated Apr. 28, 2017, Office Action.

Arevalo-Nino et al., "Starch-based extruded plastic films and evaluation of their biodegradable properties" Biodegradation 7: 231-237, 1996.

Chen et al. "Environmental Degradation of Starch/Poly (Lactic Acid) Composite in Seawater" Apr. 6, 2010.

"Environmentally Degradable Plastics" Leonardo Da Vinci Program; Jan. 2000-Dec. 2006.

Esmaeili, Atefeh, et al. "Biodegradation of Low-Density Polyethylene (LDPE) by Mixed Culture of Lysinibacillus xylanilyticus and Aspergillus niger in Soil." *PLoS ONE* 8(9): e71720, Sep. 23, 2013. https://doi.org/10.1371/journal.pone.0071720. Accessed Apr. 16, 2018.

Gupta, Apeksha et al. "Visible Range Photocatalysts for Phase Photocatalytic Degradation of Polyethylene and Polyvinyl Chloride" *Journal of the Chilean Chemical Society*, [S.I.], v. 62, n. 1, Jun. 2017. ISSN 0717-9707. <https://jcchems.com/index.php/JCCHEMS/article/view/156>. Accessed: Apr. 20, 2018.

Luo, Ying, et al. "Accelerating the degradation of polyethylene composite mulches." Plastics Research Online, May 19, 2017. Society of Plastics Engineers (SPE), DOI: 10.2417/spepro.006909. Accessed Apr. 20, 2018.

Oluz, Zehra and Teoman Tinçer. "Additives for ultraviolet-induced oxidative degradation of low-density polyethylene." *J. Appl. Polym. Sci.*, 133, 43354, Jan. 18, 2016. Wiley Online Library, DOI: 10.1002/app.43354. Accessed Apr. 21, 2018.

Shang, Jing, et al. "Photocatalytic Degradation of Polystyrene Plastic under Fluorescent Light." *Environmental Science & Technology*, Sep. 5, 2003, 37 (19), pp. 4494-4499. American Chemical Society, DOI: 10.1021/es0209464. Accessed Apr. 20, 2018.

Shogren et al. "Biodegradation of starch/polylactic acid/poly(hydroxyester-ether) composite bars in soil" Polymer Degradation and Stability 79 (2003) 405-411.

Sumathi, Tirupati et al. "Production of Laccase by *Cochliobolus* sp. Isolated from Plastic Dumped Soils and Their Ability to Degrade Low Molecular Weight PVC." *Biochemistry Research International* 2016 (2016): 9519527. PMC. Web. Apr. 16, 2018.

Thryft, Ann R. "Biodegradable Plastics Standard to Bust Landfill Waste." ENSO Plastics, Nov. 15, 2011. http://ensoplastics.com/theblog/?p=535. Accessed Apr. 23, 2018.

"Transition Metal Salts." Oxo-biodegradable Plastics Association, http://www.biodeg.org/index.html. Accessed Apr. 20, 2018.

Zhang, et al. "Retrogradation and Antiplasticization of Thermoplastic Starch" Mar. 2012.

U.S. Appl. No. 15/691,588, dated Apr. 30, 2018, Office Action.

U.S. Appl. No. 15/628,379, dated Apr. 30, 2018, Office Action.

U.S. Appl. No. 15/481,823, dated Apr. 30, 2018, Office Action.

Bastioli et al. "Starch in Polymers Technology" ACS Symposium Series, Jan. 1, 2012, American Chemical Society/Oxford University Press, XP055490447, vol. 1114, pp. 87-112.

PCT International Search Report and Written Opinion for PCT/US2018/026610 dated Jul. 13, 2018.

Van Soest et al. "Crystallinity in Starch Plastics: Consequences for Material Properties" Trends in Biotechnology, vol. 15, No. 6, Jun. 1, 1997, pp. 208-213.

U.S. Appl. No. 14/853,780, dated Aug. 10, 2018, Office Action.

U.S. Appl. No. 14/853,725, dated Oct. 12, 2018, Office Action.

Cardia Bioplastics FAQ [online] [site accessed Oct. 23, 2018] URL: http://ww.cardiabioplastics.com/our-business/faq Eyheraguibel, et al. "Characterization of oxidized oligomers from polyethylene films by mass spectrometry and NMR spectroscopy before and after biodegradation by a *Rhodococcus rhodochrous* strain" Chemosphere 184, 2017, pp. 366-374.

Fujisawa, et al. "Degradation of Polyethylene and Nylon 66 by the Laccase-Mediator System" Journal of Polymers and the Environment, vol. 9, Issue 3, 2001, pp. 103-108.

Ohtake, et al. "The Biodegradability of Polyethylene" Material Life, vol. 6, Issue 3, 1994, pp. 125-133.

U.S. Appl. No. 15/628,379, dated Oct. 3, 2018, Notice of Allowance.

U.S. Appl. No. 15/481,823, dated Oct. 12, 2018, Office Action.

U.S. Appl. No. 15/691,588, dated Jan. 2, 2019, Office Action.

U.S. Appl. No. 16/287,884, filed Feb. 27, 2019, LaPray.

Tena-Salcido et al. "Effect of Morphology on the Biodegradation of Thermoplastic Starch in LDPE/TPS Blends" Polymer Bulletin, vol. 60, No. 5, Jan. 30, 2008, pp. 677-688.

U.S. Appl. No. 15/481,823, dated Feb. 28, 2019, Office Action.

U.S. Appl. No. 14/853,780, dated Feb. 28, 2019, Office Action.

(56) References Cited

OTHER PUBLICATIONS

U.S. Appl. No. 16/391,909, filed Apr. 23, 2019, LaPray.
Pearce "Biodegradable plastic bags carry more ecological harm than good" The Guardian, Jun. 18, 2009.
"The Flexible Packaging Association Position on Degradable Additives" FPA, Jun. 21, 2010.
"French Proposal for Law on Biodegradable Plastics" Oxo-Biodegradable Plastics Association, Revised Oct. 31, 2013.
"Case Study: Compostable vs Oxo Degradable" Natur Bag, Feb. 19, 2019.
"Position Paper on Degradable Additives" SPI Bioplastics Division, issued Feb. 2016.
"Report from the Commission to the European Parliament and the Council on the Impact of the Use of Oxo-Degradable Plastic, Including Oxo-Degradable Plastic Carrier Bags, on the Environment" European Commission, Brussels, Jan. 16, 2018.
"What Are Oxo-biodegradable Additives" MJS Packaging, May 8, 2014.
"Background on Biodegradable Additives" BPI, Feb. 12, 2010.
U.S. Appl. No. 15/691,588, dated May 10, 2019, Office Action.
U.S. Appl. No. 15/836,555, dated Aug. 12, 2019, Office Action.
Ahmed et al. "Biodegradation of plastics: current scenario and future prospects for environmental safety." Environmental Science and Pollution Research 25.8 7287-7298. p. 7 col. 1 paragraph 2; Table 1; and Figure 1.
International Search Report issued in PCT Application PCT/US2019/28733.
Santos, R. A. L. et al. "Starch/Poly 9 Butylene Adipate-Co Terephthlalate/Montmorillonite Films Produced by Blow Extrusion".
U.S. Appl. No. 15/481,823, dated Jul. 12, 2019, Final Office Action.
U.S. Appl. No. 15/836,555, dated Feb. 7, 2020, Final Office Action.
U.S. Appl. No. 16/456,303, dated Apr. 9, 2020, Office Action.
U.S. Appl. No. 15/836,555, dated Jul. 14, 2020, Office Action.
Marianne Shirai "Thermoplastic starch/polyester films: Effects of extrusion process and poly (lactic acid) addition," Elsevier, Materials Science and Engineering, 2013, pp. 4112-4117.
Emmanuel Schwach "Starch-based biodegradable blends: morphology and interface properties," Polymer International, 2004, pp. 2115-2124.
Jie Ren "Preparation, characterization and properties of binary and ternary blends with thermoplastic starch, poly (lactic acid) and poly(butylene adipate-co- terephthalate)," Elsevier, Carbohydrate Polymers, 2008, pp. 576-582.
S.K. Nayak "Biodegradable PBAT/Starach Nanocomposites" Polymer-Plastics Technology and Engineering, 2010, pp. 1406-1418.
*Fine Chemical Engineering Green Production Process*, 1$^{st}$ edition, edited by Qihuang Song, Guangdong Science & Technology Press, published on Mar. 31, 2006, p. 174.
U.S. Appl. No. 15/691,588, dated Dec. 9, 2019, Final Office Action.
U.S. Appl. No. 15/481,823, dated Dec. 9, 2019, Office Action.
Ruchuan et al., "Study on Starch-Polyethylene Film", Journal of Tianjin University, No. 2, 1990, pp. 23-29.
"Environmentally Degradable Plastics," Leonardo Da Vinci Program, Contract Nol 1/98/2/05261 /PI/11.1.1 .b/CONT, 202 pages. May 4, 1999.
"Biodegradation of starch-polyethylene films in soil and by microbial cultures", Nov. 1997, Dave, et al. World Journal of Microbiology and Technology, 13, 655-68., World Journal of Microbiology and Technology, 655-668, 13.
Arvanitoyannis et al., Biodegradable films made from low density polyethylene (LDPE), rice starch and potato starch for food packaging applications: Part 1, Carbohydrate Polymers, vol. 36, (1998), pp. 89-104.
Biodegradable Plastics Standard to Bust Landfill Waste, ENSO Plastic Blog, printed Feb. 20, 2019, 3 pages.
Campo, E. Alfredo, Polymeric Materials and Properties, Science Direct, 2018.
Cardia Biohybrid, Film Blowing/ Blow Moulding Resin, Sep. 8, 2017.

Cardia Bioplastics FAQ [online] [site accessed Oct. 23, 2020 18] URL: http://www.cardiabioplastics.com/our-business/faq.
Cardia Compostable B-F, Blown Film Resin, Biodegradable during Composting in Professionally Managed Facilities, CBP Technical Data Sheet, 110317, 2 pages. 2019.
Chen et al., "Environmental Degradation of Starch/Poly(Lactic Acid) Composite in Seawater," Key and Open Laboratory of Marine and Estuarine Fisheries Ministry of Agriculture, East China Sea Fisheries Research Institute, Chinese Academy of Fishery Sciences, Polymers and Polymer Composites, vol. 19, No. 7, 2011, pp. 559-566.
Corn Starch/Fisher Scientific, 3 pages [online] [site accessed Sep. 18, 2020] url: https://www.fishersci.com/shop/products/corn-starch-2/S25580 (undated).
Droge et al, WO 2016/134994 Machine Translation, Sep. 1, 2016 (Year: 2016).
English Abstract of BY 21006 C1. Apr. 2017.
Final Office Action received for U.S. Appl. No. 14/853,780, dated May 24, 2017.
Final Office Action received for U.S. Appl. No. 15/481,823, dated Jul. 20, 2020.
Final Office Action received for U.S. Appl. No. 15/836,555, dated Nov. 30, 2020, 27 pages.
Gadhave et al., Starch Based Bio-Plastics: The Future of Sustainable Packaging, Open Journal of Polymer Chemistry, 2018, vol. 8, pp. 21-33.
Huagong et al., "Green Manufacturing Process of Fine Chemical Industry", 2006, Guangdong Science & Technology Press (National Outstanding Press).
Meereboer et al., "Review of recent advances in the biodegradability of polyhydroxyalkanoate (PHA) bioplastics and their composites," Green Chem., vol. 22, 2020, pp. 5519-5558.
Ming et al, CN107793619 Machine Translation, Mar. 13, 2018 (Year: 2018).
Nayak, "Biodegradable PBAT/Starch Nanocomposites", Nov. 24, 2010, Polymer-Plastics Technology and Engineering, 49:14, pp. 1406-1418, accessed on Feb. 24, 2013.
Nguyen et al., "Biodegradability of polymer film based on low density polyethylene and cassava starch," International Biodeterioration & Biodegradation, vol. 115, 2016, pp. 257-265.
Non-Final Office Action received for U.S. Appl. No. 15/691,588, dated Sep. 24, 2020, 10 pages.
Notice of Allowance received for U.S. Appl. No. 16/456,303, dated Jul. 1, 2020.
Notice of Allowance received for U.S. Appl. No. 16/456,303, dated Jul. 28, 2020.
Office action for U.S. Appl. No. 14/853,725, dated Apr. 30, 2018, LaPray et al., "Articles Formed with Biodegradable Materials and Strength Characteristics of Same", 19 pages.
Office Action received for U.S. Appl. No. 16/287,884, dated Jul. 30, 2020.
Office Action received for U.S. Appl. No. 16/391,909 , dated Dec. 1, 2020.
Office Action received for U.S. Appl. No. 16/456,295, dated Jul. 22, 2020.
Ojeda, et al., "Degradability of linear polyolefins under natural weathering, Polymer Degradation and Stability," 2011, pp. 703-707.
Requirement for Restriction/Election received for U.S. Appl. No. 16/391,909, dated Sep. 8, 2020.
Sashiwa et al., "Microbial Degradation Behavior in Seawater of Polyester Blends Containing Poly(3-hydroxybutyrate-co-3-hydroxyhexanoate) (PHBHHx)," Mar. Drugs, vol. 16, 2018, 34, 11 pages.
Schwach et al., "Starch-based biodegradable blends: morphology and interface properties", 2004, Polymer International, vol. 53, pp. 2115-2124, DOI: 10.1002/pi.1636.
Shahin, "In-situ Nano Fibrillation of Polyethylene Terephthalate (PET) in Polypropylene (PP) through Spunbond Process," Department of Mechanical and Industrial Engineering, 2019, 89 pages.
U.S. Application filed Aug. 21, 2020, by LaPray, U.S. Appl. No. 16/999,542.
U.S. Patent Application filed Jul. 10, 2020 by LaPray, U.S. Appl. No. 16/925,705.

(56) References Cited

OTHER PUBLICATIONS

U.S. Patent Application filed Jul. 10, 2020 by LaPray, U.S. Appl. No. 16/925,747.
U.S. Patent Application filed Jul. 10, 2020 by LaPray, U.S. Appl. No. 16/925,952.
Vargha et al., "Behavior of Polyethylene Films in Soil, Periodica Polytechnica Chemical Engineering," DOI: 10.3311/PPch. 8281, Creative Commons Attribution, 2016, pp. 60-68.
Yu et al., "Morphology and Mechanical Properties of Immiscible Polyethylene/Polyamide12 Blends Prepared by High Shear Processing," Chinese Journal of Polymer Science, 2017, 35(9):1132-1142.
Zhang et al., "Retrogradation and Antiplasticization of Thermoplastic Starch," Richardson Centre for Functional Foods and Nutraceuticals, University of Manitoba, www.intechopen.com, 19 pages. 2012.
Zhong et al., "Biodegradable polymers and green-based antimicrobial packaging materials: A mini-review," Advanced Industrial and Engineering Polymer Research, vol. 3, 2020, pp. 27-35.
Gilfillan, "Developing Starch-Based Polymer Composites", Doctor of Philosophy, 2015, pp. 1-128.

\* cited by examiner

ASTM D6400 Phytoxicity  Sample 100
Inoculum: None  Cucumis Sativus (cucumber)
Interval:12 days  Result 64.6 mm
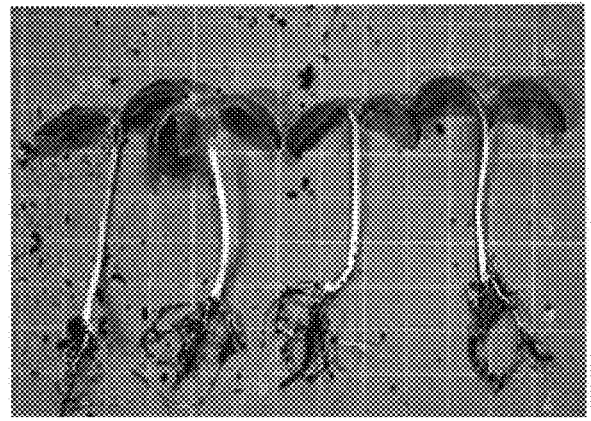
ASTM D6400 Phytoxicity  Sample 100
Inoculum: None  Glycine max (soybean)
Interval:12 days  Result 139 mm
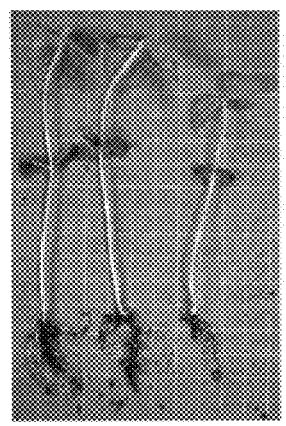
FIG. 10

ASTM D6400 Phytoxicity  Sample 200
Inoculum: None  Cucumis Sativus (cucumber)
Interval: 12 days  Result 69.2 mm
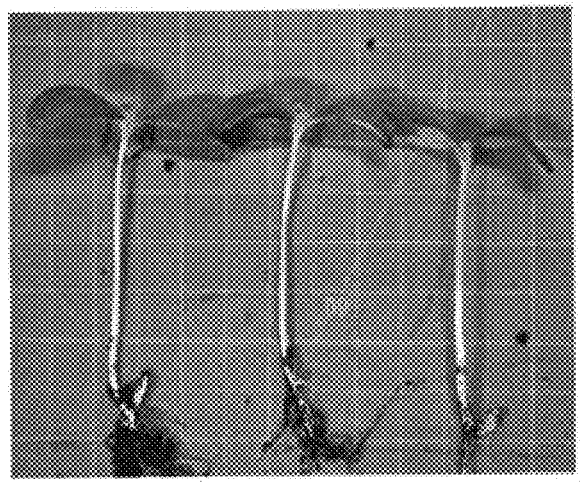
ASTM D6400 Phytoxicity  Sample 200
Inoculum: None  Glycine max (soybean)
Interval: 12 days  Result 172.5 mm
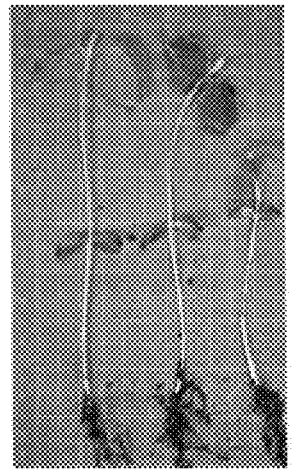
FIG. 11

ASTM D6400 Phytoxicity  Sample 300
Inoculum: None  Cucumis Sativus (cucumber)
Interval:12 days  Result 70.3 mm
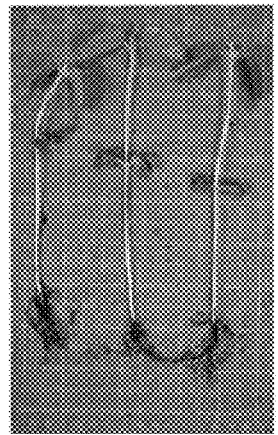
ASTM D6400 Phytoxicity  Sample 300
Inoculum: None  Glycine max (soybean)
Interval:12 days  Result 153.4 mm
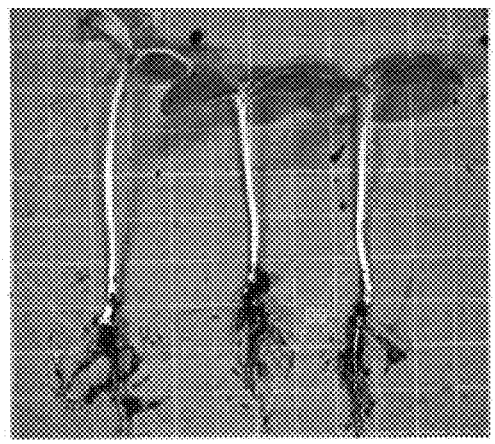
FIG. 12

ASTM D6400 Phytoxicity　　　Sample 400
Inoculum: None　　　　　　　Cucumis Sativus (cucumber)
Interval:12 days　　　　　　　Result 70.3 mm
ASTM D6400 Phytoxicity　　　Sample 400
Inoculum: None　　　　　　　Glycine max (soybean)
Interval:12 days　　　　　　　Result 169.1 mm
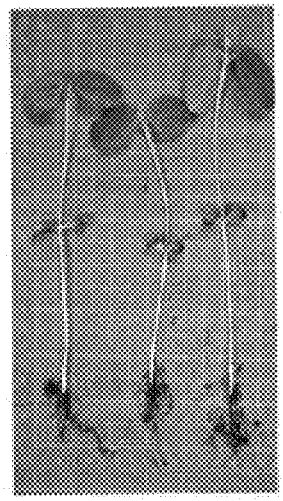
FIG. 13

ASTM D6400 Elemental Analysis
Sample 100

Result (As) Arsenic - not detected <MDL 0.237 ppm - PASS     0.237 mg/kg dwt (Cd) Cadmium - not detected <MDL 0.237 ppm - PASS     0.237 mg/kg dwt (Cu) Copper - not detected < MDL 0.454 - PASS         0.454 mg/kg dwt (Pb) Lead - not detected <MDL 0.293 ppm - PASS        0.293 mg/kg dwt (Hg) Mercury - not detected <MDL 0.256 ppm - PASS     0.256 mg/kg dwt (Ni) Nickel - not detected <MDL 0.246 ppm - PASS      0.246 mg/kg dwt (Se) Selenium - not detected <MDL 0.549 ppm - PASS    0.549 mg/kg dwt (Zn) Zinc - PASS                                      27.1 mg/kg dwt

FIG. 14A

ASTM D6400 Elemental Analysis
Sample 200

Result (As) Arsenic - not detected <MDL 0.237 ppm - PASS     0.237 mg/kg dwt (Cd) Cadmium - not detected <MDL 0.237 ppm - PASS     0.237 mg/kg dwt (Cu) Copper - not detected < MDL 0.454 - PASS         0.454 mg/kg dwt (Pb) Lead - not detected <MDL 0.293 ppm - PASS        0.293 mg/kg dwt (Hg) Mercury - not detected <MDL 0.256 ppm - PASS     0.256 mg/kg dwt (Ni) Nickel - not detected <MDL 0.246 ppm - PASS      0.246 mg/kg dwt (Se) Selenium - not detected <MDL 0.549 ppm - PASS    0.549 mg/kg dwt (Zn) Zinc - PASS                                      27.1 mg/kg dwt

FIG. 14B

ASTM D6400 Elemental Analysis
Sample 300

Notes Sectio

| | Result | |
|---|---|---|
| (As) Arsenic - not detected <MDL 0.237 ppm - PASS | 0.237 | mg/kg dwt |
| (Cd) Cadmium - not detected <MDL 0.237 ppm - PASS | 0.237 | mg/kg dwt |
| (Cu) Copper - not detected < MDL 0.454 - PASS | 0.454 | mg/kg dwt |
| (Pb) Lead - not detected <MDL 0.293 ppm - PASS | 0.293 | mg/kg dwt |
| (Hg) Mercury - not detected <MDL 0.256 ppm - PASS | 0.256 | mg/kg dwt |
| (Ni) Nickel - not detected <MDL 0.246 ppm - PASS | 0.246 | mg/kg dwt |
| (Se) Selenium - not detected <MDL 0.549 ppm - PASS | 0.549 | mg/kg dwt |
| (Zn) Zinc - not detected <MDL 2.72 ppm - PASS | 2.72 | mg/kg dwt |

FIG. 15A

ASTM D6400 Elemental Analysis
Sample 400

Notes Sectio

| | Result | |
|---|---|---|
| (As) Arsenic - not detected <MDL 0.237 ppm - PASS | 0.237 | mg/kg dwt |
| (Cd) Cadmium - not detected <MDL 0.237 ppm - PASS | 0.237 | mg/kg dwt |
| (Cu) Copper - PASS | 1.52 | mg/kg dwt |
| (Pb) Lead - not detected <MDL 0.293 ppm - PASS | 0.293 | mg/kg dwt |
| (Hg) Mercury - not detected <MDL 0.256 ppm - PASS | 0.256 | mg/kg dwt |
| (Ni) Nickel - PASS | 0.256 | mg/kg dwt |
| (Se) Selenium - not detected <MDL 0.549 ppm - PASS | 0.549 | mg/kg dwt |
| (Zn) Zinc - PASS | 18.6 | mg/kg dwt |

FIG. 15B

ARTICLES FORMED WITH BIODEGRADABLE MATERIALS AND STRENGTH CHARACTERISTICS OF THE SAME

CROSS-REFERENCE TO RELATED APPLICATION

This application is a continuation in part of U.S. application Ser. No. 14/853,725 filed on Sep. 14, 2015 which claims the benefit of U.S. Provisional Patent Application No. 62/187,231 filed on Jun. 30, 2015. This application is also a continuation in part of U.S. application Ser. No. 14/853,780 filed on Sep. 14, 2015. This application also claims the benefit of U.S. Provisional Patent Application No. 62/440,399 filed on Dec. 29, 2016, and U.S. Provisional Patent Application No. 62/442,432 filed on Jan. 4, 2017. The entire contents of each of the foregoing is incorporated by reference herein.

BACKGROUND

Traditional petrochemical-based plastics are formulated to be strong, lightweight, and durable. However, these plastics are typically not biodegradable, and as a result, hundreds of millions of tons of plastic sits in landfills or floats in the ocean. In trying to reduce the amount of plastic waste, some articles typically produced using petrochemical-based plastics are being produced using biodegradable materials.

SUMMARY

This disclosure is directed to articles that are formed with biodegradable materials. In particular, the disclosure describes strength characteristics and biodegradability of the articles formed with the biodegradable materials. Processes to produce the articles with biodegradable materials are also described. In some cases, articles can be produced from a mixture of one or more synthetic, e.g., petrochemical-based polymeric materials and one or more carbohydrate-based polymeric materials. In a particular example, the one or more carbohydrate-based polymeric materials can include one or more starch-based polymeric materials. Optionally, a compatibilizer can also be used to form the articles.

In an implementation, a process to produce an article can include providing one or more petrochemical-based polymeric materials and one or more carbohydrate-based polymeric materials. The one or more petrochemical-based polymeric materials and the one or more carbohydrate-based polymeric materials can then be mixed and heated. The resulting mixture can be extruded into a number of plastic products using plastics processing equipment, such as injection molders, blow molders, thermoformers, etc., and a gas can be injected into the extruded mixture to form a film. Optionally, the extruded film can then be processed into a bag or another type of article.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures generally indicates similar or identical items.

FIG. 10 shows the results of the phytotoxicity portion of the ASTM D-6400 test for a first sample formed according to techniques described herein.

FIG. 11 shows the results of the phytotoxicity portion of the ASTM D-6400 test for a second sample formed according to techniques described herein.

FIG. 12 shows the results of the phytotoxicity portion of the ASTM D-6400 test for a third sample formed according to techniques described herein.

FIG. 13 shows the results of the phytotoxicity portion of the ASTM D-6400 test for a fourth sample formed according to techniques described herein.

FIG. 14A and FIG. 14B show the results of the elemental analysis portion of the ASTM D-6400 test based on Table 3 of 40 Code of Federal Regulations (C.F.R.) Part 503.13 for a first sample and a second sample formed according to techniques described herein.

FIG. 15A and FIG. 15B show the results of the elemental analysis portion of the ASTM D-6400 test based on Table 3 of 40 C.F.R. Part 503.13 for a third sample and a fourth sample formed according to techniques described herein.

DETAILED DESCRIPTION

I. Definitions

Figure 1:
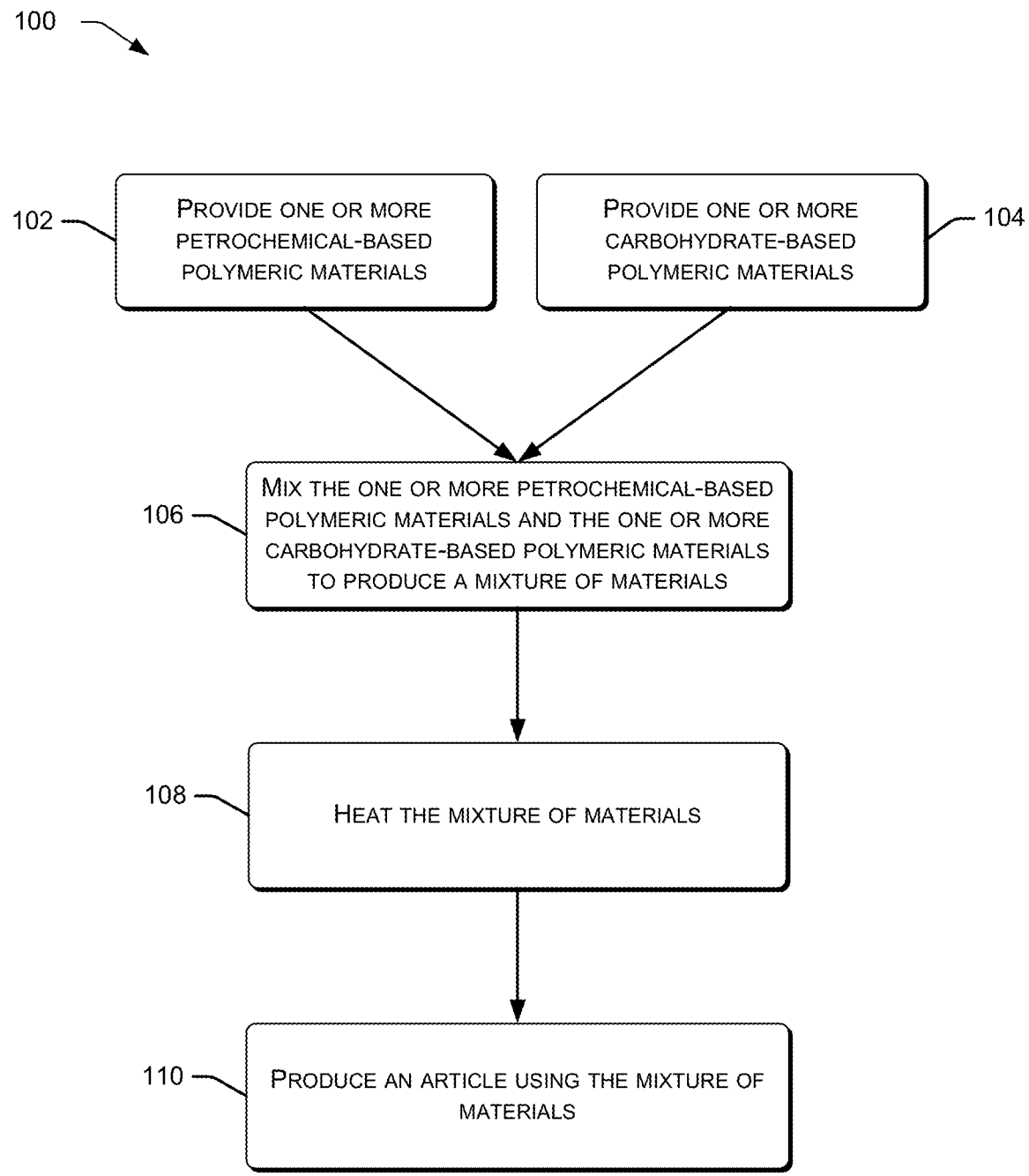
FIG. 1 illustrates a flow diagram of an example process of forming an article including biodegradable materials.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

The terms "a," "an," "the" and similar referents used in the context of describing the inventive features (especially in the context of the following claims) are to be construed to cover both the singular and the plural, unless otherwise indicated herein or clearly contradicted by context. Thus, for example, reference to a "starch" can include one, two or more starches.

"Film," as used herein, refers to a thin continuous article that includes one or more polymeric materials that can be used to separate areas or volumes, to hold items, to act as a barrier, and/or as a printable surface.

"Bag," as used herein, refers to a container made of a relatively thin, flexible film that can be used for containing and/or transporting goods.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 25%, 15%, 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 25% of, within 15% of, within 10% of, within 5% of, or within 1% of, a stated amount or value.

Some ranges are disclosed herein. Additional ranges may be defined between any values disclosed herein as being exemplary of a particular parameter. All such ranges are contemplated and within the scope of the present disclosure. Further, recitation of ranges of values herein is intended to serve as a shorthand method of referring individually to each separate value falling within the range. Unless otherwise indicated herein, each individual value is incorporated into the specification as if it were individually recited herein.

All numbers expressing quantities of ingredients, constituents, conditions, and so forth used in the specification and claims are to be understood as being modified in all instances by the term "about". Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The phrase 'free of' or similar phrases as used herein means that the composition comprises 0% of the stated component, that is, the component has not been intentionally added to the composition. However, it will be appreciated that such components may incidentally form under appropriate circumstances, may be incidentally present within another included component, e.g., as an incidental contaminant, or the like.

The phrase 'substantially free of' or similar phrases as used herein means that the composition preferably comprises 0% of the stated component, although it will be appreciated that very small concentrations may possibly be present, e.g., through incidental formation, incidental contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%.

All methods described herein can be performed in any suitable order unless otherwise indicated herein or otherwise clearly contradicted by context. The use of any and all examples, or example language (e.g., "such as") provided herein is intended merely to better illuminate the inventive features and does not pose a limitation on the scope of the inventive features otherwise claimed. No language in the specification should be construed as indicating any non-claimed element essential to the practice of the inventive features.

The particulars shown herein are by way of example and for purposes of illustrative discussion of the preferred embodiments of the inventive features and are presented in the cause of providing what is believed to be the most useful and readily understood description of the principles and conceptual aspects of various embodiments of the inventive features. In this regard, no attempt is made to show structural details of the inventive features in more detail than is necessary for the fundamental understanding of the inventive features, the description taken with the drawings and/or examples making apparent to those skilled in the art how the several forms of the inventive features may be embodied in practice.

Definitions and explanations used in the present disclosure are meant and intended to be controlling in any future construction unless clearly and unambiguously modified in the examples or when application of the meaning renders any construction meaningless or essentially meaningless. In cases where the construction of the term would render it meaningless or essentially meaningless, the definition should be taken from Webster's Dictionary, 3rd Edition or a dictionary known to those of ordinary skill in the art.

II. Introduction

The present disclosure is directed to, among other things, articles that are formed from biodegradable materials, as well as systems and processes to produce such articles. Generally, the articles of the present disclosure include one or more carbohydrate-based polymeric materials. The articles can also be produced using a mixture of one or more carbohydrate-based polymeric materials and one or more petrochemical-based polymeric materials. In an implementation, articles can be formed by mixing one or more carbohydrate-based polymeric materials and one or more petrochemical-based polymeric materials, heating the mixture, and extruding the mixture. In various embodiments, the carbohydrate-based polymeric materials can include starch-based polymeric materials.

The articles described herein can be produced in the form of films, bags, and the like which are made using blown film equipment along with other articles that are produced using injection molding, blow molding, thermoforming, and other plastic manufacturing processes.

Examples of suitable carbohydrate-based or starch-based polymeric materials for use in forming such articles are available from BiologiQ, under the tradename ESR ("Eco Starch Resin"). Specific examples include, but are not limited to GS-270, GS-300, and GS-330. Specific characteristics of such ESR materials will be described in further detail herein. Other carbohydrate-based or starch-based polymeric materials exhibiting similar properties may also be suitable for use, such that ESR available from BiologiQ is merely a non-limiting example of a suitable carbohydrate-based or starch based polymeric material.

III. Exemplary Articles and Methods

The techniques and processes described herein can be implemented in a number of ways. Example implementations are provided below with reference to the following figures.

FIG. 1 illustrates an example process 100 of manufacturing an article including biodegradable materials. At 102, the process 100 can include providing one or more petrochemical-based polymeric materials. In addition, at 104, the process 100 can include providing one or more carbohydrate-based polymeric materials. In some cases, the one or more carbohydrate-based polymeric materials can include one or more starch-based polymeric materials. The one or more carbohydrate-based polymeric materials and the one or more petrochemical-based polymeric materials can be provided in a particular form, such as pellets, powders, nurdles, slurry, and/or liquids. In specific embodiments, pellets can be used.

In addition, providing the one or more petrochemical-based polymeric materials and the one or more carbohydrate-based polymeric materials can include feeding the one or more petrochemical-based polymeric materials and the one or more carbohydrate-based polymeric materials into an extruder. For example, the one or more carbohydrate-based polymeric materials and the one or more petrochemical-based polymeric materials can be fed into one or more hoppers of an extruder. In some cases, the one or more carbohydrate-based polymeric materials and the one or more petrochemical-based polymeric materials can be fed into the extruder at approximately the same time. In other situations, the one or more carbohydrate-based polymeric materials and the one or more petrochemical-based polymeric materials can be fed into the extruder at different times. Furthermore, the one or more carbohydrate-based polymeric materials and the one or more petrochemical-based polymeric materials can be fed into a chamber of the extruder. In an implementation, the one or more carbohydrate-based polymeric materials and the one or more petrochemical-based polymeric materials can be fed into the same chamber of the extruder. In another implementation, the one or more carbohydrate-based polymeric materials and the one or more petrochemical-based polymeric materials can be fed into different chambers of the extruder.

In some cases, the petrochemical-based polymeric materials can include polyolefins. For example, the petrochemical-based polymeric materials can include, but are not limited to, a polyethylene (PE), a polypropylene (PP), a polystyrene (PS), a high impact polystyrene (HIPS), a nylon, a polymethylpentene, a polybutene, polybutyrate adipate terephthalate (PBAT), other polyolefins, or combinations thereof. It will be apparent to those of skill in the art that a wide variety of petrochemical-based or other synthetic polymeric materials may be used. In various embodiments, the petrochemical based polymeric materials can include an ultra-high-molecular-weight polyethylene (UHMWPE), an ultra-low-molecular-weight polyethylene (ULMWPE), a high-molecular-weight polyethylene (HMWPE), a high-density polyethylene (HDPE), a high-density cross-linked polyethylene (HDXLPE), a cross-linked polyethylene (PEX or XLPE), a medium-density polyethylene (MDPE), a linear low-density polyethylene (LLDPE), a low-density polyethylene (LDPE), or a very-low-density polyethylene (VLDPE). In specific embodiments, the petrochemical-based polymeric materials can include a LLDPE. In some cases, a LLDPE can be formed using a metallocene catalyst.

The one or more carbohydrate-based polymeric materials can be formed from a plurality of materials (e.g., a mixture) including one or more starches. For example, the one or more starches can be produced from one or more plants, such as corn starch, tapioca starch, cassava starch, wheat starch, potato starch, rice starch, sorghum starch, and the like. In various embodiments, the starch-based polymers can be formed from a mixture of starches derived from two or more plants, three or more plants, or four or more plants. In some cases, the materials from which the one or more carbohydrate-based polymeric materials are formed can also include a plasticizer. An amount of water can be present in the finished one or more carbohydrate-based polymeric materials.

In an implementation, the one or more carbohydrate-based polymeric materials can be formed from a plurality of materials including at least about 65% by weight of one or more starches, at least about 70% by weight of one or more starches, at least about 75% by weight of one or more starches, or at least about 80% by weight of one or more starches. In addition, the materials from which the one or more carbohydrate-based polymeric materials are formed can include no greater than about 99% by weight of one or more starches, no greater than about 95% by weight of one or more starches, no greater than about 90% by weight of one or more starches, or no greater than about 85% by weight of one or more starches. In an illustrative example, the materials from which the one or more carbohydrate-based polymeric materials are formed can include from about 60% by weight to about 99% by weight of one or more starches. In another illustrative example, the materials from which the one or more carbohydrate-based polymeric materials are formed can include from about 65% by weight to about 80% by weight of one or more starches. In another implementation, such percentages may represent that fraction of the finished carbohydrate-based polymeric material that is derived from starch (e.g., at least about 65% of the carbohydrate based polymeric material may be attributed to (formed from) starch as the starting material).

Mixtures of starches may be used in forming the carbohydrate-based polymeric material. In some embodiments, a starch can be present in a mixture of starches at an amount of at least about 1% by weight, of at least about 2% by weight, of at least about 3% by weight, of at least about 4% by weight, of at least about 5% by weight, at least about 10% by weight, at least about 15% by weight, at least about 20% by weight, at least about 25% by weight, at least about 30% by weight, at least about 35% by weight, or at least about 40% by weight relative to the combined weight of the plurality of starches. In addition, a starch can be present in a mixture of starches at an amount no greater than about 95% by weight, no greater than about 90% by weight, no greater than about 85% by weight, no greater than about 80% by weight, no greater than about 75% by weight, no greater than about 70% by weight, no greater than about 65% by weight, no greater than about 60% by weight, no greater than about 55% by weight, or no greater than about 50% by weight. In some embodiments, a starch can be present in a mixture of starches in an amount from about 20% by weight to about 25% by weight, from about 30% by weight to about 35% by weight, from about 45% by weight to about 55% by weight, or from about 70% by weight to about 80% by weight.

In an implementation, the one or more carbohydrate-based polymeric materials can be formed from a plurality of materials including a mixture of a first starch and a second starch. In these cases, the starch materials or materials as a whole from which the carbohydrate-based polymeric material is formed can include at least about 50% by weight of the first starch, at least about 55% by weight of the first starch, at least about 60% by weight of the first starch, at least about 65% by weight of the first starch, or at least about 70% by weight of the first starch. Additionally, the materials can include no greater than about 95% by weight of the first starch, no greater than about 90% by weight of the first starch, no greater than about 85% by weight of the first starch, no greater than about 80% by weight of the first starch, or no greater than about 75% by weight of the first starch. In an illustrative example, the materials can include from about 50% by weight to about 98% by weight of the first starch. In another illustrative example, the materials can include from about 55% by weight to about 85% by weight of the first starch. In an additional illustrative example, the materials can include from about 55% by weight to about 70% by weight of the first starch. In a further illustrative example, the materials can include from about 75% by weight to about 90% by weight of the first starch. Also, the materials can include from about 65% by weight to about 75% by weight of the first starch. In another implementation, such percentages may represent that fraction of the finished carbohydrate-based polymeric material that is derived from or attributable to the first starch (e.g., at least about 50% of the carbohydrate based polymeric material may be attributed to (formed from) the first starch as a starting material).

With regard to a second starch where the carbohydrate-based material is formed from two or more starches, the starch materials, or the materials as a whole can include at least about 1% by weight of the second starch, at least about 2% by weight of the second starch, at least about 3% by weight of the second starch, at least about 4% by weight of the second starch, at least about 5% by weight of the second starch, at least about 10% by weight of the second starch, at least about 15% by weight of the second starch, at least about 20% by weight of the second starch, or at least about 25% by weight of the second starch. Additionally, the starch materials or materials as a whole can include no greater than about 50% by weight of the second starch, no greater than about 45% by weight of the second starch, no greater than about 40% by weight of the second starch, no greater than about 35% by weight of the second starch, or no greater than about 30% by weight of the second starch. In an illustrative example, the starch materials or materials as a whole can include from about 2% by weight to about 50% by weight of the second starch. In another illustrative example, the starch materials or materials as a whole can include from about 10% by weight to about 45% by weight of the second starch. In an additional illustrative example, the starch materials or materials as a whole can include from about 15% by weight to about 25% by weight of the second starch. In a further illustrative example, the starch materials or materials as a whole can include from about 35% by weight to about 45% by weight of the second starch. Also, the starch materials or materials as a whole can include from about 25% by weight to about 35% by weight of the second starch. In another implementation, such percentages may represent that fraction of the finished carbohydrate-based polymeric material that is derived from or attributable to the second starch (e.g., no greater than about 50% of the carbohydrate based polymeric material may be attributed to (formed from) the second starch as a starting material).

In some implementations, the one or more carbohydrate-based polymeric materials can be formed from a mixture of a first starch, a second starch, and a third starch. For example, the starch materials or materials as a whole can include at least about 30% by weight of the first starch, at least about 35% by weight of the first starch, at least about 45% by weight of the first starch, at least about 50% by weight of the first starch, or at least about 55% by weight of the first starch. In addition, the starch materials or materials as a whole can include no greater than about 80% by weight of the first starch, no greater than about 75% by weight of the first starch, no greater than about 70% by weight of the first starch, no greater than about 65% by weight of the first starch, or no greater than about 60% by weight of the first starch. In an illustrative example, the starch materials or materials as a whole can include from about 30% by a weight to about 80% by weight of the first starch. In another illustrative example, the starch materials or materials as a whole can include from about 30% by weight to about 40% by weight of the first starch. In an additional illustrative example, the starch materials or materials as a whole can include from about 45% by weight to about 55% by weight of the first starch. In a further illustrative example, the starch materials or materials as a whole can include from about 55% by weight to about 65% by weight of the first starch. In another implementation, such percentages may represent that fraction of the finished carbohydrate-based polymeric material that is derived from or attributable to the first starch (e.g., at least about 30% of the carbohydrate based polymeric material may be attributed to (formed from) the first starch as a starting material).

Additionally, in a carbohydrate-based polymeric material formed from a mixture of a first starch, a second starch, and a third starch, the starch materials or materials as a whole used in making the carbohydrate-based polymeric material can include at least about 1% by weight of the second starch, at least about 2% by weight of the second starch, at least about 3% by weight of the second starch, at least about 4% by weight of the second starch at least about 5% by weight of the second starch, at least about 10% by weight of the second starch, at least about 15% by weight of the second starch, or at least about 20% by weight of the second starch. In an implementation, the starch materials or materials as a whole can include no greater than about 40% by weight of the second starch, no greater than about 35% by weight of the second starch, no greater than about 30% by weight of the second starch, or no greater than about 25% by weight of the second starch. In an illustrative example, the starch materials or materials as a whole can include from about 5% by weight to about 40% by weight of the second starch. In another illustrative example, the starch materials or materials as a whole can include from about 15% by weight to about 25% by weight of the second starch. In an additional illustrative example, the starch materials or materials as a whole can include from about 27% by weight to about 38% by weight of the second starch. In another implementation, such percentages may represent that fraction of the finished carbohydrate-based polymeric material that is derived from or attributable to the second starch (e.g., at least about 5% of the carbohydrate based polymeric material may be attributed to (formed from) the second starch as a starting material).

Further, when the materials from which the carbohydrate-based polymeric material is formed include a mixture of a first starch, a second starch, and a third starch, the starch materials or materials as a whole can include at least about 1% by weight of the third starch, at least about 2% by weight of the third starch, at least about 3% by weight of the third starch, at least about 4% by weight of the third starch, at least about 5% by weight of the third starch, at least about 10% by weight of the third starch, at least about 15% by weight of the third starch, or at least about 20% by weight of the third starch. In an implementation, the starch materials or materials as a whole can include no greater than about 40% by weight of the third starch, to greater than about 35% by weight of the third starch, no greater than about 30% by weight of the third starch, or no greater than about 25% by weight of the third starch. In an illustrative example, the starch materials or materials as a whole can include from about 5% by weight to about 40% by weight of the third starch. In another illustrative example, the starch materials or materials as a whole can include from about 15% by weight to about 25% by weight of the third starch. In an additional illustrative example, the starch materials or materials as a whole can include from about 27% by weight to about 38% by weight of the third starch. In another implementation, such percentages may represent that fraction of the finished carbohydrate-based polymeric material that is derived from or attributable to the third starch (e.g., at least about 5% of the carbohydrate based polymeric material may be attributed to (formed from) the third starch as a starting material).

A plasticizer used in forming the one or more carbohydrate-based polymeric materials can include polyethylene glycol, sorbitol, glycerin, polyhydric alcohol plasticizers, hydrogen bond forming organic compounds which do not have a hydroxyl group, anhydrides of sugar alcohols, animal proteins, vegetable proteins, aliphatic acids, phthalate esters, dimethyl and diethylsuccinate and related esters, glycerol triacetate, glycerol mono and diacetates, glycerol mono, di, and tripropionates, butanoates, tearates, lactic acid esters, citric acid esters, adipic acid esters, stearic acid esters, oleic acid esters, other acid esters, or combinations thereof. In specific implementations, the plasticizer can include glycerin.

In an implementation, the materials from which the one or more carbohydrate-based polymeric materials are formed can include at least about 12% by weight of a plasticizer, at least about 15% by weight of a plasticizer, at least about 18% by weight of a plasticizer, at least about 20% by weight of a plasticizer, or at least about 22% by weight of a plasticizer. Additionally, the materials can include no greater than about 35% by weight of a plasticizer, no greater than about 32% by weight of a plasticizer, no greater than about 30% by weight of a plasticizer, no greater than about 28% by weight of a plasticizer, or no greater than about 25% by weight of a plasticizer. In an illustrative example, the materials can include from about 12% by weight to about 35% by weight of a plasticizer. In another illustrative example, the materials can include from about 15% by weight to about 30% by weight of a plasticizer. In an additional illustrative example, the materials can include from about 18% by weight to about 28% by weight of a plasticizer. In another implementation, such percentages may represent that fraction of the finished carbohydrate-based polymeric material that is derived from or attributable to the plasticizer (e.g., at least about 12% of the carbohydrate based polymeric material may be attributed to (formed from) the plasticizer as a starting material).

In some cases, the finished one or more carbohydrate-based polymeric materials include no greater than about 5% by weight water, no greater than about 4% by weight water, no greater than about 3% by weight water, no greater than about 2% by weight water, no greater than about 1.5% by weight water, no greater than about 1.4% water, no greater than about 1.3% water, no greater than about 1.2% water, no greater than about 1.1% water or no greater than about 1% by weight water. Additionally, the finished one or more carbohydrate-based polymeric materials can include at least about 0.1% by weight water, at least about 0.3% by weight water, at least about 0.6% by weight water, or at least about 0.8% by weight water. In an illustrative example, the finished one or more carbohydrate-based polymeric materials include from about 0.1% by weight to about 5% by weight water. In another illustrative example, the finished one or more carbohydrate-based polymeric materials include from about 0.4% by weight to about 2% by weight water. In an additional illustrative example, the finished one or more carbohydrate-based polymeric materials can include from about 0.5% by weight to about 1.5% by weight water. The ESR materials available from BiologiQ are examples of such finished carbohydrate-based polymeric materials, although it will be appreciated that other materials available elsewhere (e.g., at some future time) may also be suitable for use.

Examples of suitable carbohydrate-based (e.g., starch-based) polymeric materials for use in forming films and other articles are available from BiologiQ, located in Idaho Falls, Id., under the tradename ESR ("Eco Starch Resin"). Specific examples include, but are not limited to GS-270, GS-300, and GS-330. Fractions of starch, and glycerin or other plasticizers used in forming ESR are described in detail above. ESR may be provided in pellet form. Physical characteristics for GS-270 and GS-300 are shown in Table 1 below. GS-270 is formed from about 27% glycerin, with substantially the balance of the finished product being formed from or attributable to one or more starches as starting materials. GS-300 is formed from about 30% glycerin, with substantially the balance of the finished product being formed from or attributable to one or more starches as starting materials.

Such low water content in the carbohydrate-based polymeric material can be important, as significant water content results in incompatibility with the petro-chemical-based polymeric material when attempting to form a thin film, as the water vaporizes, resulting in voids within the film, as well as other problems. For example, when blowing a film, the carbohydrate-based polymeric material used may have less than 1.5% water, and preferably no more than 1.1% water (e.g., less than about 1% water).

Low water content is not achieved in the ESR material through esterification, as is common in some conventional TPS materials that may include relatively low water content. Such esterification can be expensive and complex to perform.

Processing at relatively high temperatures may result in some release of volatized glycerin (e.g., visible as smoke).

TABLE 1

| PROPERTY | TEST METHOD | GS-270 NOMINAL VALUE | GS-300 NOMINAL VALUE |
| --- | --- | --- | --- |
| Density | ASTM D-792 | 1.40 g/cm$^3$ | 1.42 g/cm$^3$ |
| THERMAL PROPERTIES | | | |
| Melt Flow Index 200° C./5 kg | ASTM D-1238 | 1.98 g/10 min | 1.95 g/10 min |
| Melting Temp. Range | ASTM D-3418 | 166-180° C. | 166-180° C. |
| Glass Transition Temp. | ASTM D-3418 | 81-100° C. | 81-100° C. |
| MECHANICAL PROPERTIES | | | |
| Tensile Strength @ Yield | ASTM D-638 | >30 MPa | >14 MPa |
| Tensile Strength @ Break | ASTM D-638 | >30 MPa | >14 MPa |
| Young's Modulus | ASTM D-638 | 1.5 GPa | 1.5 GPa |
| Elongation at Break | ASTM D-638 | <10% | <10% |
| Impact Resistance (Dart) | ASTM D-5628 | 3.5 kg | 4.5 kg |
| ADDITIONAL PROPERTIES | | | |
| Water Content | ASTM D-6980 | ≤1.5%, or ≤1% | ≤1.5%, or ≤1% |

The above characteristics shown for GS-270 and GS-300 are exemplary of other ESR products available from BiologiQ, although values may vary somewhat. For example, ESR products from BiologiQ may generally have a glass transition temperature ranging from about 70° C. to about 100° C. Values for melting temperature range, density, Young's Modulus, and water content may be identical or similar to those shown above in Table 1. Those of skill in the art will appreciate that glass transition temperature can be indicative of degree of crystallinity. Some characteristics may similarly vary somewhat (e.g., ±25%, or ±10%) from values shown for GS-270 and GS-300. ESR has an amorphous structure (e.g., more amorphous than typical raw starch). ESR has a low water content, as described. As ESR absorbs moisture, it exhibits plastic behavior and becomes flexible. When removed from a humid environment, the material dries out and becomes stiff again (e.g., again exhibiting less than about 1% water content). The moisture present in ESR (e.g., in pellet form) may be released in the form of steam during processing as shown in FIG. 1. As a result, films produced from a starch-based polymeric material such as ESR and a petrochemical-based polymeric material (e.g., a polyolefin such as polyethylene) may exhibit even lower water content, as the water in the ESR may typically be released during formation of the film or other article.

Drying of pellets can be performed by introducing warm dry air, e.g., at 60° C. for 1-4 hours. Pellets should be dried to less than about 1% moisture content prior to processing. ESR pellets may simply be stored in a sealed container with a desiccant in a dry location, away from heat.

In addition to ESR being thermoplastic, the ESR may also be thixotropic, meaning that the material is solid at ambient temperature, but flows as a liquid when heat, pressure and/or frictional movement are applied. Advantageously, pellets of ESR can be used the same as petrochemical based pellets in standard plastic production processes. ESR materials and products made therefrom may exhibit gas barrier characteristics. Products (e.g., films) made using such ESR pellets exhibit oxygen gas barrier characteristics (e.g., see Example 5 for specific exemplary results). ESR materials may be non-toxic and edible, made using raw materials that are all edible. ESR and products made therefrom may be water resistant. For example, ESR may resist swelling under moist heated conditions to the point that it may not completely dissolve in boiling water within 5 minutes. ESR may be stable, in that it may not exhibit any significant retrogradation, even if left in relatively high humidity conditions, which characteristic differs from many other thermoplastic starch materials. Of course, products made with ESR may also exhibit such characteristics. If ESR is stored in such humid conditions, the excess absorbed water can simply be evaporated away, and once the water content is no more than about 1%, it can be used in forming a film or other article.

ESR can be cost competitive, being manufactured at a cost that is competitive with traditional polyethylene plastic resins. ESR can be mixed with other (e.g., petrochemical) polymers, including, but not limited to PBAT, PBS, PLA, PP, PE, and/or PS.

ESR includes very low water content. For example, although raw starch (e.g., used in forming ESR) may typically include about 13% water by weight, the finished ESR pellets available from BiologiQ include less than about 1% water. ESR materials are biodegradable, and as described herein, not only is the starch-based ESR material biodegradable, but when blended with other polymers, such as polyethylene, which are not biodegradable, the blended material is also substantially entirely biodegradable. Such results are quite surprising, and particularly advantageous. The Examples herein evidence such surprising results. Other typical thermoplastic starch materials do not claim or exhibit such characteristics when blended with other polymers.

The ESR material may exhibit some elasticity, although its elasticity may be less than many other polymers (e.g., particularly petrochemical-based polymers). Of course, films and other articles may be formed from blends of ESR and any desired petrochemical-based polymer(s), providing elasticity results that may be expected to be a weighted average of the blended components. Table 2 below shows elongation at break and elastic modulus values for various standard plastic ("SP") materials, various "green" renewable plastic materials, and ESR, for comparison. The ESR in Table 2 had a tensile strength of 40 MPa.

TABLE 2

| MATERIAL | COMPOSTABLE, BIODEGRADABLE OR STANDARD PLASTIC | ELONGATION AT BREAK | ELASTIC MODULUS |
| --- | --- | --- | --- |
| EcoFlex C1200 | BP | 700% | 0.10 GPa |
| ESR | BP | 100% | 1.5 GPa |
| HDPE | SP | 650% | 0.80 GPa |
| LDPE | SP | 550% | 0.40 GPa |
| PBS | BP | 450% | 0.50 GPa |
| PCL | BP | 600% | 0.20 GPa |
| PHA | BP | 300% | 3.40 GPa |
| PLA | CP | 150% | 3.50 GPa |
| PET | SP | 200% | 2.50 GPa |
| PP | SP | 500 | 1.75 GPa |
| ABS | SP | 25 | 2.00 GPa |
| Nylon | SP | 100 | 3.00 GPa |

Figure 20:
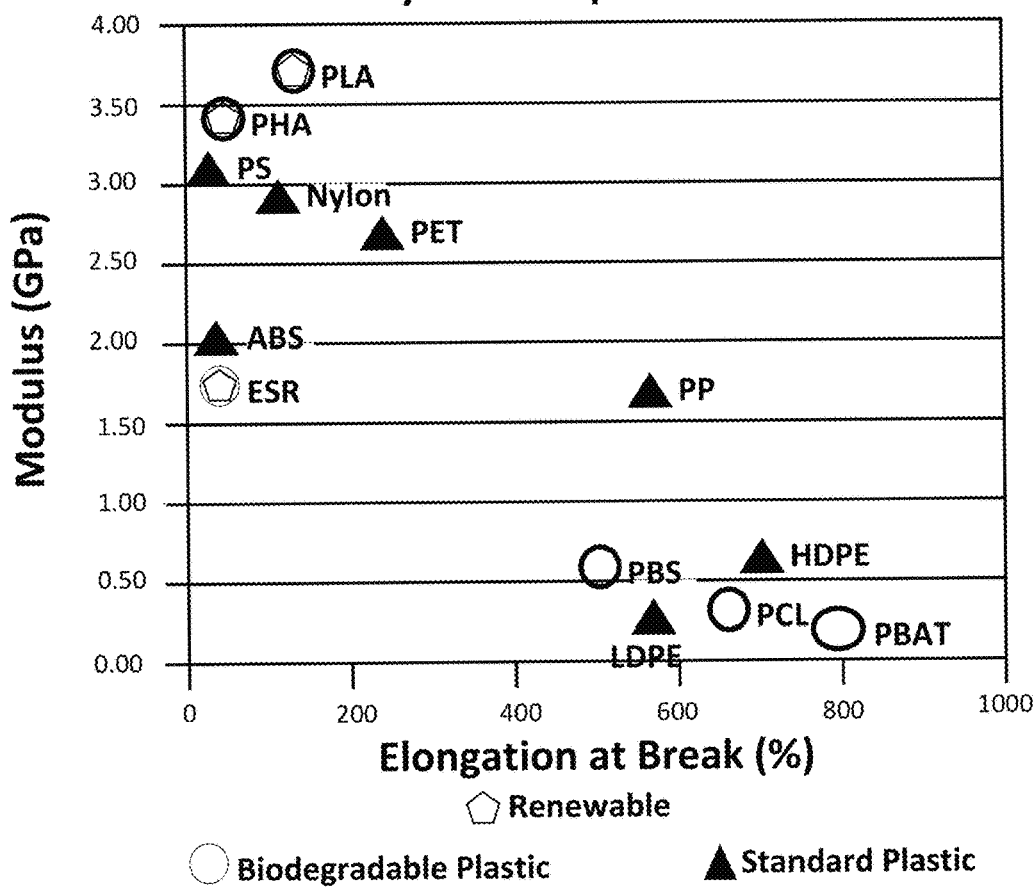
FIG. 20 shows elastic modulus and elongation at break data for various petrochemical plastics that are typically neither biodegradable nor compostable (labeled standard plastics) as well as various plastics that are biodegradable and/or compostable (labeled biodegradable plastics).

FIG. 20 shows similar data as in Table 2, in chart form. PLA is compostable, meaning that it can degrade under elevated temperature conditions (i.e., composting conditions), but is not "biodegradable". The other exemplary materials listed above noted as "BP" are both biodegradable and compostable. FTC Green guidelines stipulate that a plastic cannot make an unqualified claim that it is "degradable" unless it will degrade within a "reasonably short period of time" (most recently defined as within 5 years) "after customary disposal".

The ESR materials described as suitable for use herein as the carbohydrate-based (e.g., starch-based) polymeric material are substantially amorphous. For example, raw starch powder (e.g., such as is used in making ESR and various other thermoplastic starch materials) has approximately a 50% crystalline structure. ESR materials available from BiologiQ differ from many other commercially available thermoplastic starch (TPS) materials in crystallinity versus amorphous characteristics. For example, p. 62-63 of "Thermoplastic Starch Composites and Blends" a PhD thesis by Kris Frost (September 2010) states "[o]f particular interest in TPS is completeness of gelatinisation during processing, and any subsequent tendency toward retrogradation to form V-type amylose crystals". Frost further continues "[g]elatinisation involves loss of granular and crystalline structures by heating with water and often including other plasticizers or modifying polymers. Retrogradation is due to the re-coiling of amylose helical coils. Starch molecules disrupted during gelatinisation slowly re-coil into their native helical arrangements or new single helical conformations known as V type, causing TPS films to rapidly become brittle and lose optical clarity". Thus, conventional TPS tends to re-form a crystalline structure after the gelatinization process used to produce the TPS from raw starch. On the contrary, the ESR material available from BiologiQ does not re-form a crystalline structure and does not become brittle. It remains flexible. In addition, it can maintain a stable, high degree of optical clarity, so as to be useful in forming relatively optically clear films (e.g., particularly by sandwiching ESR between polyethylene or other polyolefin layers).

Figure 21:
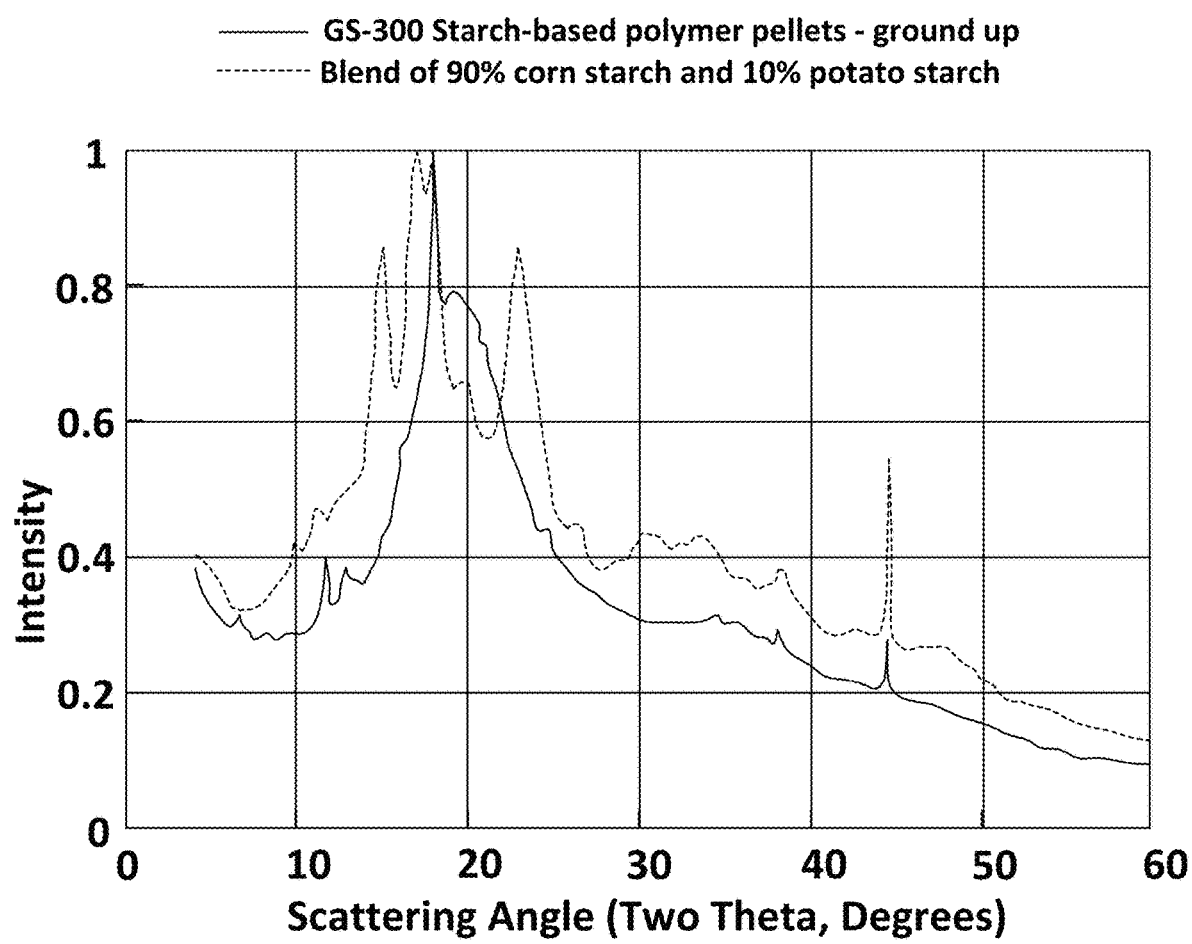
FIG. 21 shows Fourier Transform Infrared Spectroscopy (FTIR) diffraction patterns for an exemplary carbohydrate-based polymeric material commercially available from BiologiQ as compared to that of the blend of native corn starch and native potato starch used to form the carbohydrate-based polymeric material.

In contrast to typical TPS materials, the ESR materials that are suitable examples of starch-based polymeric materials for use in forming articles described in the present application have an amorphous microstructure, and physical characteristics as shown in Table 1. The difference in the molecular structure between conventional TPS and ESR materials is evidenced by the ESR materials as described herein being much less crystalline than conventional thermoplastic starch-based materials as shown by Fourier Transform Infrared Spectroscopy (FTIR), shown in FIG. 21, comparing FTIR diffraction pattern results for ESR material available from BiologiQ (sample 1) as compared to a blend of native raw corn starch and native raw potato starch, from which the ESR in FIG. 21 was formed. The diffraction pattern of the ESR as seen in FIG. 21 is much less crystalline (e.g., crystallinity of less than about 10%) than that of the native starch blend (crystallinity of about 50%).

By way of example, the carbohydrate-based (e.g., starch-based) polymeric material used in making films according to the present disclosure may have a crystallinity of less than about 40%, less than about 35%, less than about 30%, less than about 25%, less than about 20%, less than about 15%, or less than about 10%. Any suitable test mechanism for determining crystallinity may be used, e.g., including but not limited to FTIR analysis, X-ray diffraction methods, and symmetrical reflection and transmission techniques. Various suitable test methods will be apparent to those of skill in the art.

In addition to the differences in the microstructure of the finished ESR as compared to the starting materials, films or other articles produced from a blend including the starch-based polymeric material are different from articles that are otherwise similar, but formed using conventional TPS and starch powder. For example, films formed by blending the starch-based polymeric materials such as ESR as described herein with a petrochemical-based polymeric material do not have "sea-island" features that are common when blending conventional TPS materials with petrochemical-based polymeric materials such as polyethylene. Properties of the different films can be seen by comparing the physical properties of films as shown in Table 11 of Example 5 below. In particular, Table 11 compares the physical properties of films made by blending starch-based polymeric materials as contemplated herein with polyethylene versus a conventional TPS blended with PE (Cardia BL-F). In addition to the differences in properties seen in Table 11, films based on conventional TPS materials such as Cardia BL-F are not biodegradable, and not compostable. As described herein, use of the carbohydrate or starch-based polymeric materials as described herein in forming a film with a petrochemical-based polymeric material results in not just the carbohydrate-based or starch-based material being biodegradable, but at least a portion of the petrochemical-based polymeric material becoming biodegradable, as a result of its blending with the carbohydrate-based or starch-based polymeric materials. Such results do not occur with typical TPS materials. Such differences in biodegradability clearly illustrate that there are significant structural differences in the resulting films and other articles, as the entire composite structure (i.e., the film or other structure) may be capable of being biodegraded, as shown by the various examples below.

Without being bound by theory, it is believed that the amorphous microstructure of the starch-based polymeric material used to produce articles of the subject application at least partially results in the characteristic that at least some of the petrochemical-based polymeric material of the blended article degrades in addition to the starch-based polymeric material. The below examples provide evidence of such. The films and other articles as described herein have biodegradation properties which are not found in conventional articles.

For example, truly biodegradable plastics decompose into natural elements or compounds such as carbon dioxide, methane, water, inorganic compounds, or biomass via microbial assimilation (e.g., the enzymatic action of microorganisms on the plastic molecules). Biodegradation of plastics can be enabled by first breaking down the polymer chains via either chemical or mechanical action but may only be fully accomplished through decomposition of the molecules by microbial assimilation.

Plastics made from petrochemical feedstocks begin life as monomers (e.g., single small molecules that can react chemically with other small molecules). When monomers are joined together, they become polymers ("many parts"), known as plastics. Before being joined together, many monomers are readily biodegradable, although after being linked together through polymerization, the molecules become so large and joined in such arrangements and linkages that microbial assimilation by microorganisms is not practical within any reasonable time frame.

Polymers are formed with both crystalline (regularly packed) structures and amorphous (randomly arranged) structures. Many polymers contain a high degree of crystallinity with some amorphous regions randomly arranged and entangled throughout the polymeric structure.

ESR materials available from BiologiQ are formed from starting starch materials which are highly crystalline, but in which the finished ESR plastic resin material exhibits low crystallinity (substantially amorphous). Such starch-based polymer materials are used as a starting material in the production of articles, such as films, as described herein. ESR is, therefore, plastic that is made from starch. Because of its natural, starch-based origin and carefully controlled linkage types, the molecules (size and links) of plastic made with ESR are highly susceptible to biodegradation by enzymatic reactions caused from the introduction of humidity (water) and bacteria or other microorganisms, as evidenced by the experimental test results included herein.

Polyolefins such as rigid forms of polyethylene and polypropylene have a high degree of crystallinity and are made by converting monomer molecules (usually petroleum derived) into long chain polymers. The bonds created when connecting the monomers to form long polymer chains are strong and difficult to break. Films and other articles formed from such petrochemical-based polymeric materials are not biodegradable. In addition, films and articles including blends of conventional TPS and a petrochemical-based polymeric material (e.g., such as Cardia BL-F) are also not biodegradable.

The present inventors have developed a process for making articles from a blend of a starch-based polymeric material having low crystallinity with polyolefin-based or other polymeric materials, such as polyethylene, that have a relatively high crystallinity. The resulting thermoplastic blend has a higher elastic modulus (stiffness, or strength) than polyethylene and can be used to make plastic films that are stronger than films made with pure polyethylene. For example, Table 11 of Example 5 shows physical properties of films produced with a blend of a petrochemical-based polymeric material and a starch-based polymeric material (such as ESR) as compared to a 100% polyethylene film and as compared to a film formed from a blend of a conventional TPS and polyethylene (i.e., Cardia BL-F), neither of which are biodegradable. Results from third party testing detailed in the Examples show that films according to the present invention exhibit biodegradation of not just the renewable content (i.e., the ESR), but the petrochemical-based or other synthetic polymeric material as well. Such results are particularly surprising, unexpected, and advantageous.

Without being bound to any particular theory, it is believed that the starch-based polymeric resins may reduce the crystallinity of the blended products, interrupting the crystallinity of the polyethylene in a way that allows water and bacteria to degrade the arrangements and linkages of polyethylene molecules of the blend along with the starch-based polymeric resin material. In other words, the long polymer chains of polyethylene are more easily broken by chemical and mechanical forces that exist in environments that are rich in bacteria and microorganisms, when blended with carbohydrate-based or starch-based materials as contemplated herein. Subsequently, the microorganisms that exist naturally in the environment (e.g., in a landfill) can consume the remaining smaller molecules so that they are converted back into natural components (such as $CO_2$, $CH_4$, and $H_2O$).

Returning to FIG. 1, at 106, the process 100 includes mixing the one or more petrochemical-based polymeric materials and the one or more carbohydrate-based polymeric materials to produce a mixture of materials. In some cases, the mixing of the one or more petrochemical-based polymeric materials and the one or more carbohydrate-based materials can be performed using one or more mixing devices. In a particular implementation, a mechanical mixing device can be used to mix the one or more petrochemical-based polymeric materials and the one or more carbohydrate-based polymeric materials. In an implementation, at least a portion of the components of the mixture of the materials can be combined in an apparatus, such as an extruder. In other implementations, at least a portion of the components of the mixture of the materials can be combined before being fed into the extruder.

In various implementations, the one or more carbohydrate-based polymeric materials can be present in the mixture of materials an amount of at least about 5% by weight of the mixture of materials, at least about 10% by weight of the mixture of materials, at least about 15% by weight of the mixture of materials, at least about 20% by weight of the mixture of materials, at least about 25% by weight of the mixture of materials, at least about 30% by weight of the materials, at least about 35% by weight of the mixture of materials, at least about 40% by weight of the mixture of materials, or at least about 45% by weight of the mixture of materials. In other implementations, the one or more carbohydrate-based polymeric materials can be present in the mixture of materials in an amount of no greater than about 99% by weight of the mixture of materials, no greater than about 95% by weight of the mixture of materials, no greater than about 90% by weight of the mixture of materials, no greater than about 80% by weight of the mixture of materials, no greater than about 70% by weight of the mixture of materials, no greater than about 60% by weight of the mixture of materials, or no greater than about 50% by weight of the mixture of materials. Additionally, the one or more carbohydrate-based polymeric materials can be present in the mixture of materials in an amount from about 20% by weight to about 40% by weight of the mixture of materials. In an illustrative example, the mixture of materials can include from about 2% by weight to about 98% by weight of the one or more carbohydrate-based polymeric materials. In another illustrative example, the mixture of materials can include from about 10% by weight to about 40% by weight of the one or more carbohydrate-based polymeric materials. In an additional illustrative example, the mixture of materials can include from about 20% by weight to about 30% by weight of the one or more carbohydrate-based polymeric materials. In a further illustrative example, the mixture of materials can include from about 50% by weight to about 80% by weight of the one or more carbohydrate-based polymeric materials. In still another illustrative example the mixture of materials can include from about 40% by weight to about 60% by weight of the one or more carbohydrate-based polymeric materials.

In some implementations, the mixture of materials can include at least about 10% by weight of the one or more petrochemical-based polymeric materials, at least about 15% by weight of the one or more petrochemical-based polymeric materials, at least about 20% by weight of the one or more petrochemical-based polymeric materials, at least about 25% by weight of the one or more petrochemical-based polymeric materials, at least about 30% by weight of the one or more petrochemical-based polymeric materials, at least about 35% by weight of the one or more petrochemical-based polymeric materials, at least about 40% by weight of the one or more petrochemical-based polymeric materials, at least about 45% by weight of the one or more petrochemical-based polymeric materials, or at least about 50% by weight of the one or more petrochemical-based polymeric materials. In addition, the mixture of materials can include no greater than about 99% by weight of the one or more petrochemical-based polymeric materials, no greater than about 95% by weight of the one or more petrochemical-based polymeric materials, no greater than about 90% by weight of the one or more petrochemical-based polymeric materials, no greater than about 85% by weight of the one or more petrochemical-based polymeric materials, no greater than about 80% by weight of the one or more petrochemical-based polymeric materials, no greater than about 75% by weight of the one or more petrochemical-based polymeric materials, no greater than about 70% by weight of the one or more petrochemical-based polymeric materials, no greater than about 65% by weight of the one or more petrochemical-based polymeric materials, or no greater than about 60% by weight of the one or more petrochemical-based polymeric materials. In an illustrative example, the mixture of materials can include from about 2% by weight to about 98% by weight of the one or more petrochemical-based polymeric materials. In another illustrative example, the mixture of materials can include from about 50% by weight to about 90% by weight of the one or more petrochemical-based polymeric materials. In an additional illustrative example, the mixture of materials can include from about 65% by weight to about 75% by weight of the one or more petrochemical-based polymeric materials. In a further illustrative example, the mixture of materials can include from about 20% by weight to about 50% by weight of the one or more petrochemical-based polymeric materials. In still another illustrative example, the mixture of materials can include from about 40% by weight to about 60% by weight of the one or more petrochemical-based polymeric materials.

In some cases, the mixture of materials can include a blend of a first petrochemical-based polymeric material and a second petrochemical based polymeric material, where the second petrochemical-based polymeric material can be compostable. That is, in some cases, the second petrochemical-based polymeric material can be compostable according to the ASTM D-6400 standard at the time of filing of this patent application.

In an implementation, when the mixture of materials includes a first petrochemical-based polymeric material and a second petrochemical-based polymeric material, the mixture of materials can include at least about 10% by weight of the first petrochemical-based polymeric material, at least about 15% by weight of the first petrochemical-based polymeric material, at least about 20% by weight of the first petrochemical-based polymeric material, or at least about 25% by weight of the first petrochemical-based polymeric material. Additionally, when the mixture of materials includes a first petrochemical-based polymeric material and a second petrochemical-based polymeric material, the mixture of materials can include no greater than about 50% by weight of the first petrochemical-based polymeric material, no greater than about 45% by weight of the first petrochemical-based polymeric material, no greater than about 40% by weight of the first petrochemical-based polymeric material, no greater than about 35% by weight of the first petrochemical-based polymeric material, or no greater than about 30% by weight of the first petrochemical-based polymeric material. In an illustrative example when the mixture of materials includes a first petrochemical-based polymeric material and a second petrochemical-based polymeric material, the mixture of materials can include from about 5% by weight to about 55% by weight of the first petrochemical-based polymeric material. In another illustrative example when the mixture of materials includes a first petrochemical-based polymeric material and a second petrochemical-based polymeric material, the mixture of materials can include from about 10% by weight to about 30% by weight of the first petrochemical-based polymeric material. In an additional illustrative example when the mixture of materials includes a first petrochemical-based polymeric material and a second petrochemical-based polymeric material, the mixture of materials can include from about 12% by weight to about 20% by weight of the first petrochemical-based polymeric material. In some instances, the first petrochemical-based polymeric material can include a polyethylene. To illustrate, the first petrochemical-based polymeric material can include a linear low density polyethylene. In some cases, the first petrochemical-based polymeric material may not be compostable according to the ASTM D-6400 standard.

Furthermore, when the mixture of materials includes a first petrochemical-based polymeric material and a second petrochemical-based polymeric material, the mixture of materials can include at least about 25% by weight of the second petrochemical-based polymeric material, at least about 30% by weight of the second petrochemical-based polymeric material, at least about 35% by weight of the second petrochemical-based polymeric material, at least about 40% by weight of the second petrochemical-based polymeric material, or at least about 45% by weight of the second petrochemical-based polymeric material. Also, when the mixture of materials includes a first petrochemical-based polymeric material and a second petrochemical-based polymeric material, the mixture of materials can include no greater than about 75% by weight of the second petrochemical-based polymeric material, no greater than about 70% by weight of the second petrochemical-based polymeric material, no greater than about 65% by weight of the second petrochemical-based polymeric material, no greater than about 60% by weight of the second petrochemical-based polymeric material, no greater than about 55% by weight of the second petrochemical-based polymeric material, or no greater than about 50% by weight of the second petrochemical-based polymeric material. In an illustrative example when the mixture of materials includes a first petrochemical-based polymeric material and a second petrochemical-based polymeric material, the mixture of materials can include from about 20% by weight to about 80% by weight of the second petrochemical-based polymeric material. In another illustrative example when the mixture of materials includes a first petrochemical-based polymeric material and a second petrochemical-based polymeric material, the mixture of materials can include from about 35% by weight to about 60% by weight of the second petrochemical-based polymeric material. In an additional illustrative example when the mixture of materials includes a first petrochemical-based polymeric material and a second petrochemical-based polymeric material, the mixture of materials can include from about 45% by weight to about 55% by weight of the second petrochemical-based polymeric material.

In particular implementations when the mixture of materials includes a first petrochemical-based polymeric material and a second petrochemical-based polymeric material, the mixture of materials can include from about 5% by weight to about 25% by weight of the first petrochemical-based polymeric material and from about 40% by weight to about 60% by weight of the second petrochemical-based polymeric material. In other implementations when the mixture of materials includes a first petrochemical-based polymeric material and a second petrochemical-based polymeric material, the mixture of materials can include from about 10% by weight to about 20% by weight of the first petrochemical-based polymeric material and from about 45% by weigh to about 55% by weight of the second petrochemical-based polymeric material.

In some embodiments, a compatibilizer can also be present in the mixture of materials. In a particular implementation, a compatibilizer can be mixed with the one or more petrochemical-based polymeric materials and the one or more carbohydrate-based polymeric materials and be included in the mixture of materials. The compatibilizer can be a modified polyolefin, such as a maleic anhydride grafted polypropylene, a maleic anhydride grafted polyethylene, a maleic anhydride grafted polybutene, or a combination thereof. The compatibilizer can also include an acrylate based co-polymer. For example, the compatibilizer can include an ethylene methyl acrylate co-polymer, an ethylene butyl-acrylate co-polymer, or an ethylene ethyl acrylate co-polymer. Additionally, the compatibilizer can include a poly(vinyacetate) based compatibilizer. In an embodiment, the compatibilizer may be a grafted version of the petrochemical-based polymeric material (e.g., maleic anhydride grafted polyethylene where the petrochemical-based polymeric material is polyethylene).

In an implementation, the mixture of materials (e.g., carbohydrate-based polymeric material, petrochemical-based polymeric material, and compatibilizer) can include at least about 0.5% by weight of a compatibilizer, at least about 1% by weight of a compatibilizer, at least about 2% by weight of a compatibilizer, at least about 3% by weight of a compatibilizer, at least about 4% by weight of a compatibilizer, or at least about 5% by weight of a compatibilizer. Additionally, the mixture of materials can include no greater than about 50% by weight compatilizer, no greater than about 40% by weight compatilizer, no greater than about 30% by weight compatilizer, no greater than about 20% by weight compatilizer no greater than about 10% by weight of a compatibilizer, no greater than about 9% by weight of a compatibilizer, no greater than about 8% by weight of a compatibilizer, no greater than about 7% by weight of a compatibilizer, or no greater than about 6% by weight of a compatibilizer. In an illustrative example, the mixture of materials can include from about 0.5% by weight to about 12% by weight of a compatibilizer. In another illustrative example, the mixture of materials can include from about 2% by weight to about 7% by weight of a compatibilizer. In an additional illustrative example, the mixture of materials can include from about 4% by weight to about 6% by weight of a compatibilizer. As noted, in some implementations, it may be possible to employ far higher fractions of a compatibilizer (e.g., as up to 50%).

In other implementations, the mixture of materials can include at least about 0.5% by weight of a compatibilizer, at least about 3% by weight of a compatibilizer, at least about 10% by weight of a compatibilizer, at least about 15% by weight of a compatibilizer, at least about 20% by weight of a compatibilizer, or at least about 25% by weight of a compatibilizer. In addition, the mixture of materials can include no greater than about 50% by weight of a compatibilizer, no greater than about 45% by weight of a compatibilizer, no greater than about 40% by weight of a compatibilizer, no greater than about 35% by weight of a compatibilizer, or no greater than about 30% by weight of a compatibilizer. In an illustrative example, the mixture of materials can include from about 0.1% by weight to about 50% by weight of a compatibilizer. In another illustrative example, the mixture of materials can include from about 1% by weight to about 35% by weight of a compatibilizer. In an additional illustrative example, the mixture of materials can include from about 2% by weight to about 15% by weight of a compatibilizer. In a further illustrative example, the mixture of materials can include from about 3% by weight to about 7% by weight of a compatibilizer.

Furthermore, other additives can be included in the mixture of materials including the carbohydrate-based polymeric material and petrochemical-based polymeric material. For example, additives that aid in the biodegradation of an article can be included in the mixture of materials, such as variety of UV and OXO degradable additives, such as Restore® by Enso, EcoPure® by Bio-Tec Environmental, ECM Masterbatch Pellets IM by ECM Biofilms, or Biodegradable 201 and/or Biodegradable 302 BioSphere®. That said, test results included herein show that inclusion of ESR carbohydrate-based polymeric materials in the mixture, without addition of other biodegradation additives, can provide excellent biodegradation results to the films or other articles formed from the carbohydrate-based polymeric material, a compatibilizer, and the petrochemical-based polymeric material without any need for such addition. Also, other additives that improve strength characteristics of the article can be added to the mixture of materials. Additives such as Biomax® Strong from Dupont can be used. In various embodiments, one or more additives can be included in the mixture of materials in an amount of at least about 0.5% by weight, at least about 1% by weight, at least about 1.5% by weight, at least about 2% by weight, at least about 2.5% by weight, at least about 3% by weight, or at least about 4% by weight. In further embodiments, one or more additives can be present in the mixture of materials in an amount of no greater than about 10% by weight, no greater than about 9% by weight, no greater than about 8% by weight, no greater than about 7% by weight, no greater than about 6% by weight, or no greater than about 5% by weight. In an illustrative example, one or more additives can be present in the mixture of materials in an amount from about 0.20% by weight to about 12% by weight. In another illustrative example, one or more additives can be present in the mixture of materials in an amount from about 1% by weight to about 10% by weight. In an additional example, one or more additives can be present in the mixture of materials in an amount from about 0.5% by weight to about 4% by weight. In a further illustrative example, one or more additives can be present in the mixture of materials in an amount from about 2% by weight to about 6% by weight.

Referring to FIG. 1, at 108, the process 100 includes heating the mixture of materials. In an implementation, the mixture of materials can be heated to a temperature of at least about 100° C., at least about 110° C., at least about 115° C., at least about 120° C., at least about 125° C., at least about 130° C., at least about 135° C., at least about 140° C., or at least about 145° C. In another implementation, the mixture of materials can be heated to a temperature no greater than about 200° C., no greater than about 190° C., no greater than about 180° C., no greater than about 175° C., no greater than about 170° C., no greater than about 165° C., no greater than about 160° C., no greater than about 155° C., or no greater than about 150° C. In an illustrative example, the mixture of materials can be heated to a temperature from about 95° C. to about 205° C. In another illustrative example, the mixture of materials can be heated to a temperature from about 120° C. to about 180° C. In an additional illustrative example, the mixture of materials can be heated to a temperature from about 125° C. to about 165° C.

The mixture of materials including the petrochemical based polymeric material and carbohydrate-based polymeric material can be heated in one or more chambers of an extruder. In some cases, one or more chambers of the extruder can be heated at different temperatures. In other cases, one or more chambers of the extruder can be heated at substantially a same temperature. In various embodiments, the extruder can have at least one chamber, at least two chambers, at least three chambers, at least four chambers, at least five chambers, at least six chambers, at least seven chambers, at least eight chambers, at least nine chambers, or at least ten chambers. In other embodiments, the extruder can have one chamber, two chambers, three chambers, four chambers, five chambers, six chambers, seven chambers, eight chambers, nine chambers, or ten chambers. In further embodiments, the extruder can have less than three chambers, less than four chambers, less than five chambers, less than six chambers, less than seven chambers, less than eight chambers, less than nine chambers, or less than ten chambers.

The speed of one or more screws of the extruder can be at least about 10 rotations per minute (rpm), at least about 12 rpm, at least about 14 rpm, at least about 16 rpm, or at least about 18 rpm. Additionally, the speed of one or more screws of the extruder can be no greater than about 30 rpm, no greater than about 28 rpm, no greater than about 26 rpm, no greater than about 24 rpm, no greater than about 22 rpm, or no greater than about 20 rpm. In an illustrative example, the speed of one or more screws of the extruder can be from about 8 rpm to about 35 rpm. In another illustrative example, the speed of one or more screws of the extruder can be from about 12 rpm to about 25 rpm. In an additional illustrative example, the speed of one or more screws of the extruder can be from about 14 rpm to about 21 rpm.

At 110, an article is produced using the mixture of materials. In some cases, the article can include a film. In other cases, the article can be formed from a film. In still additional situations, the article can have a shape based on a design, such as a mold. In some cases, when the article is a film, the film can be formed using a die and injecting a gas into the heated mixture of material to form the film. The film can then be molded and/or modified to be in the form of a bag or other article.

In an implementation, the article can have from about 10% by weight to about 95% by weight of one or more petrochemical-based polymeric materials, from about 20% by weight to about 80% by weight of one or more petrochemical-based polymeric materials, from about 30% by weight to about 70% by weight of one or more petrochemical-based polymeric materials, or from about 40% by weight to about 60% by weight of one or more petrochemical-based polymeric materials. In an illustrative example, the article can have from about 60% by weight to about 80% by weight of one or more petrochemical-based polymeric materials. In some cases, the article can include a mixture of a first petrochemical-based polymeric material and a second petrochemical-based polymeric material, where the second petrochemical-based polymeric material is compostable. In these situations, the article can include from about 5% by weight to about 30% by weight of the first petrochemical-based polymeric material and from about 35% by weight to about 60% by weight of the second petrochemical-based polymeric material. In another implementation, the article can include from about 10% by weight to about 20% by weight of the first petrochemical-based polymeric material and from about 45% by weight to about 55% by weight of the second petrochemical-based polymeric material.

Additionally, the article can have from about 10% by weight to about 98% by weight of one of more carbohydrate-based polymeric materials, from about 20% by weight to about 80% by weight of one or more carbohydrate-based polymeric materials, from about 30% by weight to about 70% by weight of one or more carbohydrate-based polymeric materials, or from about 40% by weight to about 60% by weight of one or more carbohydrate-based polymeric materials. In an illustrative example, the article can include from about 15% by weight to about 30% by weight of one or more carbohydrate-based polymeric materials. In another illustrative example, the article can include from about 10% by weight to about 25% by weight of one or more carbohydrate-based polymeric materials. In a particular implementation, the article can include at least about 95% by weight of one or more carbohydrate-based polymeric materials or at least about 99% by weight of one or more carbohydrate-based polymeric materials.

In embodiments where the article is a film, the film can be comprised of a single layer, in some cases, and multiple layers, in other cases. One or more layers of the film can have a thickness of at least about 0.01 mm, at least about 0.02 mm, at least about 0.03 mm, at least about 0.05 mm, at least about 0.07 mm, at least about 0.10 mm, at least 0.2 mm, at least about 0.5 mm, at least about 0.7 mm, at least about 1 mm, at least about 2 mm, or at least about 5 mm. Additionally, when the article is a film, one or more layers of the film can have a thickness of no greater than about 2 cm, no greater than about 1.5 cm, no greater than about 1 cm, no greater than about 0.5 cm, no greater than about 100 mm, no greater than about 80 mm, no greater than about 60 mm, no greater than about 40 mm, no greater than about 30 mm, no greater than about 20 mm, or no greater than about 10 mm. In an illustrative example, when the article is a film, one or more layers of the film can have a thickness as little as about 0.1 mil (0.0025 mm), or from about 0.005 mm to about 3 cm. In another illustrative example, when the article is a film, one or more layers of the film can have a thickness from about 0.01 mm to about 1 mm. In an additional illustrative example, when the article is a film, one or more layers of the film can have a thickness from about 0.05 mm to about 0.5 mm. In a further illustrative example, when the article is a film, one or more layers of the film can have a thickness from about 0.02 mm to about 0.05 mm.

The article can have strength characteristics that are characterized through testing, such as a dart drop impact test (ASTM D-1709), tensile strength at break test (ASTM D-882), tensile elongation at break test (ASTM D-882), a secant modulus test (ASTM D-882), and/or an Elmendorf Tear test (ASTM D-1922). In an implementation, the article can have a dart drop impact test value of at least about 150 g, at least about 175 g, at least about 200 g, at least about 225 g, at least about 250 g, at least about 275 g, or at least about 300 g. In another implementation, the article can have a dart drop impact test value of no greater than about 400 g, no greater than about 375 g, no greater than about 350 g, or no greater than about 325 g. In an illustrative implementation, the article can have a dart drop impact test value from about 140 g to about 425 g. In another illustrative implementation, the article can have a dart drop impact test value from about 200 g to about 400 g. In an additional illustrative example, the article can have a dart drop impact test value from about 250 g to about 350 g. In a further illustrative example, the article can have a dart drop impact test value from about 265 g to about 330 g. In an implementation, such values may be for whatever the thickness of the film. In another implementation, such values may be per mil of thickness.

In an implementation, the article can have a tensile strength at break test value in the machine direction of at least about 3.5 kpsi, at least about 3.7 kpsi, at least about 3.9 kpsi, at least about 4.1 kpsi, at least about 4.3 kpsi, or at least about 4.5 kpsi. In another implementation, the article can have a tensile strength at break test value in the machine direction of no greater than about 5.5 kpsi, no greater than about 5.3 kpsi, no greater than about 5.1 kpsi, no greater than about 4.9 kpsi, or no greater than about 4.7 kpsi. In an illustrative example, the article can have a tensile strength at break test value in the machine direction from about 3.5 kpsi to about 5.5 kpsi. In another illustrative example, the article can have a tensile strength at break test value in the machine direction from about 4.1 kpsi to about 4.9 kpsi.

In an implementation, the article can have a tensile strength at break test value in the transverse direction of at least about 3.2 kpsi, at least about 3.4 kpsi, at least about 3.6 kpsi, at least about 3.8 kpsi, at least about 4.0 kpsi, or at least about 4.2 kpsi. In another implementation, the article can have a tensile strength at break test value in the transverse direction of no greater than about 5.7 kpsi, no greater than about 5.5 kpsi, no greater than about 5.3 kpsi, no greater than about 5.1 kpsi, no greater than about 4.9 kpsi, no greater than about 4.7 kpsi, or no greater than about 4.5 kpsi. In an illustrative example, the article can have a tensile strength at break test value in the transverse direction from about 3.2 kpsi to about 5.7 kpsi. In another illustrative example, the article can have a tensile strength at break test value in the transverse direction from about 3.6 kpsi to about 5.0 kpsi.

In an implementation, the article can have a tensile elongation at break test value in the machine direction of at least about 550%, at least about 560%, at least about 570%, at least about 580%, at least about 590%, at least about 600%, at least about 610%, or at least about 620%. In another implementation, the article can have a tensile elongation at break test value in the machine direction of no greater than about 725%, no greater than about 710%, no greater than about 700%, no greater than about 680%, no greater than about 665%, no greater than about 650%, or no greater than about 635%. In an illustrative example, the article can have a tensile elongation at break test value in the machine direction from about 550% to about 750%. In another illustrative example, the article can have a tensile elongation at break test value in the machine direction from about 600% to about 660%.

In an implementation, the article can have a tensile elongation at break test value in the transverse direction of at least about 575%, at least about 590%, at least about 600%, at least about 615%, at least about 630%, or at least about 645%. In another implementation, the article can have a tensile elongation at break test value in the transverse direction of no greater than about 770%, no greater than about 755%, no greater than about 740%, no greater than about 725%, no greater than about 710%, no greater than about 695%, or no greater than about 680%. In an illustrative example, the article can have a tensile elongation at break test value in the transverse direction from about 575% to about 775%. In another illustrative example, the article can have a tensile elongation at break test value in the transverse direction from about 625% to about 700%.

In an implementation, the article can have an Elmendorf tear force test value in the machine direction of at least about 280 g/mil, at least about 300 g/mil, at least about 320 g/mil, at least about 340 g/mil, or at least about 360 g/mil. In another implementation, the article can have an Elmendorf tear force test value in the machine direction of no greater than about 450 g/mil, no greater than about 430 g/mil, no greater than about 410 g/mil, no greater than about 390 g/mil, or no greater than about 370 g/mil. In an illustrative example, the article can have an Elmendorf tear force test value Sin the machine direction from about 275 g/mil to about 475 g/mil. In another illustrative example, the article can have an Elmendorf tear force test value in the machine direction from about 325 g/mil to about 410 g/mil.

In an implementation, the article can have an Elmendorf tear force test value in the transverse direction of at least about 475 g/mil, at least about 490 g/mil, at least about 500 g/mil, at least about 525 g/mil, at least about 540 g/mil, or at least about 550 g/mil. In another implementation, the article can have an Elmendorf tear force test value in the transverse direction of no greater than about 700 g/mil, no greater than about 680 g/mil, no greater than about 650 g/mil, no greater than about 625 g/mil, no greater than about 600 g/mil, no greater than about 580 g/mil, or no greater than about 570 g/mil. In an illustrative example, the article can have an Elmendorf tear force test value in the transverse direction from about 475 g/mil to about 725 g/mil. In another illustrative example, the article can have an Elmendorf tear force test value in the transverse direction from about 490 g/mil to about 640 g/mil.

In an implementation, the article can have a secant modulus of elasticity test value in the machine direction of at least about 20 kpsi, at least about 22 kpsi, at least about 24 kpsi, at least about 26 kpsi, at least about 28 kpsi, or at least about 30 kpsi. In another implementation, the article can have a secant modulus of elasticity test value in the machine direction of no greater than about 40 kpsi, no greater than about 38 kpsi, no greater than about 36 kpsi, no greater than about 34 kpsi, or no greater than about 32 kpsi. In an illustrative example, the article can have a secant modulus of elasticity test value in the machine direction from about 20 kpsi to about 40 kpsi. In another illustrative example, the article can have a secant modulus of elasticity test value in the machine direction from about 25 kpsi to about 35 kpsi.

In an implementation, the article can have a secant modulus of elasticity test value in the transverse direction of at least about 20 kpsi, at least about 22 kpsi, at least about 24 kpsi, at least about 26 kpsi, at least about 28 kpsi, or at least about 30 kpsi. In another implementation, the article can have a secant modulus of elasticity test value in the transverse direction of no greater than about 40 kpsi, no greater than about 38 kpsi, no greater than about 36 kpsi, no greater than about 34 kpsi, or no greater than about 32 kpsi. In an illustrative example, the article can have a secant modulus of elasticity test value in the transverse direction from about 20 kpsi to about 40 kpsi. In another illustrative example, the article can have a secant modulus of elasticity test value in the transverse direction from about 25 kpsi to about 35 kpsi.

In some cases, articles including a carbohydrate-based polymeric material formed from a mixture of two or more starches have values of strength properties that are greater than articles including a carbohydrate-based polymeric material formed from a single starch. For example, an article including a carbohydrate-based polymeric material formed from a mixture of two or more starches can have a dart drop impact test value (in grams or g/mil of thickness) that is at least about 10% greater than an article where the carbohydrate-based polymeric material is formed from a single starch, at least about 25% greater than an article where the carbohydrate-based polymeric material is formed from a single starch, at least about 50% greater than an article where the carbohydrate-based polymeric material is formed from a single starch, at least about 75% greater than an article where the carbohydrate-based polymeric material is formed from a single starch, or at least about 90% greater than an article where the carbohydrate-based polymeric material is formed from a single starch. In another example, an article including a carbohydrate-based polymeric material formed from a mixture of two or more starches can have a dart drop impact test value that is no greater than about 150% greater than an article where the carbohydrate-based polymeric material is formed from a single starch, no greater than about 140% greater than an article where the carbohydrate-based polymeric material is formed from a single starch, no greater than about 130% greater than an article where the carbohydrate-based polymeric material is formed from a single starch, no greater than about 130% greater than an article where the carbohydrate-based polymeric material is formed from a single starch, no greater than about 120% greater than an article where the carbohydrate-based polymeric material is formed from a single starch, or no greater than at least about 110% greater than an article where the carbohydrate-based polymeric material is formed from a single starch. In an illustrative example, an article including a carbohydrate-based polymeric material formed from a mixture of two or more starches can have a dart drop impact test value that is from at least about 10% to about 150% greater than an article where the carbohydrate-based polymeric material is formed from a single starch. In another illustrative example, an article where the carbohydrate-based polymeric material is formed from a mixture of two or more starches can have a dart drop impact test value that is from at least about 60% to about 120% greater than an article including a carbohydrate-based polymeric material formed from a single starch.

In various embodiments, an article including a carbohydrate-based polymeric material formed from a mixture of a first starch and a second starch can have a strength test value that is greater than an otherwise comparable article including a starch-based polymeric material formed from only the first or second starch, without the presence of two different starches. For example, an article including a carbohydrate-based polymeric material formed from a mixture of a first starch and a second starch (e.g., potato starch and another starch) can have a dart drop impact test value that is greater than a first dart drop impact test value of an otherwise comparable article where the starch-based polymeric material is formed from only a single starch (e.g., just potato starch, or just the other starch). In other words, where the starch-based polymeric material that goes into the article is formed from two or more types of starches the resulting strength is greater than if either starch were used alone to make the starch-based polymeric material. There is thus a synergistic strengthening effect that is achieved when using two or more different starches to make the starch-based polymeric material that is included in the article.

In further implementations, an article including a carbohydrate-based polymeric material formed from a mixture of a first starch and a second starch can have a strength test value that is greater than a strength test value of an article formed from a petrochemical-based polymeric material without the carbohydrate-based polymeric material. For example, an article including a carbohydrate-based polymeric material formed from a mixture of a first starch and a second starch can have a tensile elongation at break test value in the machine direction that is greater than a tensile elongation at break test value in the machine direction of an article formed from a petrochemical-based polymeric material without the carbohydrate-based polymeric material. Increased strength results can be measured for dart drop impact strength, tensile strength at break, secant modulus strength, and/or Elmendorf Tear strength. Other strength tests could similarly show such improvements.

In an implementation, when subjected to biodegradation testing, an article being substantially free of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 32 days of testing under a biomethane potential test from about 10% to about 22%. In another implementation, when subjected to biomethane potential testing, an article being substantially free of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 62 days of testing under a biomethane potential test from about 25% to about 35%. In an additional implementation, when subjected to biodegradation testing, an article being substantially free of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 91 days of testing under a biomethane potential test from about 30% to about 40%. While the above percentages may result under biomethane potential testing conditions, it will be appreciated that such simulated conditions are not required, and that of course such biodegradation may also result under other testing conditions (e.g., under any appropriate ASTM or similar conditions meant to simulate landfill, composting, and/or marine conditions), over an appropriate period of time (e.g., 90 days, 180 days, 1 year, 2 years, 3 years, 5 years, or the like).

Particularly when subjecting the present articles to testing simulating biodegradation under landfill or other degradation conditions (e.g., composting conditions, or marine conditions) for greater periods of time (e.g., 180 days, 200 days, 365 days (1 year), within 2 years, or within 3 years), the biodegradation can be greater than the weight percent of carbohydrate-based polymeric materials within the article. In other words, inclusion of the described carbohydrate-based polymeric materials can result in at least some biodegradation of the petrochemical-based polymeric material (which materials alone are not biodegradable). For example, an article that is a film formed from a blend of the carbohydrate-based polymeric materials and LLDPE (e.g., a bag), may exhibit biodegradation after such periods of time that is greater than the weight fraction of the carbohydrate-based polymeric materials in the film, indicating that the LLDPE (heretofore considered to not be biodegradable) is actually being biodegraded, with the carbohydrate-based polymeric material. Such results are surprising, and particularly advantageous. For example, such a bag or other film article not only exhibits increased environmental sustainability (as a significant fraction thereof is sourced from a renewable starch material), but it now also exhibits biodegradability characteristics, where the comparable bag or other film formed from 100% LLDPE (or even a blend of conventional TPS and LLDPE) did not have such characteristics. Furthermore, as described above, the strength of the bag or film can be greater than that of the 100% LLDPE bag or film. Even cost can be comparable. Such a collection of characteristics marks a significant advancement in the art.

The biomethane potential testing can determine the potential for anaerobic biodegradation based on methanogenesis as a percent of total methanogenesis potential. In some cases, the biomethane potential testing can be used to predict biodegradability of the tested samples according to the ASTM D-5511 standard and the biomethane potential testing can be conducted using one or more conditions from the ASTM D-5511 standard. For example, the biomethane potential testing can take place at a temperature of about 52° C. Additionally, the biomethane potential testing can have some conditions that are different from those of ASTM D-5511. In an implementation, the biomethane potential testing can utilize an inoculum having from about 50% by weight water to about 60% by weight water and from about 40% by weight organic solids to about 50% by weight organic solids. In a particular illustrative example, the inoculum used in biomethane potential testing can have about 55% by weight water and about 45% by weight organic solids. Biomethane potential testing can also take place at other temperatures, such as from about 35° C. to about 55° C. or from about 40° C. to about 50° C.

In various implementations, an article being substantially free of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 91 days of testing under a biomethane potential test (or other biodegradation test conditions) that is greater than an amount of the one or more carbohydrate based polymeric materials present in the article. For example, an amount of biodegradation of an article being substantially free of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 91 days of testing under a biomethane potential test (or other biodegradation test conditions) that is from about 5% to about 60%, from about 10% to about 50%, or from about 15% to about 40% greater than the amount of the one or more carbohydrate-based polymeric materials present in the article.

In other implementations, an article being substantially free of a biodegradation enhancing additive and having from about 95% by weight to substantially all of one or more carbohydrate-based polymeric materials can have an amount of biodegradation after 32 days of testing under a biomethane potential test from about 30% to about 45%. Further, an article being substantially free of a biodegradation enhancing additive and having from about 95% by weight to substantially all of one or more carbohydrate-based polymeric materials can have an amount of biodegradation after 62 days of testing under a biomethane potential test from about 40% to about 55%. In additional implementations, an article being substantially free of a biodegradation enhancing additive and having from about 95% by weight to substantially all of one or more carbohydrate-based polymeric materials can have an amount of biodegradation after 91 days of testing under a biomethane potential test from about 48% to about 62%.

In addition, when subjected to biodegradation testing, an article having no greater than about 2% by weight of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 32 days of testing under a biomethane potential test from about 9% to about 20%. In another implementation, when subjected to biodegradation testing, an article having no greater than about 2% by weight of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 62 days of testing under a biomethane potential test from about 20% to about 32%. In an additional implementation, when subjected to biodegradation testing, an article having no greater than about 2% by weight of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 91 days of testing under a biomethane potential test from about 37% to about 50%. In various situations, biodegradation test values can also be determined using ASTM standards, such as ASTM D-6400, ASTM D-5338, ASTM D-5988, ASTM D-5511, ASTM D-7475, ASTM D-5526 or ASTM D-6691.

In addition, an article can be subjected to compostability testing. Compostability of articles can be performed in accordance with the ASTM D-6400 test at the time of filing of this patent application. In some cases, phytotoxicity corresponding to the biodegradation of articles can be measured, biodegradation of articles can be measured, an elemental/metals analysis with regard to the articles can be performed, or a combination thereof.

Articles produced using the process 100 can pass the phytotoxicity component of the ASTM D-6400 test. For example, a biomass in which the article has at least partially degraded can be used to germinate plant seeds, such as cucumber seeds and/or soybean seeds. The length of the germinated plants can be measured and compared to a threshold length to determine if the article passes the phytotoxicity portion of the ASTM D-6400 test. In a particular implementation, a length of a cucumber plant germinated from seed in a biomass of an article produced according to the process 100 can be from about 58 mm to about 75 mm. Additionally, a length of a soybean plant germinated from seed in a biomass of an article produced according to the process 100 can be from about 135 mm to about 175 mm.

As part of the elemental analysis component of the ASTM D-6400 test, an analysis of elements included in a biomass of articles produced using the process 100 can be performed. For example, amounts of one or more of the following elements can be measured: arsenic, cadmium, copper, lead, mercury, nickel, selenium, or zinc. The amounts measured for each of the elements can be compared to a threshold amount to determine whether the sample passed the elemental analysis portion of the ASTM D-6400 test for the respective elements.

Also, when articles produced according to the process 100 are subjected to compostability testing under the ASTM D-6400 standard, an amount of $CO_2$ emitted in the test chamber after 98 days can be measured and can be at least about 10% of theoretical maximum $CO_2$ emissions, at least about 12% of theoretical maximum $CO_2$ emissions, at least about 14% of theoretical maximum $CO_2$ emissions, at least about 16% of theoretical maximum $CO_2$ emissions, at least about 18% of theoretical maximum $CO_2$ emissions, at least about 20% of theoretical maximum $CO_2$ emissions, at least about 22% of theoretical maximum $CO_2$ emissions, at least about 24% of theoretical maximum $CO_2$ emissions, or at least about 26% of theoretical maximum $CO_2$ emissions. In addition, when articles produced according to the process 100 are subjected to compostability testing under the ASTM D-6400 standard, an amount of $CO_2$ emitted in the test chamber after 98 days can be no greater than about 50% of theoretical maximum $CO_2$ emissions, no greater than about 48% of theoretical maximum $CO_2$ emissions, no greater than bout 45% of theoretical maximum $CO_2$ emissions, no greater than about 42% of theoretical maximum $CO_2$ emissions, no greater than about 40% of theoretical maximum $CO_2$ emissions, no greater than about 38% of theoretical maximum $CO_2$ emissions, no greater than about 35% of theoretical maximum $CO_2$ emissions, no greater than about 32% of theoretical maximum $CO_2$ emissions, or no greater than about 30% of theoretical maximum $CO_2$ emissions. In an illustrative example, when articles produced according to the process 100 are subjected to compostability testing under the ASTM D-6400 standard, an amount of $CO_2$ emitted in the test chamber after 98 days can be from about 8% of theoretical maximum $CO_2$ emissions to about 55% of theoretical maximum $CO_2$ emissions. In another illustrative example, when articles produced according to the process 100 are subjected to compostability testing under the ASTM D-6400 standard, an amount of $CO_2$ emitted in the test chamber after 98 days can be from about 15% of theoretical maximum $CO_2$ emissions to about 35% of theoretical maximum $CO_2$ emissions. In an additional illustrative example, when articles produced according to the process 100 are subjected to compostability testing under the ASTM D-6400 standard, an amount of $CO_2$ emitted in the test chamber after 98 days can be from about 18% of theoretical maximum $CO_2$ emissions to about 30% of theoretical maximum $CO_2$ emissions.

Additionally, when subjected to compostability testing under the ASTM D-6400 standard, an amount of $CO_2$ emitted in the test chamber after 180 days can be at least about 35% of theoretical maximum $CO_2$ emissions, at least about 40% of theoretical maximum $CO_2$ emissions, at least about 45% of theoretical maximum $CO_2$ emissions, or at least about 50% of theoretical maximum $CO_2$ emissions, or at least about 55% of theoretical maximum $CO_2$ emissions. Further, when subjected to compostability testing under the ASTM D-6400 standard, an amount of $CO_2$ emitted in the test chamber after 180 days can be no greater than about 85% of theoretical maximum $CO_2$ emissions, no greater than about 80% of theoretical maximum $CO_2$ emissions, no greater than about 75% of theoretical maximum $CO_2$ emissions, no greater than about 70% of theoretical maximum $CO_2$ emissions, no greater than about 65% of theoretical maximum $CO_2$ emissions, or no greater than about 60% of theoretical maximum $CO_2$ emissions. In an illustrative example, when articles produced according to the process 100 are subjected to compostability testing under the ASTM D-6400 standard, an amount of $CO_2$ emitted in the test chamber after 180 days can be from about 38% of theoretical maximum $CO_2$ emissions to about 87% of theoretical maximum $CO_2$ emissions. In another illustrative example, when articles produced according to the process 100 are subjected to compostability testing under the ASTM D-6400 standard, an amount of $CO_2$ emitted in the test chamber after 180 days can be from about 40% of theoretical maximum $CO_2$ emissions to about 60% of theoretical maximum $CO_2$ emissions. In an additional illustrative example, when articles produced according to the process 100 are subjected to compostability testing under the ASTM D-6400 standard, an amount of $CO_2$ emitted in the test chamber after 180 days can be from about 42% of theoretical maximum $CO_2$ emissions to about 57% of theoretical maximum $CO_2$ emissions. In a further illustrative example, when articles produced according to the process 100 are subjected to compostability testing under the ASTM D-6400 standard, an amount of $CO_2$ emitted in the test chamber after 180 days can be from about 70% of theoretical maximum $CO_2$ emissions to about 80% of theoretical maximum $CO_2$ emissions. In some instances, when articles produced according to the process 100 are subjected to compostability testing under the ASTM D-6400 standard, an amount of $CO_2$ emitted in the test chamber after 180 days with respect to the theoretical maximum $CO_2$ emissions can be greater than the portion of the theoretical maximum amount of $CO_2$ that can be attributed to an amount of a starch-based polymeric material included in the articles. Thus, an amount of the $CO_2$ emitted in the chamber after 180 days can be attributed to an amount of a noncompostable petrochemical-based polymeric material under the ASTM D-6400 standard.

Although FIG. 1 illustrates one illustrative example of certain steps of a process usable for producing an article as disclosed herein, it is to be appreciated that the configuration and inclusion of certain steps shown in FIG. 1 is only one example. Although the process 100 has been described with respect to providing both one or more petrochemical-based polymeric materials and one or more carbohydrate-based materials, in some instances, the process 100 can be implemented without providing the one or more petrochemical-based polymeric materials. Thus, the article can be formed from the one or more carbohydrate-based polymeric materials, without any petrochemical-based polymeric material. In these situations, substantially all of the article can comprise the one or more carbohydrate-based polymeric materials.

Figure 2:
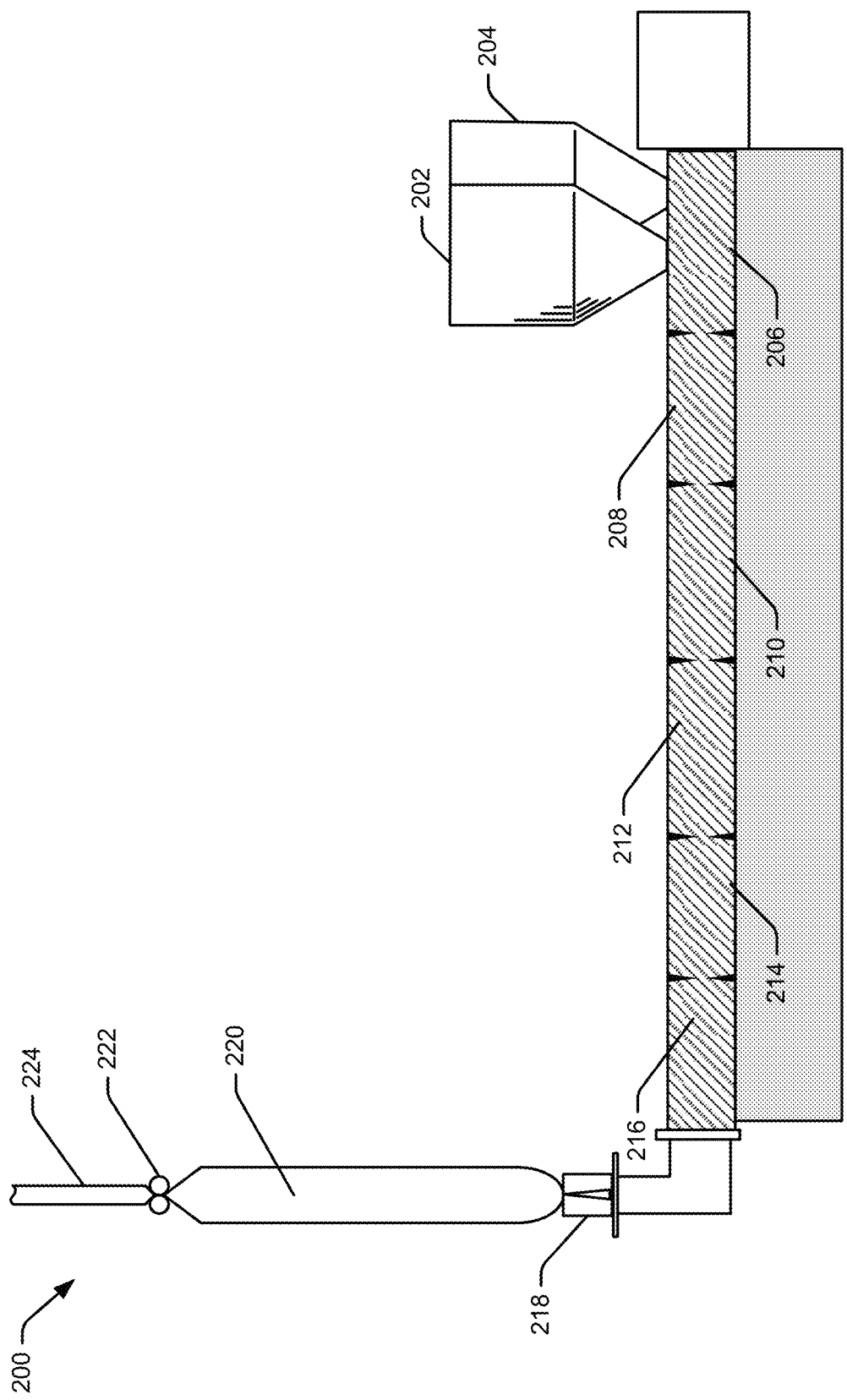
FIG. 2 illustrates components of an example manufacturing system to produce articles including biodegradable materials.

FIG. 2 illustrates components of an example manufacturing system 200 to produce articles including biodegradable materials. In some cases, the manufacturing system 200 can be used in the process 100 of FIG. 1. In an illustrative example, the manufacturing system 200 is an extruder, such as a single screw extruder or a twin screw extruder.

In an implementation, one or more petrochemical-based polymeric materials and one or more carbohydrate-based polymeric materials are provided via a first hopper 202 and a second hopper 204. The one or more petrochemical-based polymeric materials can include one or more polyolefin-based polymeric materials. For example, the one or more petrochemical-based polymeric materials can include a polyethylene. Additionally, the one or more carbohydrate-based polymeric materials can include one or more starch-based polymeric materials. In various implementations, the one or more carbohydrate-based polymeric materials can be formed from one or more carbohydrates. In a particular example, the one or more carbohydrates can include a mixture of starches. To illustrate, the one or more carbohydrate-based materials can be formed from an amount of a first starch and an amount of a second starch. The first starch can be derived from one of potato, corn, or tapioca and the second starch can be derived from a different one of potato, corn, or tapioca. Furthermore, the one or more carbohydrate-based polymeric materials can include an amount of a third starch that is different from the first starch and the second starch. In some implementations, the one or more carbohydrate-based polymeric materials can also be formed from one or more plasticizers.

The one or more carbohydrate-based polymeric materials and the one or more petrochemical-based polymeric materials can be mixed in a first chamber 206 to produce a mixture of materials. In some cases, the mixture of materials can include from about 10% by weight to about 40% by weight of the one or more carbohydrate-based polymeric materials, from about 60% by weight to about 89% by weight of the one or more petrochemical-based polymeric materials, and from about 1% by weight to about 9% by weight of the one or more compatibilizers.

In the example implementation shown in FIG. 2, the mixture of materials can pass through a number of chambers, such as the first chamber 206, a second chamber 208, a third chamber 210, a fourth chamber 212, a fifth chamber 214, and an optional sixth chamber 216. The mixture of materials can be heated in the chambers 206, 208, 210, 212, 214, 216. In some cases, a temperature of one of the chambers can be different from a temperature of another one of the chambers. In an illustrative example, the first chamber 206 is heated to a temperature from about 120° C. and about 140° C.; the second chamber 208 is heated to a temperature from about 130° C. and about 160° C.; the third chamber 210 is heated to a temperature from about 135° C. and about 165° C.; the fourth chamber 212 is heated to a temperature from about 140° C. and about 170° C.; the fifth chamber 214 is heated to a temperature from about 145° C. and about 180° C.; and the optional sixth chamber 216 is heated to a temperature from about 145° C. and about 180° C.

The heated mixture can then be extruded using a die 218 to form an extruded object, such as a film. A gas can be injected into the extruded object to expand it with a pressure from about 105 bar to about 140 bar. The resulting tube 220 can be drawn up through rollers 222 to create a film 224 with a thickness typically from about 0.02 mm (about 0.8 mil) to about 0.05 mm (about 2 mil). Even thinner films can be made using the blends as described herein, e.g., having a thickness as little as 0.1 mil (0.0025 mm). Of course, thicknesses greater than 2 mil can also be achieved. In some cases, the film 224 can be comprised of a single layer. In other cases, the film 224 can be comprised of multiple layers. For example, the film 224 can be comprised of at least 2 layers, at least 3 layers, at least 4 layers, or at least 6 layers. Additionally, the film 224 can be comprised of no greater than about 12 layers, no greater than about 10 layers, or no greater than about 8 layers. One or more layers may include the carbohydrate or starch-based polymeric material.

Optionally, the film 224 can be formed into one or more bags. A bag formed from the film 224 can have a typical thickness from about 0.02 mm to about 0.05 mm. As described above, lower thicknesses can also be achieved. The bag can include a cavity for holding items. In a particular implementation, a cavity of a bag formed from the film 224 can have a volume of at least about 0.1 L, at least about 0.5 L, at least about 1 L, at least about 2 L, or at least about 5 L. Additionally, a cavity of a bag formed from the film 224 can have a volume no greater than about 100 L, no greater than about 75 L, no greater than about 50 L. In an illustrative example, a cavity of a bag formed from the film 224 can have a volume from about 1 L to about 100 L. In another illustrative example, a cavity of a bag formed from the film 224 can have a volume from about 5 L to about 20 L.

In an implementation, the film 224 can be formed from a starch-based polymeric material. In some cases, the starch-based polymeric material can be formed from a single starch. In other cases, the starch-based polymeric material can be formed from a mixture of starches. In some cases, the materials from which the starch-based polymeric material is formed can include from about 70% by weight to about 90% by weight of the single starch or the mixture of starches. Additionally, the materials from which the starch-based polymeric material is formed can include from about 10% by weight to about 30% by weight of a plasticizer, such as glycerin. In another implantation, about 70% to about 90% of the starch-based polymeric material may be derived from or attributable to (formed from) the one or more starch materials. Similarly, about 100% to about 30% of the starch-based polymeric material may be derived from or attributable to (formed from) the plasticizer. The starch-based polymeric material can include from about 0.4% by weight to about 1.5% by weight water.

In one example, the film 224 can be formed from a starch-based polymeric material that is formed from about 15% by weight to about 25% by weight of a first starch, from about 15% by weight to about 25% by weight of a second starch, and from about 55% by weight to about 65% by weight of a third starch. In another implementation, such fractions may represent the portion of the starch based polymeric material that is derived from or attributable to (formed from) the starch(es). In an illustrative example, the first starch can include potato starch, the second starch can include corn starch, and the third starch can include tapioca starch. In another illustrative example, the first starch can include tapioca starch, the second starch can include corn starch, and the third starch can include potato starch. In an additional illustrative example, the first starch can include tapioca starch, the second starch can include potato starch, and the third starch can include corn starch.

In other implementations, the film 224 can be formed from a starch-based polymeric material that is formed from about 27% by weight to about 36% by weight of a first starch, from about 27% by weight to about 36% by weight of a second starch, and from about 27% by weight to about 36% by weight of a third starch. As above, such fractions may represent the portion of the starch based polymeric material that is derived from or attributable to (formed from) the first starch. In an illustrative example, the first starch can include corn starch, the second starch can include potato starch, and the third starch can include tapioca starch.

In various implementations, the film 224 can include a starch-based polymeric material that is formed from about 15% by weight to about 25% by weight of a first starch and from about 75% by weight to about 85% by weight of a second starch. As above, such fractions may represent the portion of the starch based polymeric material that is derived from or attributable to (formed from) the second starch. In an illustrative example, the first starch can include corn starch and the second starch can include potato starch or tapioca starch. In another illustrative example, the first starch can include potato starch and the second starch can include corn starch or tapioca starch. In an additional illustrative example, the first starch can include tapioca starch and the second starch can include corn starch or potato starch.

In addition to the starch-based polymeric material, the film 224 can also include a polyethylene-containing polymeric material. In an implementation, the film 224 can include from about 20% by weight to about 35% by weight of the starch-based polymeric material and from about 60% by weight to about 75% by weight of the polyethylene-containing polymeric material. Furthermore, the film 224 can include from about 3% by weight to about 7% by weight of a compatibilizer, such as a maleic anhydride-based compatibilizer.

In implementations where the film 224 includes an amount of a polyethylene-containing polymeric material and a starch-based polymeric material formed from a single starch, the film 224 can have a dart drop impact test value from about 140 g to about 420 g. Such values may be at any given film thickness, or per mil of film thickness. Additionally, in implementations where the film 224 includes a polyethylene-containing polymeric material and a starch-based polymeric material formed from a mixture of starches, the film 224 can have a dart drop impact test value from about 250 g to about 350 g or from 265 g to about 335 g, where such values may be for any given film thickness, or per mil of film thickness.

In some cases, when the film 224 includes a starch-based polymeric material formed from a mixture of starches, the film 224 can have a dart drop impact test value that is greater than a dart drop impact test value of an otherwise similar film but including a starch-based polymeric material formed from a single one of any of the starches in the mixture of starches. For example, in addition to including an amount of a petrochemical-based polymeric material, such as a polyolefin-based polymeric material, the film 224 can also include an amount of a carbohydrate-based polymeric material, such as an amount of a starch-based polymeric material formed from a mixture of a first starch and a second starch. In these cases, the film 224 can have a dart drop impact test value that is greater than a dart drop impact test value of a first article including the amount of the petrochemical-based polymeric material and a first starch-based polymeric material formed from a single starch that is the first starch. The film 224 can also have a dart drop impact test value that is greater than a dart drop impact test value of a second article including the amount of the petrochemical-based polymeric material and a second starch-based polymeric material formed from a single starch that is the second starch. When the film 224 includes a starch-based polymeric material formed from a mixture of the first starch, the second starch, and a third starch, the film 224 can have a dart drop impact test value that is greater than a dart drop impact test value of a third article including the amount of the petrochemical-based polymeric material and a third starch-based polymeric material formed from a single starch that is the third starch. Thus, the present films can exhibit synergistic strength characteristics where a mixture of different starches are used in forming the carbohydrate-based polymeric material. Furthermore, it is not necessary that a mixture of starches be used in forming the carbohydrate-based polymeric material to achieve increased strength results. For example, two different carbohydrate-based polymeric materials (one formed from one starch (e.g., corn), and the other formed from another starch (e.g., potato) could similarly be blended with a polyolefin or other plastic to form a film or other desired article that would exhibit increased strength as compared to such an article that was formed from only one or the other of the starches.

The amount of the first starch included in making the first article, the amount of the second starch included in making the second article, and/or the amount of the third starch included in making the third article can be approximately the same as the amount of starch used in making the starch-based polymeric material formed from the mixture of starches included in the film 224. To illustrate, when the film 224 includes about 25% by weight of the starch-based polymeric content that is formed from a mixture of starches, the first article, the second article, and/or the third article can also be formed from about 25% by weight of the single starch. Thus, the amount of the petrochemical-based polymeric content included in the film 224 and the first article, the second article, and the third article is approximately the same and the total amount of the starch-based polymeric content included in the film 224 and the first article, the second article, and the third article is approximately the same. Additionally, other components of the film 224, the first article, the second article, and the third article, such as a compatibilizer, can also be approximately the same. In these situations, the film 224 differs from the first article, the second article, and the third article because the starch-based polymeric source material of the film 224 is formed from multiple starches, while the starch-based polymeric source material of the first article, the second article, and the third article is formed from a single starch.

Also, the film 224 can have a tensile elongation at break value in the machine direction from about 600% to about 670% and a tensile elongation at break value in the transverse direction from about 625% to about 700%. In particular, the film 224 can have a tensile elongation at break in the machine direction that is greater than a tensile elongation at break value in the machine direction of an article that is formed from one or more polyolefin-based polymeric materials and free of starch-based polymeric materials. Furthermore, in implementations where the film 224 is formed from a polyethylene-containing polymeric material and a starch-based polymeric material formed from a mixture of starches, the film 224 can have an Elmendorf tear force value in the machine direction from about 325 g/mil to about 410 g/mil and an Elmendorf tear force value in the transverse direction from about 490 g/mil to about 650 g/mil.

In a particular implementation, the film 224 can be substantially free of an additive to enhance biodegradation and include from about 22% by weight to about 27% by weight of a starch-based polymeric material formed from a mixture of starches. The film can also include from about 67% by weight to about 73% by weight of a polyethylene-containing polymeric material. In these situations, the film 224 can have biodegradation from about 12% to about 20% according to biomethane potential testing after 32 days. In addition, after 62 days the film 224 can have biodegradation from about 26% to about 34% according to biomethane potential testing. Further, after 91 days, the film 224 can have biodegradation from about 30% to about 40% according to biomethane potential testing. As noted above, the biodegradation after a given relatively short period of time (e.g., within 180 days, within 365 days (1 year), within 2 years, or within 3 years can be greater than the fraction of the starch-based polymeric material included in the film, evidencing that the polyethylene is also being biodegraded, with the starch-based polymeric material. Such results are remarkable, and particularly a advantageous.

In an embodiment, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or even at least 95% of the non-starch-based polymeric material (e.g., the synthetic petro-chemical based polymeric material) may biodegrade over a period of at least about 1 year, at least about 2 years, at least about 3 years, or at least about 5 years when subjected to landfill, composting, and/or marine conditions (or conditions simulating such). Such biodegradation is particularly remarkable and advantageous.

In an implementation, the film 224 can include polymeric content including one or more petrochemical-based polymeric materials and one or more carbohydrate-based polymeric materials formed from one or more carbohydrates where an amount of the polymeric content that degrades after 91 days measured according to biomethane potential testing is greater than an amount of the one or more carbohydrate-based polymeric materials. In a particular implementation, the film 224 can include (i) a starch-based polymeric material formed from a first starch and a second starch, and (ii) a polyolefin-based polymeric material where an amount of polymeric content that biodegrades after 91 days measured according to biomethane potential testing is greater than an amount of the first starch and the second starch source materials used to form the carbohydrate-based polymeric material and the resulting film. In some cases, substantially all of the starch-based polymeric material biodegrades after 91 days as measured according to biomethane potential testing. Further, an amount of biodegradation of the film 224 after 91 days measured according to biomethane potential testing can be from about 5% to about 60% greater than an amount of the starch-based polymeric material included in the film. In addition, an amount of polymeric content that biodegrades after 91 days measured according to biomethane potential testing can be from about 30% by weight to about 50% by weight, even though the initial starch-based polymeric content of the film was only about 22% to about 27%. Also, an amount of polymeric content that biodegrades after 62 days measured according to biomethane potential testing can be from about 25% by weight to about 35% by weight, which again, is surprising. No inclusion of any biodegradation enhancing additive is needed to achieve such results. For example, in various implementations, the film 224 can be substantially free of a biodegradation enhancing additive, while in other implementations, the film 224 can include from about 0.5% by weight to about 2.5% by weight of a biodegradation enhancing additive. Further Examples show that with increased time, the amount of biodegradation is even higher, such that in at least some implementations, substantially the entire film or other article biodegrades (e.g., biodegradation of at least about 85%, at least about 90%, or at least about 95% within 180 days, or 200 days, or 365 days (1 year), within 2 years, within 3 years, or other period).

Additionally, the film 224 can include from about 20% by weight to about 40% by weight of one or more carbohydrate-based polymeric materials or from about 10% by weight to about 50% by weight of one or more carbohydrate-based polymeric materials. Also, the film 224 can include from about 65% by weight to about 85% by weight of one or more petrochemical-based polymeric materials or from about 60% by weight to about 90% by weight of one or more petrochemical-based polymeric materials. In some cases, the film 224 can include from about 1% by weight to about 9% by weight of a compatibilizer or from about 3% by weight to about 7% by weight of the compatibilizer.

In a particular implementation, the film 224 can include from about 20% by weight to about 40% by weight of one or more starch-based polymeric materials and from about 60% by weight to about 80% by weight of one or more polyolefin-based polymeric materials. In an illustrative implementation, the film 224 can include from about 20% by weight to about 30% by weight of the one or more starch-based polymeric materials and from about 65% by weight to about 75% by weight of one or more polyolefin-based polymeric materials. In some cases, the one or more starch-based polymeric materials can be formed from a first starch and a second starch and the source materials from which the one or more starch-based polymeric materials are formed can include from about 10% by weight to about 25% by weight of a first starch and from about 55% by weight to about 85% by weight of a second starch. In other implementations, the source materials from which the one or more starch-based polymeric materials are formed can include from about 10% by weight to about 25% by weight of a first starch and from about 55% by weight to about 85% by weight of a second starch. In various implementations, the source materials from which the one or more starch-based polymeric materials are formed can include a third starch and the third starch can comprise from about 10% by weight to about 25% by weight of the source materials from which the one or more starch-based polymeric materials are formed. In an implementation, such fractions may represent the portion of the starch based polymeric material that is derived from or attributable to (formed from) any of the given starches.

Furthermore, the film 224 can be subjected to compostability testing under ASTM D-6400 at the time of filing this patent application. In an implementation, the film 224 can have a thickness from about 0.035 mm to about 0.050 mm; have a composition including: from about 22% by weight to about 32% by weight of a starch-based polymeric material formed from a mixture of starches, an amount of a polyethylene-based polymeric material from about 65% by weight to about 75% by weight, an amount of a compatibilizer from about 3% by weight to about 6% by weight, and be substantially free of an additive to enhance biodegradation; and when the film 224 is subjected to compostability testing under ASTM D-6400, an amount of $CO_2$ emitted in the test chamber after 98 days can be from about 18% of theoretical maximum $CO_2$ emissions to about 26% of theoretical maximum $CO_2$ emissions. In another implementation, the film 224 can have a thickness from about 0.03 mm to about 0.04 mm; have a composition including: from about 25% by weight to about 35% by weight of a starch-based polymeric material formed from a mixture of starches, an amount of a polyethylene-based polymeric material from about 60% by weight to about 70% by weight, an amount of a compatibilizer from about 3% by weight to about 6% by weight, and an amount of an additive to enhance biodegradation from about 0.5% by weight to about 2% by weight; and when the film 224 is subjected to compostability testing under ASTM D-6400, an amount of $CO_2$ emitted in the test chamber after 98 days can be from about 29% of theoretical maximum $CO_2$ emissions to about 37% of theoretical maximum $CO_2$ emissions.

In an additional implementation, the film 224 can have a thickness from about 0.035 mm to about 0.050 mm; have a composition including: from about 22% by weight to about 32% by weight of a starch-based polymeric material formed from a mixture of starches, an amount of a polyethylene-based polymeric material from about 65% by weight to about 75% by weight, an amount of a compatibilizer from about 3% by weight to about 6% by weight, and be substantially free of an additive to enhance biodegradation; and when the film 224 is subjected to compostability testing under ASTM D-6400, an amount of $CO_2$ emitted in the test chamber after 180 days can be from about 44% of theoretical maximum $CO_2$ emissions to about 52% of theoretical maximum $CO_2$ emissions. In a further implementation, the film 224 can have a thickness from about 0.03 mm to about 0.04 mm; have a composition including: from about 25% by weight to about 35% by weight of a starch-based polymeric material formed from a mixture of starches, an amount of a polyethylene-based polymeric material from about 60% by weight to about 70% by weight, an amount of a compatibilizer from about 3% by weight to about 6% by weight, and an amount of an additive to enhance biodegradation from about 0.5% by weight to about 2% by weight; and when the film 224 is subjected to compostability testing under ASTM D-6400, an amount of $CO_2$ emitted in the test chamber after 180 days can be from about 50% of theoretical maximum $CO_2$ emissions to about 60% of theoretical maximum $CO_2$ emissions.

In other implementations, the film 224 can have a thickness from about 0.03 mm to about 0.04 mm; have a composition including: from about 25% by weight to about 35% by weight of a starch-based polymeric material formed from a mixture of starches, an amount of a polyethylene-based polymeric material from about 10% by weight to about 20% by weight, an amount of a compostable petrochemical-based polymeric material from about 45% by weight to about 55% by weight, an amount of a compatibilizer from about 3% by weight to about 5% by weight, and include from about 0.5% by weight to about 2% by weight of an additive to enhance biodegradation; and when the film 224 is subjected to compostability testing under ASTM D-6400, an amount of $CO_2$ emitted in the test chamber after 98 days can be from about 25% of theoretical maximum $CO_2$ emissions to about 35% of theoretical maximum $CO_2$ emissions. In a further implementation, the film 224 can have a thickness from about 0.03 mm to about 0.04 mm; have a composition including: from about 25% by weight to about 35% by weight of a starch-based polymeric material formed from a mixture of starches, an amount of a polyethylene-based polymeric material from about 10% by weight to about 20% by weight, an amount of a compostable petrochemical-based polymeric material from about 45% by weight to about 55% by weight, an amount of a compatibilizer from about 3% by weight to about 5% by weight, and include from about 0.5% by weight to about 2% by weight of an additive to enhance biodegradation; and when the film 224 is subjected to compostability testing under ASTM D-6400, an amount of $CO_2$ emitted in the test chamber after 180 days can be from about 70% of theoretical maximum $CO_2$ emissions to about 80% of theoretical maximum $CO_2$ emissions.

Other architectures can be used to implement the described functionality, and are intended to be within the scope of this disclosure.

The concepts described herein will be further described in the following examples, which do not limit the scope encompassed by the claims.

EXAMPLES

Example 1

A starch-based polymer was formed from 27% tallow glycerin (99% pure glycerin), and 73% starch. The finished-starch-based polymer included <1% water. The starch-based polymer was mixed with LLDPE and anhydride-modified LLDPE in proportions of 25%, 70%, and 5%, respectively, by weight. Eleven samples were prepared and blown into films. The temperature settings of the extruder used are shown in Table 3. B1, B2, B3, B4, and B5 refer to temperature settings at different locations of the barrel of the extruder and AD1, D1, and D2 refer to the temperature settings at different locations in the die section of the extruder.

TABLE 3

| Temp. | Extruder | | | | | | | |
|---|---|---|---|---|---|---|---|---|
| | B1 | B2 | B3 | B4 | B5 | AD1 | D1 | D2 |
| Set Value | 130 | 140 | 145 | 150 | 160 | 160 | 160 | 160 |

The extruder blow settings are shown in Table 4.

TABLE 4

| Blow | Extruder | | | | | Take-Up Speed (meters/min) |
|---|---|---|---|---|---|---|
| | Melt Temperature Setting (° C.) | Pressure (bar) | Screw RMP | Extruder Motor Setting (Amps) | Blower Speed | |
| Set Value (Samples 1-11) | 148 | 132 | 17 | 32.0 | 0 | 7.0 |
| Set Value (Sample 12) | 147 | 115 | 17 | 32.0 | 0 | 7.0 |

6.5% of the resulting films were formed from glycerin, 18.5% of each resulting film was formed from starch, 70% of each film was LLDPE, and 5% of each film was anhydride-modified LLDPE. The films then were tested using a falling dart impact test according to ASTM D-1709. The strength test results of these tests are shown in Table 5. Dart strength per mil of thickness can simply be calculated by dividing the measured dart impact strength (e.g., from ASTM D-1709) by the thickness of the tested film.

TABLE 5

| Sample No. | Film Thickness (Mil) | Dart Test (g) |
|---|---|---|
| 1 | 1.535 | >387 |
| 2 | 1.50 | >387 |
| 3 | 1.50 | >387 |
| 4 | 1.50 | 347 |
| 5 | 1.45 | 347 |
| 6 | 1.55 | 387 |
| 7 | 1.55 | 387 |
| 8 | 1.50 | >387 |
| 9 | 1.55 | 387 |
| 10 | 1.55 | >387 |
| 11 | 1.50 | >387 |
| 12 | 2.00 | 227 |

Example 2

A starch-based polymer was formed from 27% tallow glycerin (99% pure glycerin) and 73% starch. The starch-based polymer included <1% water. The starch-based polymer was mixed with LLDPE and anhydride-modified LLDPE in proportions of 25%, 70%, and 5%, respectively, by weight. Two samples were prepared and blown into films. The temperature settings of the extruder used are shown in Table 6.

TABLE 6

| Temp. | Extrude | | | | | | | | |
|---|---|---|---|---|---|---|---|---|---|
| | B1 | B2 | B3 | B4 | B5 | B6 | AD1 | D1 | D2 |
| Set Value | 130 | 150 | 155 | 160 | 165 | 165 | 165 | 170 | 170 |

The extruder blow settings are shown in Table 7.

TABLE 7

| | Extruder | | | | | |
|---|---|---|---|---|---|---|
| | Melt Temperature Setting (° C.) | Pressure (bar) | Screw RPM | Extruder Motor Setting (Amps) | Blower Speed | Take-Up Speed (meters/minute) |
| Set Value | 149 | 121 | 16.0 | 35.0 | 0 | 6.0 |

6.5% of the resulting films were formed from glycerin, 18.5% of the resulting films were formed from starch, 70% of each film was LLDPE, and 5% of each film was anhydride-modified LLDPE. The films then were tested using a falling dart impact test according to ASTM D-1709. The strength test results (in grams) of these tests are shown in Table 8.

TABLE 8

| Sample No. | Film Thickness (Mil) | Dart Test (g) |
|---|---|---|
| 1 | 1.575 | 347 |
| 2 | 1.335 | 362 |

Example 3

In order to test the strength characteristics resulting from various combinations of starch, 17 starch-based polymers formed from tallow glycerin (99% pure glycerin) and starch. The fraction of the starch-based polymer formed from glycerin varied from 27% to 32%, while the fraction formed from the starch varied from 68% to 73%. All starch-based polymers exhibited <about 1% water, and were mixed with LLDPE and anhydride-modified LLDPE in proportions of 25%, 70%, and 5%, respectively, by weight. The resulting mixtures were then extruded and blown into films. The films were then tested using a falling dart drop impact test according to ASTM D-1709. The combinations of starches tested and strength test results are shown in Table 9A. The two thickness values for each sample in Table 9A correspond to the minimum and maximum measured thickness for each sample (as there was some variation within each film). As can be seen from the results shown in Table 9A-9B, samples formed from a mixture of starches have a dart drop impact test value (in grams) that is greater than the dart drop impact test value of samples formed from a single starch. Table 9B shows the calculated percentages in increased strength as compared to what might be expected (e.g., a weighted strength based on percentage of each starch in the mixture). The increases in strength are remarkable, and unexpected.

TABLE 9A

| Sample No. | Water Content (Starch-based Polymers) | Starch Content (%) | | | Thickness (mm) | | Dart Test (g) |
|---|---|---|---|---|---|---|---|
| | | Potato | Corn | Tapioca | | | |
| 1 | 0.58 | 0 | 100 | 0 | 0.040 | 0.045 | 137 |
| 2 | 0.73 | 100 | 0 | 0 | 0.040 | 0.045 | 167 |
| 3 | 0.80 | 0 | 100 | 0 | 0.040 | 0.045 | 167 |
| 4 | 0.93 | 100 | 0 | 0 | 0.030 | 0.035 | 167 |
| 5 | 0.49 | 0 | 0 | 100 | 0.035 | 0.040 | 197 |
| 6 | 0.55 | 0 | 0 | 100 | 0.030 | 0.035 | 212 |
| 7 | 1.03 | 33.33 | 33.33 | 33.33 | 0.030 | 0.035 | 242 |
| 8 | 1.04 | 20 | 20 | 60 | 0.030 | 0.035 | 267 |
| 9 | 0.97 | 60 | 20 | 20 | 0.025 | 0.030 | 252 |
| 10 | 0.93 | 0 | 0 | 100 | 0.025 | 0.030 | 257 |
| 11 | 0.94 | 20 | 0 | 80 | 0.025 | 0.030 | 257 |
| 12 | 1.37 | 20 | 80 | 0 | 0.025 | 0.030 | 257 |
| 13 | 0.95 | 80 | 0 | 20 | 0.030 | 0.035 | 302 |
| 14 | 1.19 | 20 | 60 | 20 | 0.030 | 0.035 | 322 |
| 15 | 0.96 | 0 | 80 | 20 | 0.025 | 0.030 | 277 |
| 16 | 1.05 | 80 | 20 | 0 | 0.025 | 0.030 | 317 |
| 17 | 0.81 | 0 | 20 | 80 | 0.025 | 0.030 | 322 |

TABLE 9B

| Sample No. | ESR Used | Mean Film Thickness (mil) | Dart Strength (g/mil) | Percent Increase in Dart Strength (%) |
|---|---|---|---|---|
| 1 | GS-270 | 1.673 | 81.9 | N/A |
| 2 | GS-270 | 1.673 | 99.8 | N/A |
| 3 | GS-300 | 1.673 | 99.8 | N/A |
| 4 | GS-300 | 1.280 | 130.5 | N/A |
| 5 | GS-270 | 1.476 | 133.4 | N/A |
| 6 | GS-300 | 1.280 | 165.7 | N/A |
| 7 | GS-300 | 1.280 | 189.1 | 43.3% |
| 8 | GS-300 | 1.280 | 208.7 | 43.4% |
| 9 | GS-300 | 1.083 | 232.8 | 77.1% |
| 10 | GS-330 | 1.083 | 237.4 | N/A |
| 11 | GS-300 | 1.083 | 237.4 | 49.6% |
| 12 | GS-300 | 1.083 | 237.4 | 124.0% |
| 13 | GS-300 | 1.280 | 236.0 | 71.6% |
| 14 | GS-300 | 1.280 | 251.7 | 111.3% |
| 15 | GS-300 | 1.083 | 255.8 | 126.4% |
| 16 | GS-300 | 1.083 | 292.8 | 135.4% |
| 17 | GS-300 | 1.083 | 297.4 | 95.0% |

Example 4

Using the same protocols as described in Example 3, 11 additional combinations of starches were tested. Specifically, 11 starch-based polymers were formed from 27% tallow glycerin (99% pure glycerin) and 73% starch. Each starch-based polymer exhibited <about 1% water, and was mixed with LLDPE and anhydride-modified LLDPE in proportions of 25%, 70%, and 5%, respectively, by weight. The resulting mixtures were then extruded and blown into films. 6.5% of each resulting film was formed from the glycerin, 18.5% was formed from the starch, 70% of each film was LLDPE, and 5% of each film was anhydride-modified LLDPE. The films were then tested using a falling dart impact test according to ASTM D-1709. The combinations of starches tested and strength test results (in grams) are shown in Table 10. As with the results shown in Tables 9A-9B, the results of Table 10 show that samples formed from a mixture of starches have dart drop impact test values that are greater than the dart drop impact test values of samples formed from a single starch. Such an increase in strength achieved by using a mixture of different starches in forming the starch-based polymeric material, from which the film is formed (with the LLDPE) is surprising an unexpected.

TABLE 10

| Sample No. | Starch Content (%) | | | Thickness (mil) | Dart Test (g) | Dart Strength (g/mil) | Percent Increase in Dart Strength (%) |
|---|---|---|---|---|---|---|---|
| | Potato | Corn | Tapioca | | | | |
| 1 | 0 | 100 | 0 | 1.535 | 347 | 226.1 | N/A |
| 2 | 100 | 0 | 0 | 1.535 | 362 | 235.8 | N/A |
| 3 | 0 | 0 | 100 | 1.550 | 367 | 236.8 | N/A |
| 4 | 80 | 20 | 0 | 1.550 | 387 | 249.7 | 6.8% |
| 5 | 0 | 20 | 80 | 1.550 | 387 | 249.7 | 6.4% |
| 6 | 0 | 80 | 20 | 1.550 | 387 | 249.7 | 9.4% |
| 7 | 0 | 10 | 90 | 1.550 | 387 | 249.7 | 5.9% |
| 8 | 33.33 | 33.33 | 33.33 | 1.500 | 387 | 258 | 10.9% |
| 9 | 80 | 0 | 20 | 1.500 | 387 | 258 | 9.3% |
| 10 | 10 | 0 | 90 | 1.500 | 387 | 258 | 9.0% |
| 11 | 0 | 90 | 10 | 1.500 | 387 | 258 | 13.6% |

Although the strength increase values seen in Table 10 differ from those of Example 3 (in Tables 9A-9B), both show a synergistic strength increase, beyond what would be expected, when different starches are used in forming the ESR. Various specific process conditions, such as temperature, blow up ratio, and the like may affect actual increases achieved.

Figure 22:
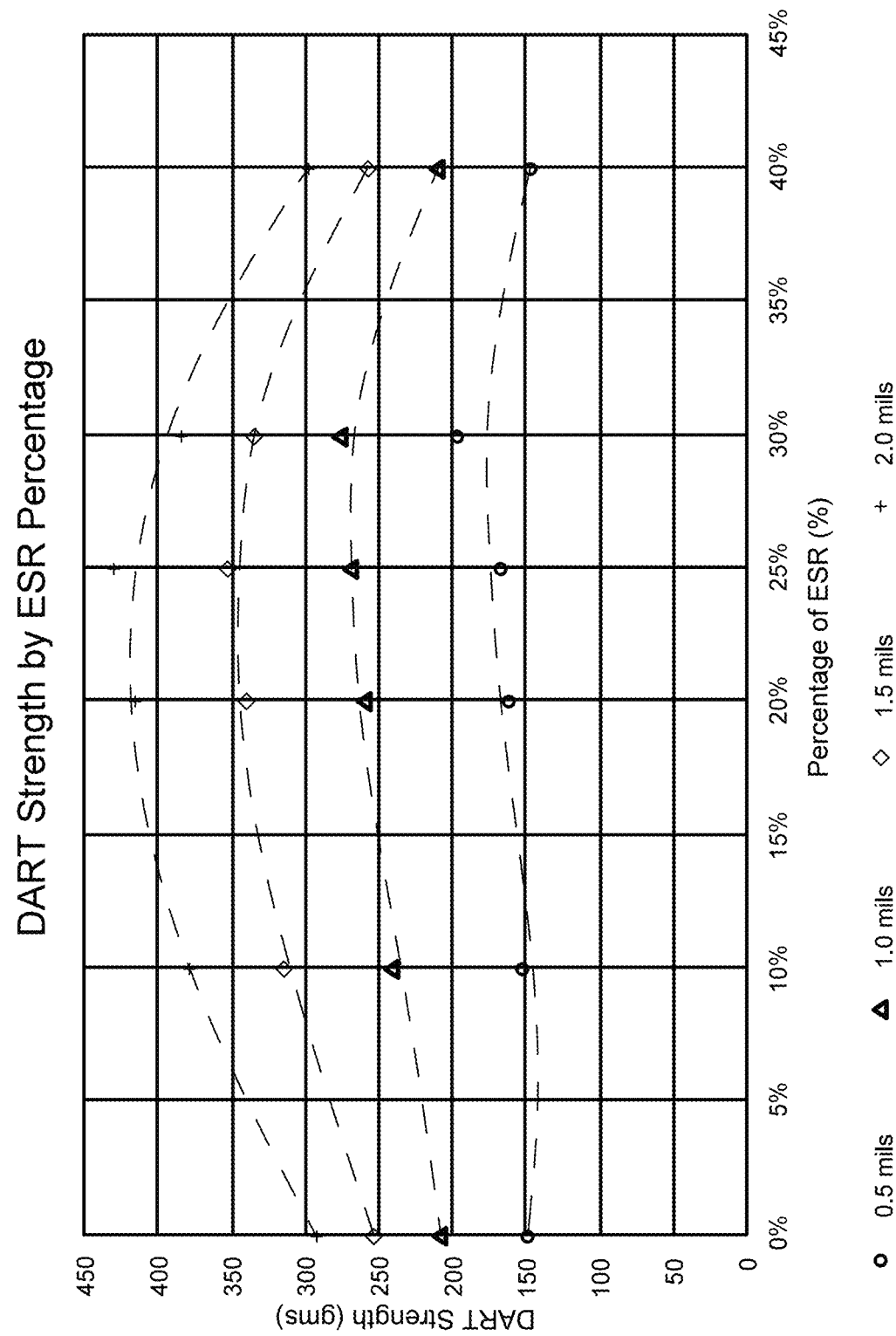
FIG. 22 shows dart strength for different thickness films based on percentage of carbohydrate-based polymeric material in the film.

FIG. 22 charts dart impact test strength for different thickness films (0.5 mil, 1 mil, 1.5 mil, 2.0 mils) based on percentage of ESR in the film. The ESR used in the films formed shown in FIG. 22 was formed from a blend of starches including 90% corn starch and 10% potato starch. FIG. 22 shows how the strength of the film increases with increasing ESR percentage, up to a maximum strength at about 20% to about 25% ESR. The balance of the blend included polyethylene and an appropriate compatibilizer, as described herein.

Figure 23:
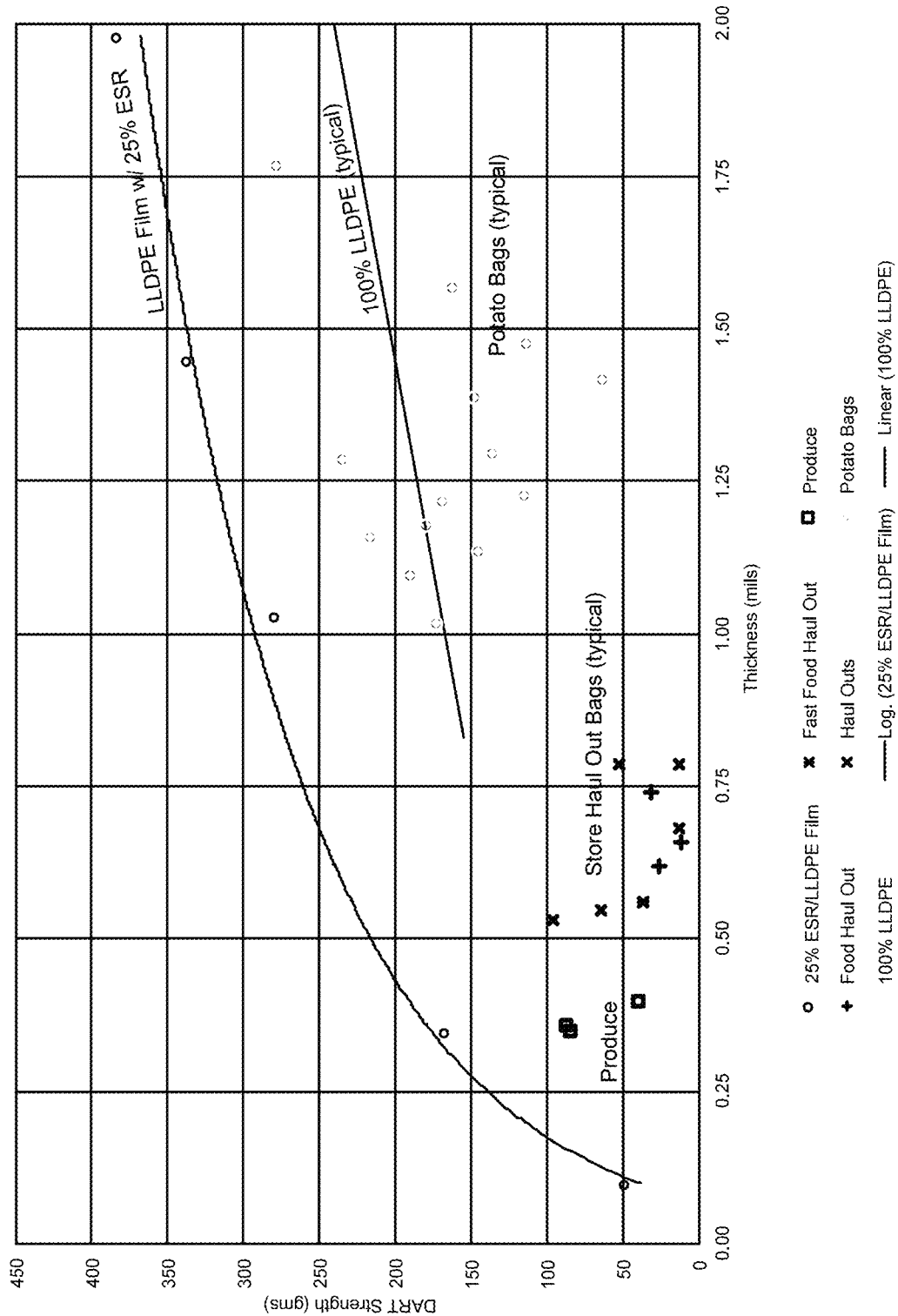
FIG. 23 shows dart strength for different thickness films (from about 0.1 mil up to 2 mils) formed from a blend of 25% carbohydrate-based polymeric material, about 5% compatibilizer, and about 70% LLDPE, as compared to 100% LLDPE film, and also showing comparison for produce bags, haul out bags, and potato bags.

FIG. 23 charts dart impact test strength for different thickness films (from about 0.1 mil up to 2 mils) for films including 25% carbohydrate-based polymeric material, with the balance being a small fraction of compatibilizer (e.g., about 5%) as described herein, and LLDPE (about 70%).

FIG. 23 also shows comparative strength for 100% LLDPE films, which are at all points lower than for the blend according to the present disclosure. FIG. 23 further shows various other tested reference points for produce bags (e.g., bags provided to consumers in a supermarket produce section for holding produce), for various "haul out" bags (e.g., grocery and other plastic bags provided for carry out), and for potato bags (plastic bags used to hold typically 5, 10 or 20 pounds of potatoes in the produce section of a supermarket).

Figure 24:
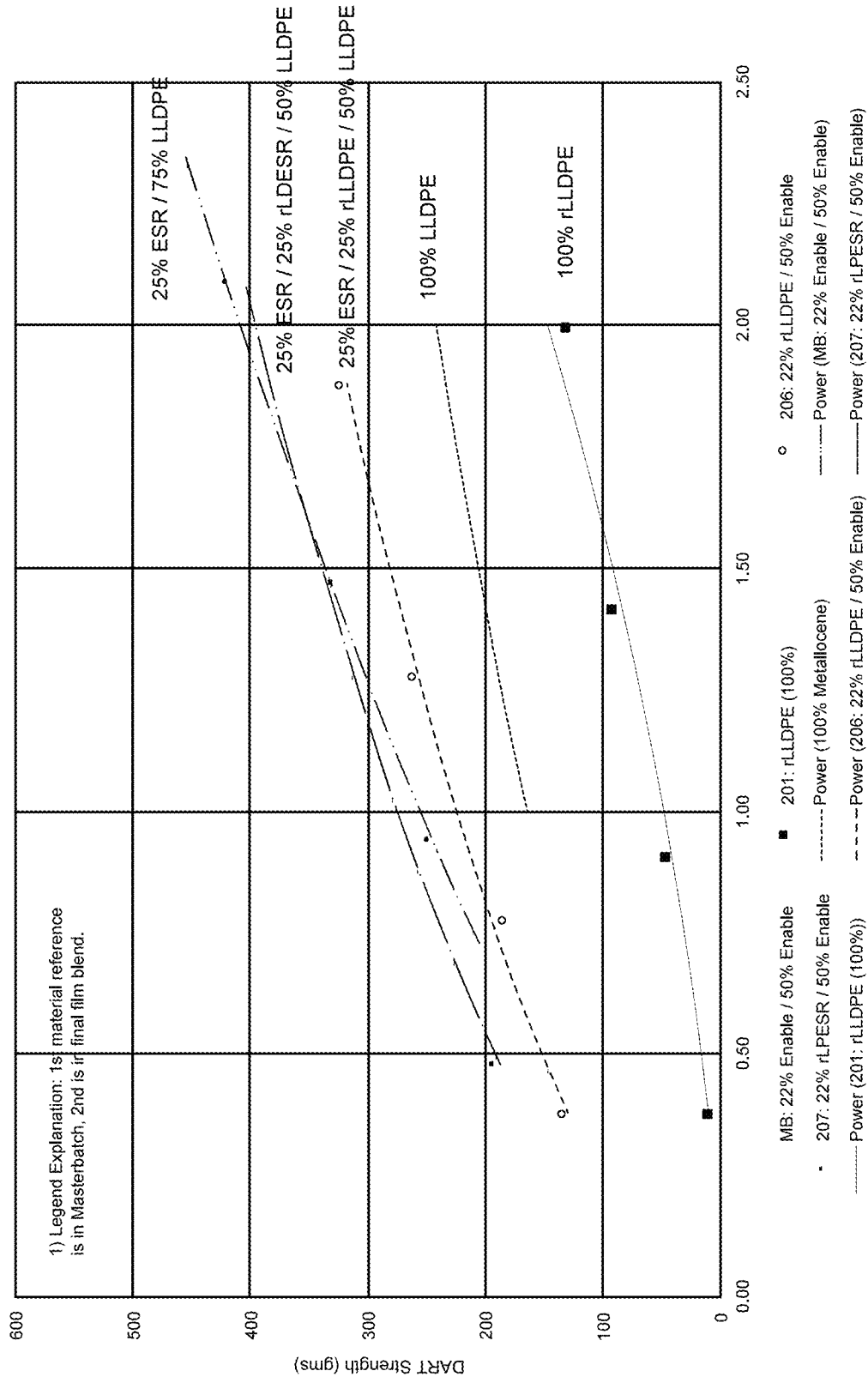
FIG. 24 shows dart strength for different thickness films for various blended films according to the present invention, as well as comparative films formed from virgin or recycled materials.

FIG. 24 charts dart impact test strength for different thickness films (from less than 0.5 mil up to about 2 mils) for various blended films according to the present disclosure, as well as comparative films (e.g., 100% LLDPE, 100% recycled LLDPE (rLLDPE). In addition to showing strength characteristics for a film formed from virgin materials (25% ESR, 70% LLDPE, 5% compatibilizer (labeled 25% ESR/75% LLDPE), FIG. 24 also shows strength resulting when such a recycled material (rLDESR) is then blended with virgin materials (labeled 25% ESR/25% rLDESR/50% LLDPE), or where recycled LLDPE (rLLDPE) is used in the blend (labeled 25% ESR/25% rLLDPE/50% LLDPE). The strength results are improved as compared to use of synthetic petrochemical-based polymeric materials, as shown, in addition to the previously described characteristics of increased renewability and biodegradability.

Example 5

A starch-based polymer formed from tallow glycerin (99% pure glycerin) and starch, and exhibiting <about 1% water was mixed with LLDPE and anhydride-modified LLDPE in proportions of 25%, 70%, and 5%, respectively, by weight. The starch used in forming the starch-based polymer was a blend of 90% corn starch and 10% potato starch, by weight. The mixture of the starch-based polymer and the LLDPE was extruded and blown into a film. 6.5% of the resulting film was formed from the glycerin, 18.5% was formed from the two starches, 70% was LLDPE, and 5% was anhydride-modified LLDPE. For comparison purposes, a second film containing 100% LLDPE was also prepared. Using a variety of testing methods a number of strength characteristics were tested, the results of which are shown in Table 9. In Table 11, transverse directions is abbreviated (TD) and machine directions is abbreviated (MD). The results shown in Table 11 indicate that the sample formed from the starch-based polymer blend has values for some of the strength tests that are greater than corresponding values for the LLDPE sample.

TABLE 11

| | Sample Form | Test Method | CP14102701 | LLDPE | Cardia BL-F |
|---|---|---|---|---|---|
| Film Thickness (mil) | Film | | 1.35 | 1.35 | 1.2 |
| Mass Density (SG): | Film or Pellets | ASTM D-792 | 1.04 | 0.92 | |
| Secant Modulus MD, kpsi | Film | ASTM D-882 | 30 +/− 1 | 37.7 +/− 2.2 | |
| Secant Modulus TD, kpsi | Film | ASTM D-882 | 30 +/− 1.3 | 32.1 +/− 2.4 | |
| Tensile Strength MD Break, kpsi | Film | ASTM D-882 | 4.5 +/− 0.4 | 4.4 +/− 0.2 | 2.9 |
| Tensil Strength TD Break, kps | Film | ASTM D-882 | 4.3 +/− 0.7 | 4.7 +/− 1.1 | |
| Tensil Elongation MD Break, % | Film | ASTM D-882 | 632 +/− 27 | 571 +/− 25 | 330 |
| Tensile Elongation TD Break, % | Film | ASTM D-882 | 664 +/− 32 | 651 +/− 65 | |
| Elmendorf Tear MD, g/mil | Film | ASTM D-1922 | 367 +/− 38 | 254 +/− 41 | |
| Elmendorf Tear TD, g/mil | Film | ASTM D-1922 | 568 +/− 70 | 481 +/− 41 | |
| Dart Drop Impact, g | Film | ASTM D-1709 | 320 +/− 10 | 175 +/− 10 | 200 |
| Barrier: OPV 23° C., 0% RH | Film | cc-25, mic/m$^2$ day-atm O$_2$ | 2,916 +/− 49 | 4,346 +/− 130 | |
| Barrier: MVPV 39° C., 100% RH | Film | gm/m$^2$-day | 24 +/− 3 | 14 +/− 0 | |
| Optical Transparency % | Film | ASTM D-1746 | 7 +/− 1 | 44 +/− 1 | |
| Heat Seal Strength | Film | 40 psi, 0.5 sec | 1,400 g/in | 1,497 g/in | |
| Heat Seal Temperature Range | Film | | 130-180° C. | 130-180° C. | |
| Melt Flow Rate | Pellets | ASTM D-1238 | 0.47 g/10 min | 1.0 g/10 min | |
| Bio Content | Film or Pellets | | 25% | 0% | 33% |
| Water Content | Pellets | ASTMD-6980 | 0.35% | 0% | 0.60% |

Example 6

Figure 3A:
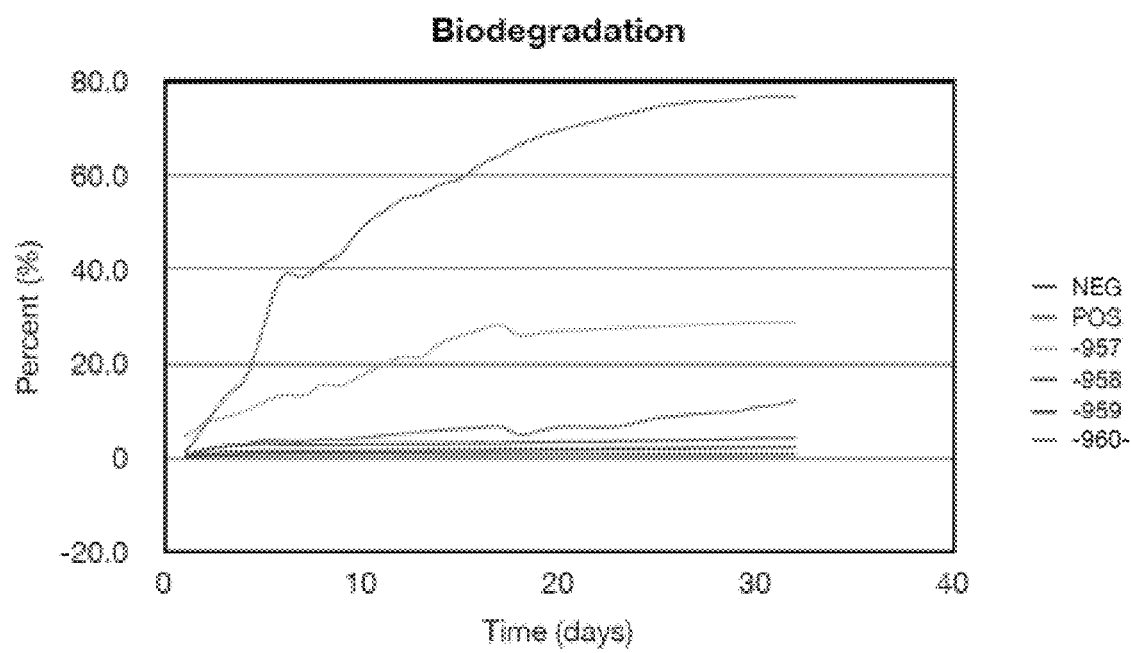
FIG. 3A and FIG. 3B illustrate percent biodegradation measured over 32 days according to biomethane potential testing of four samples formed according to techniques described herein.
Figure 3B:
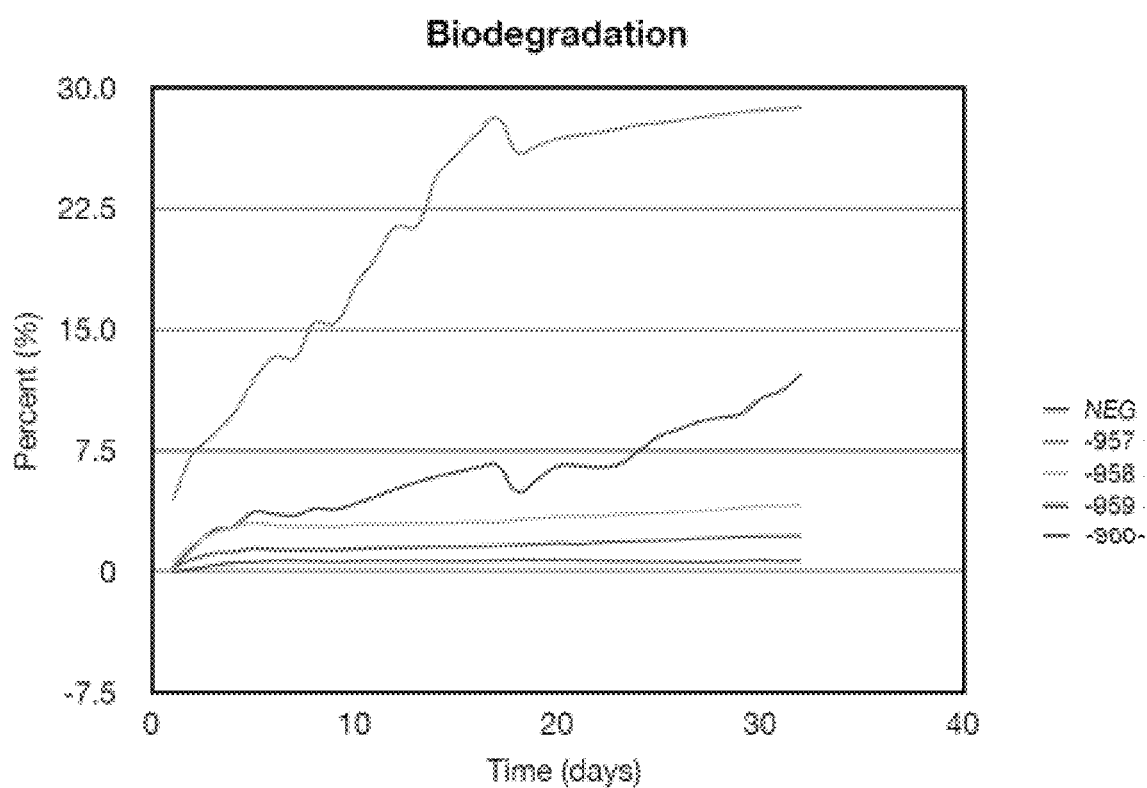

Seven samples were tested for 32 days to determine biodegradability characteristics using biomethane potential testing, to determine the potential for anaerobic biodegradation based on methanogenesis as a percent of total methanogenesis potential. The biomethane potential test was intended to replicate the conditions of a full-scale anaerobic digester (landfill). The biomethane potential test was conducted at a temperature of about 52° C. using an inoculum having about 55% by weight water and about 45% by weight organic solids. The positive control sample was cellulose and the negative control sample was untreated polyethylene. The results of four samples (referred to as 957, 958, 959, and 960) are shown in FIGS. 3A and 3B and in Table 12.

TABLE 12

|  | Inoculum | Negative | Positive | 957 | 958 | 959 | 960 |
|---|---|---|---|---|---|---|---|
| Cumulative Gas Volume (mL) | 729.6 | 962.5 | 8184.2 | 13366.8 | 2805.7 | 2995.4 | 5599.0 |
| Percent $CH_4$ (%) | 18.4 | 19.3 | 35.4 | 29.2 | 21.8 | 0.0 | 33.6 |
| Volume $CH_4$ (mL) | 134.2 | 185.5 | 2898.2 | 3904.4 | 612.4 | 0.0 | 1880.7 |
| Mass $CH_4$ (g) | 0.10 | 0.13 | 2.07 | 2.79 | 0.44 | 0.00 | 1.34 |
| Percent $CO_2$ (%) | 49.9 | 44.0 | 44.5 | 43.4 | 43.2 | 40.2 | 45.4 |
| Volume $CO_2$ (mL) | 364.0 | 423.3 | 3639.8 | 5799.9 | 1211.8 | 1204.2 | 2544.1 |
| Mass $CO_2$ (g) | 0.72 | 0.83 | 7.15 | 11.39 | 2.38 | 2.37 | 5.00 |
| Sample Mass (g) | 1,000 | 10 | 10 | 20.0 | 20.0 | 20 | 20 |
| Theoretical Sample Mass (g) | 0.0 | 8.6 | 4.2 | 17.1 | 17.1 | 17.1 | 17.1 |
| Biodegraded Mass (g) | 0.27 | 0.33 | 3.50 | 5.20 | 0.98 | 0.65 | 2.37 |
| Percent Biodegraded (%) |  | 0.7 | 76.7 | 28.8 | 4.1 | 2.2 | 12.3 |
| Adjusted Percent Biodegraded (%) |  | 0.9 | 100.0 | 37.5 | 5.4 | 2.9 | 16.0 |

Figure 4A:
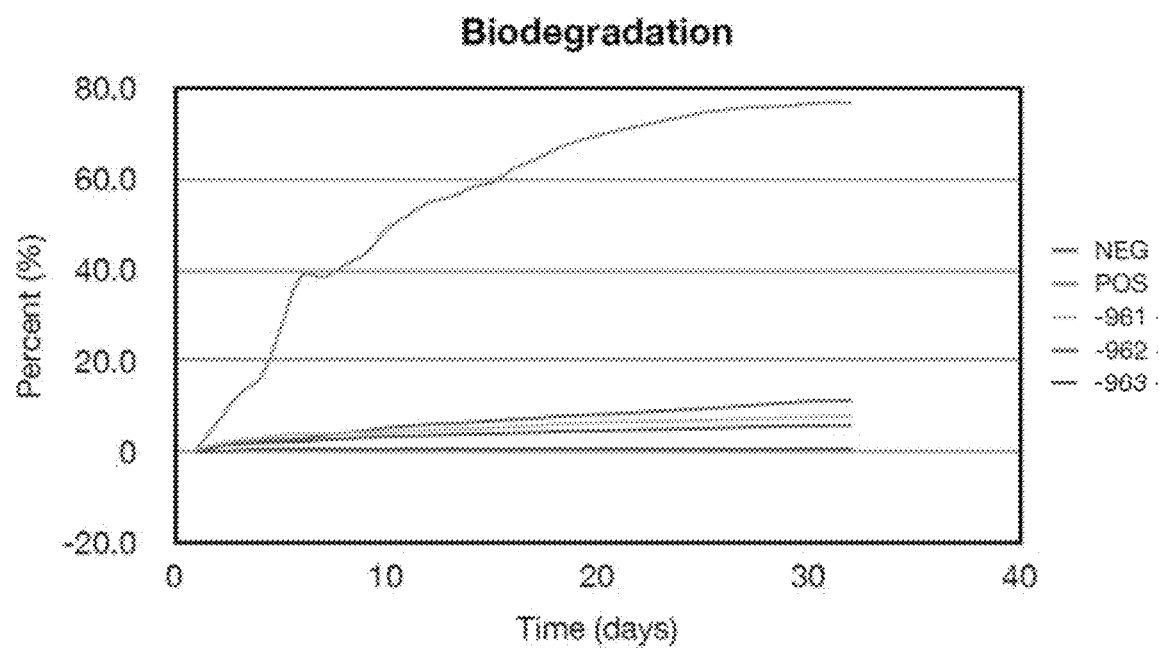
FIG. 4A and FIG. 4B illustrate percent biodegradation measured over 32 days according to biomethane potential testing of three additional samples formed according to techniques described herein.
Figure 4B:
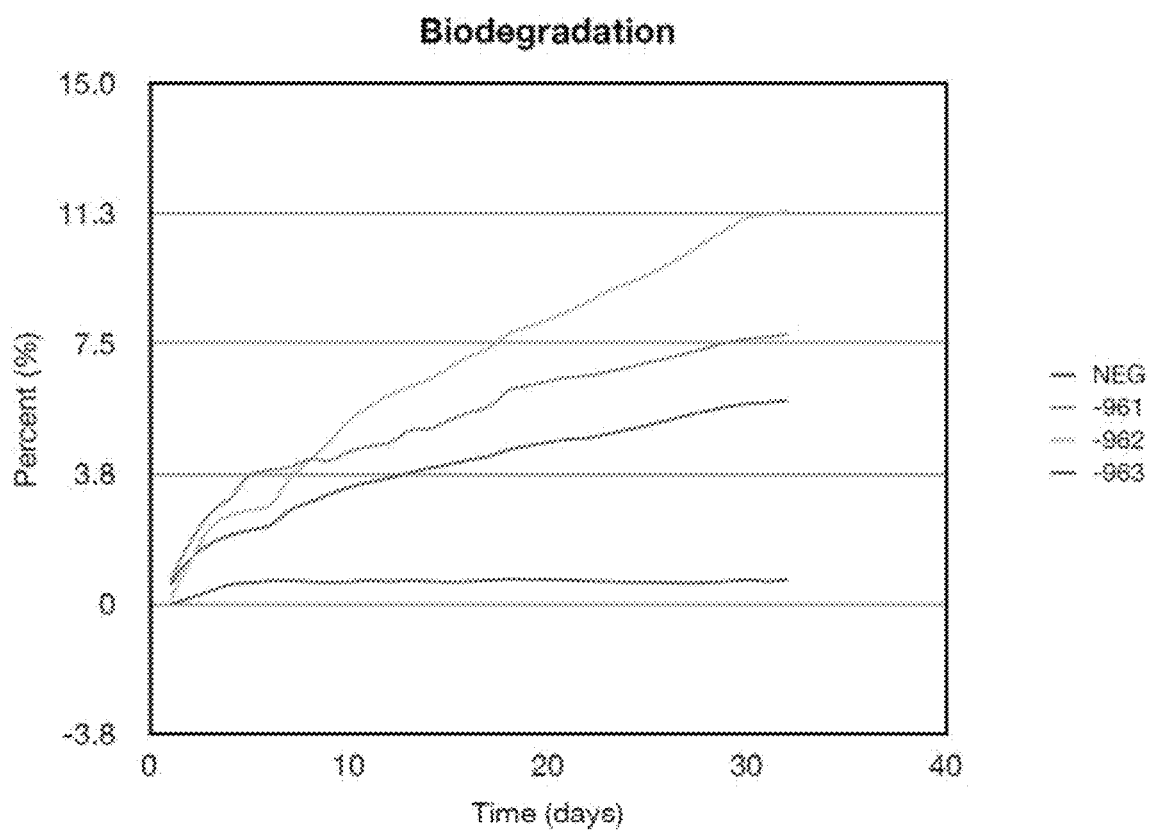

The results of biomethane potential testing for samples 961, 962, and 963 are shown in FIGS. 4A and 4B, and Table 13.

TABLE 13

|  | Inoculum | Negative | Positive | 961 | 962 | 963 |
|---|---|---|---|---|---|---|
| Cumulative Gas Volume (mL) | 729.6 | 962.5 | 8184.2 | 4286.4 | 5538.9 | 5796.5 |
| Percent $CH_4$ (%) | 18.4 | 19.3 | 35.4 | 27.1 | 31.8 | 0.0 |
| Volume $CH_4$ (mL) | 134.2 | 185.5 | 2898.2 | 1161.9 | 1759.5 | 0.0 |
| Mass $CH_4$ (g) | 0.10 | 0.13 | 2.07 | 0.83 | 1.26 | 0.00 |
| Percent $CO_2$ (%) | 49.9 | 44.0 | 44.5 | 42.5 | 42.7 | 40.9 |
| Volume $CO_2$ (mL) | 364.0 | 423.3 | 3639.8 | 1821.0 | 2363.9 | 2370.7 |
| Mass $CO_2$ (g) | 0.72 | 0.83 | 7.15 | 3.58 | 4.64 | 4.66 |
| Sample Mass (g) | 1,000 | 10 | 1.0 | 20.0 | 20.0 | 20 |
| Theoretical Sample Mass (g) | 0.0 | 8.6 | 4.2 | 17.1 | 17.1 | 17.1 |
| Biodegraded Mass (g) | 0.27 | 0.33 | 3.50 | 1.60 | 2.21 | 1.27 |
| Percent Biodegraded (%) |  | 0.7 | 76.7 | 7.8 | 11.3 | 5.9 |
| Adjusted Percent Biodegraded (%) |  | 0.9 | 100.0 | 10.1 | 14.8 | 7.6 |

The content and form of the samples tested can be found in Table 14. The starch-based polymer material was formed from 27% glycerin (99% pure) and 73% starch, and exhibited <about 1% water. "Ecoflex" refers to the Ecoflex® plastic product available from BASF. Bio-B refers to a degradation enhancing additive available from BiologiQ.

TABLE 14

| Sample No. | Starch-Based Polymer (%) | Polyethylene (%) | Ecoflex (%) | Maleic Anhydride Modified LLDPE (%) | Additive (%) | Biodegradation-Enhancing Additive | Form |
|---|---|---|---|---|---|---|---|
| 957 | 100 | 0 | | 0 | 0 | — | Press-outs |
| 958 | 25 | 70 | | 5 | 0 | — | Film |
| 959 | 30 | 65 | | 5 | 0 | — | Film |
| 960 | 25 | 70 | | 5 | 0 | — | Bag |
| 961 | 25 | 69 | | 5 | 1 | Enso Restore | Film |
| 962 | 25 | 69.5 | | 5 | 0.5 | Bio-B | Film |
| 963 | 30 | 15 | 50 | 5 | 0 | — | Film |

Example 7

Figure 5A:
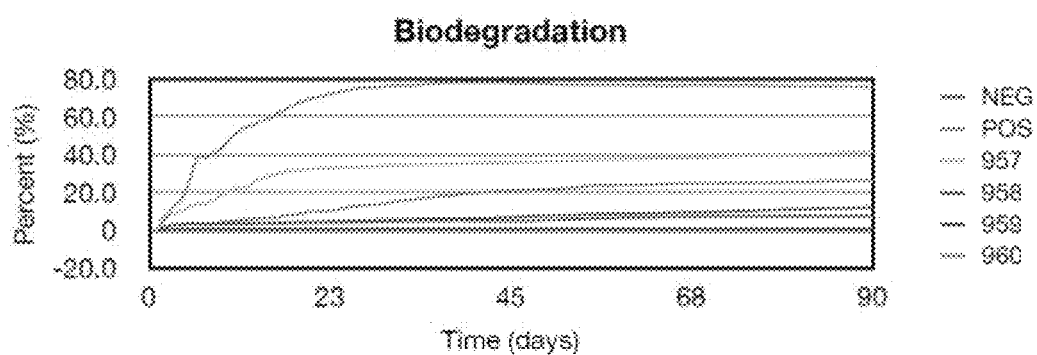
FIG. 5A and FIG. 5B illustrate percent biodegradation measured over 91 days according to biomethane potential testing of four samples formed according to techniques described herein.
Figure 5B:
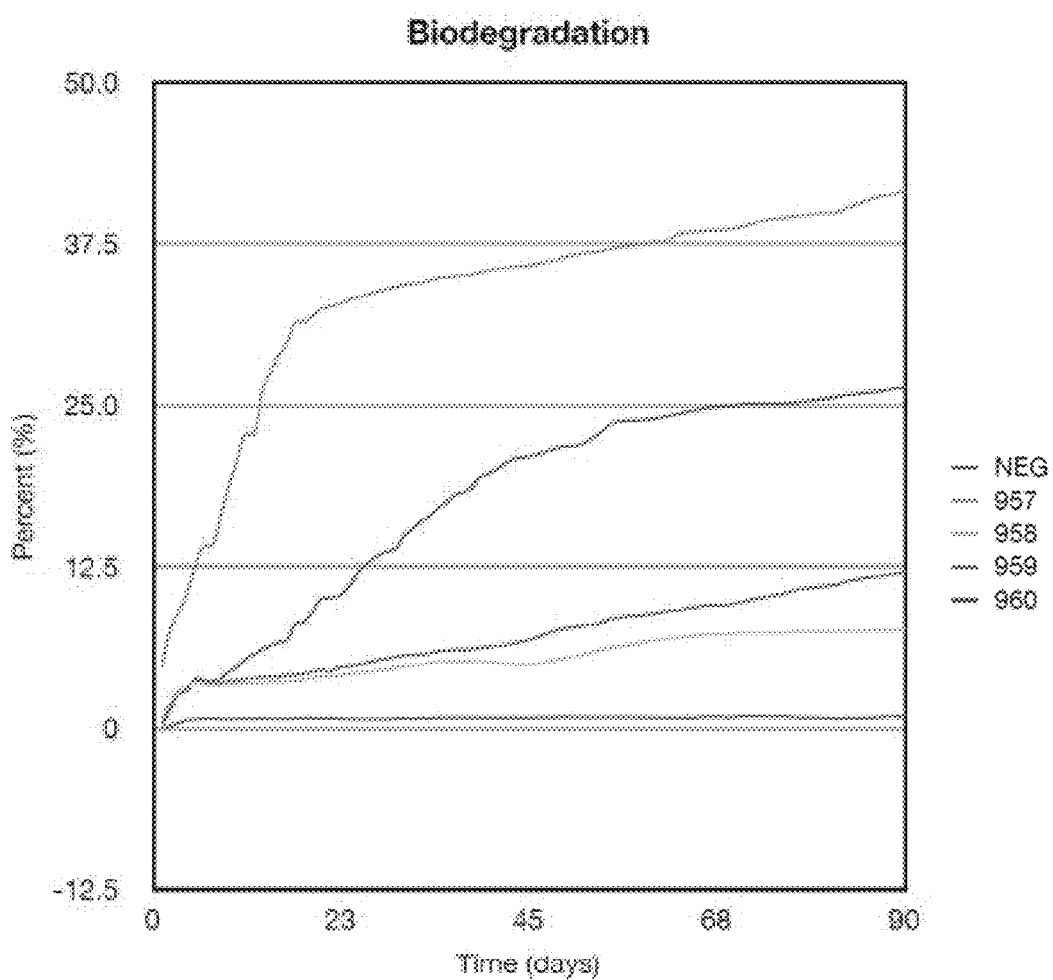

Seven samples were tested for 91 days to determine biodegradability characteristics using biomethane potential testing conducted at a temperature of about 52° C. using an inoculum having about 55% by weight water and about 45% by weight organic solids, to determine the potential for anaerobic biodegradation based on methanogenesis as a percent of total methanogenesis potential. The positive control sample was cellulose and the negative control sample was untreated polyethylene. The results of sample numbers 957, 958, 959, and 960 (compositions shown in Table 14) are shown in FIGS. 5A and 5B and in Table 15.

TABLE 15

|  | Inoculum | Negative | Positive | 957 | 958 | 959 | 960 |
|---|---|---|---|---|---|---|---|
| Cumulative Gas Volume (mL) | 811.3 | 1067.4 | 8211.9 | 18074.3 | 4045.8 | 5643.8 | 10915.8 |
| Percent $CH_4$ (%) | 22.3 | 23.2 | 35.5 | 34.7 | 32.7 | 39.4 | 42.2 |
| Volume $CH_4$ (mL) | 180.6 | 248.1 | 2914.5 | 6273.2 | 1321.2 | 2224.8 | 4608.8 |
| Mass $CH_4$ (g) | 0.13 | 0.18 | 2.08 | 4.48 | 0.94 | 1.59 | 3.29 |
| Percent $CO_2$ (%) | 48.4 | 43.1 | 44.4 | 42.6 | 42.1 | 39.7 | 40.3 |
| Volume $CO_2$ (mL) | 392.4 | 460.3 | 3649.4 | 7692.5 | 1703.2 | 2238.1 | 4401.5 |
| Mass $CO_2$ (g) | 0.77 | 0.90 | 7.17 | 15.11 | 3.35 | 4.40 | 8.65 |
| Sample Mass (g) | 1,000 | 10 | 10 | 20.0 | 20.0 | 20 | 20 |
| Theoretical Sample Mass (g) | 1.0 | 8.6 | 4.2 | 17.1 | 17.1 | 17.1 | 17.1 |
| Biodegraded Mass (g) | 0.31 | 0.38 | 3.52 | 7.48 | 1.62 | 2.39 | 4.83 |
| Percent Biodegraded (%) |  | 0.8 | 76.1 | 41.9 | 7.7 | 12.2 | 26.4 |
| Adjusted Percent Biodegraded (%) |  | 1.1 | 100.0 | 55.0 | 10.1 | 16.0 | 34.7 |

Figure 6A:
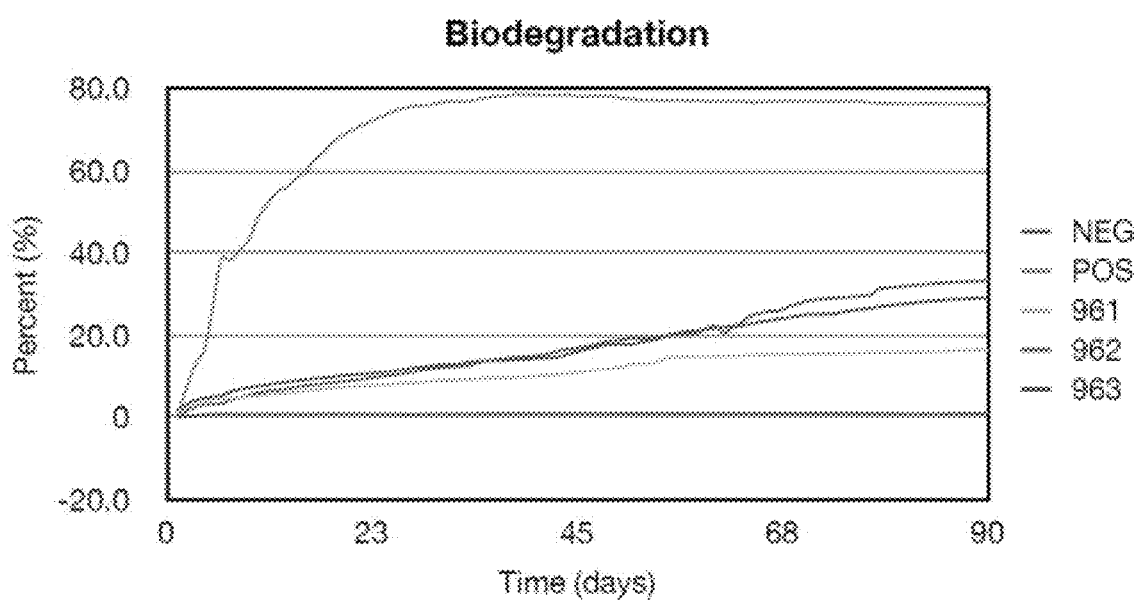
FIG. 6A and FIG. 6B illustrate percent biodegradation measured over 91 days according to biomethane potential testing of three additional samples formed according to techniques described herein.
Figure 6B:
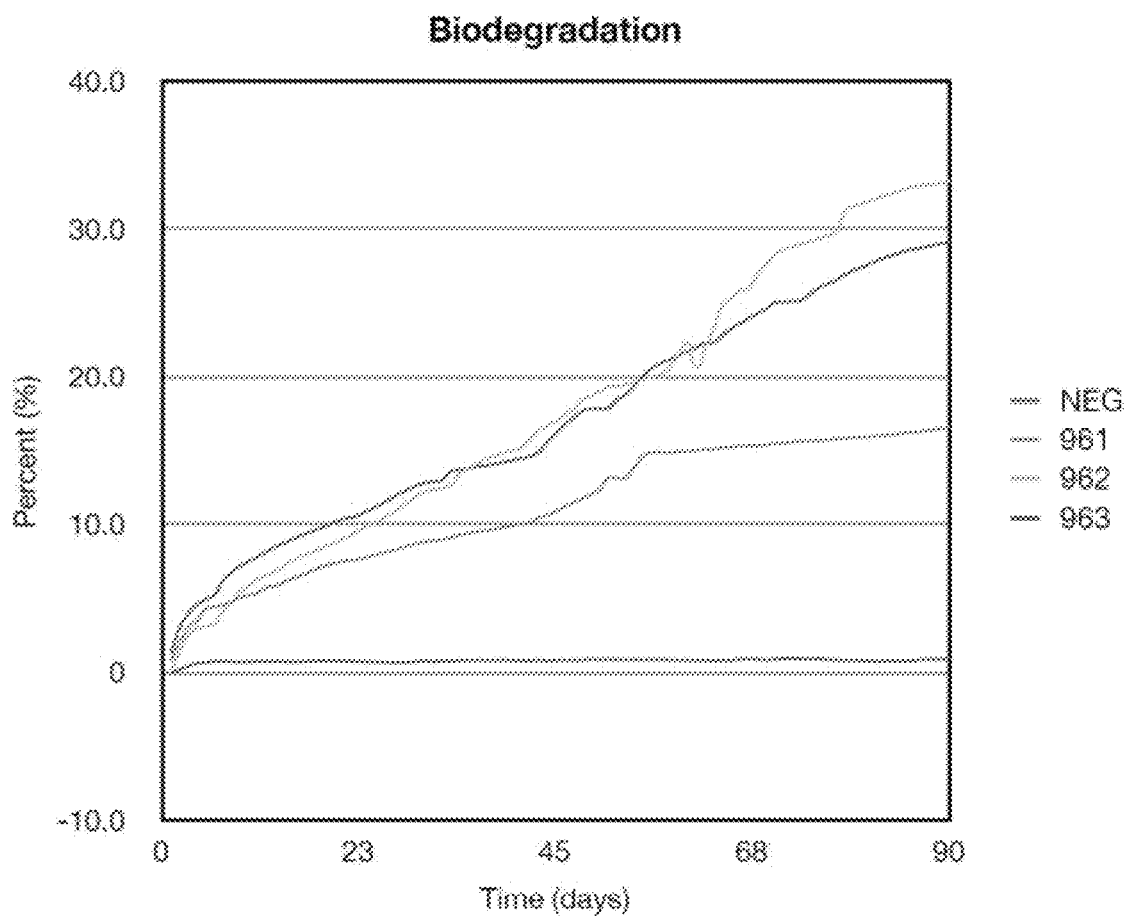

The biomethane potential testing results of sample numbers 961, 962, and 963 (compositions shown in Table 14) are shown in FIGS. 6A and 6B and in Table 16.

TABLE 16

|  | Inoculum | Negative | Positive | 961 | 962 | 963 |
|---|---|---|---|---|---|---|
| Cumulative Gas Volume (mL) | 811.3 | 1067.4 | 8211.9 | 7385.2 | 13059.8 | 11733.3 |
| Percent $CH_4$ (%) | 22.3 | 23.2 | 35.5 | 38.6 | 46.3 | 45.2 |
| Volume $CH_4$ (mL) | 180.6 | 248.1 | 2914.5 | 2849.9 | 6052.3 | 5302.2 |
| Mass $CH_4$ (g) | 0.13 | 0.18 | 2.08 | 2.04 | 4.32 | 3.79 |
| Percent $CO_2$ (%) | 48.4 | 43.1 | 44.4 | 40.9 | 39.8 | 39.6 |
| Volume $CO_2$ (mL) | 392.4 | 460.3 | 3649.4 | 3023.8 | 5197.1 | 4643.4 |
| Mass $CO_2$ (g) | 0.77 | 0.90 | 7.17 | 5.94 | 10.21 | 9.12 |
| Sample Mass (g) | 1,000 | 10 | 10 | 20.0 | 20.0 | 20 |

TABLE 16-continued

|  | Inoculum | Negative | Positive | 961 | 962 | 963 |
|---|---|---|---|---|---|---|
| Theoretical Sample Mass (g) | 0.0 | 8.6 | 4.2 | 17.1 | 17.1 | 17.1 |
| Biodegraded Mass (g) | 0.31 | 0.38 | 3.52 | 3.15 | 6.03 | 5.33 |
| Percent Biodegraded (%) |  | 0.8 | 76.1 | 16.6 | 33.4 | 29.3 |
| Adjusted Percent Biodegraded (%) |  | 1.1 | 100.0 | 21.8 | 43.9 | 38.5 |

Example 8

Figure 7A:
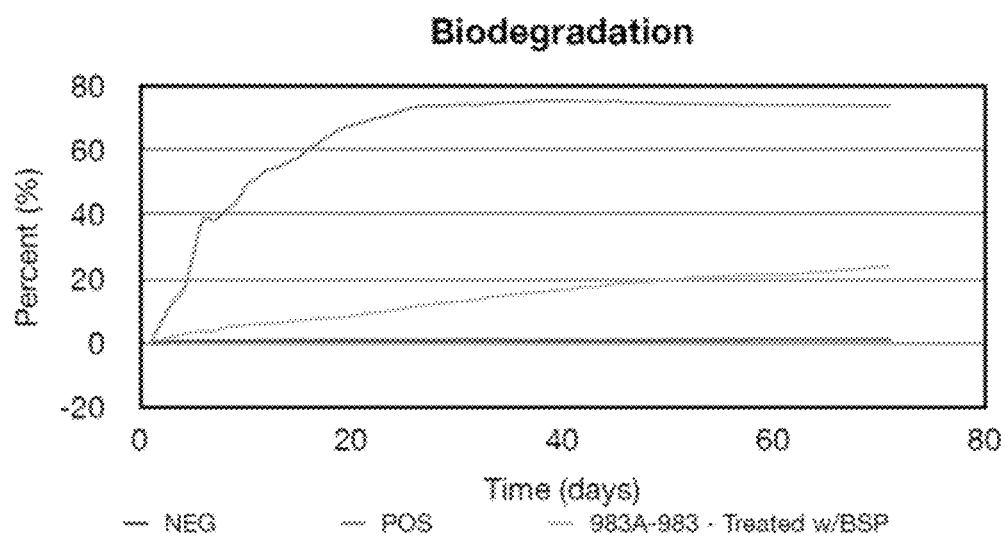
FIG. 7A and FIG. 7B illustrate percent biodegradation measured over 71 days according to biomethane potential testing of one sample formed according to techniques described herein.
Figure 7B:
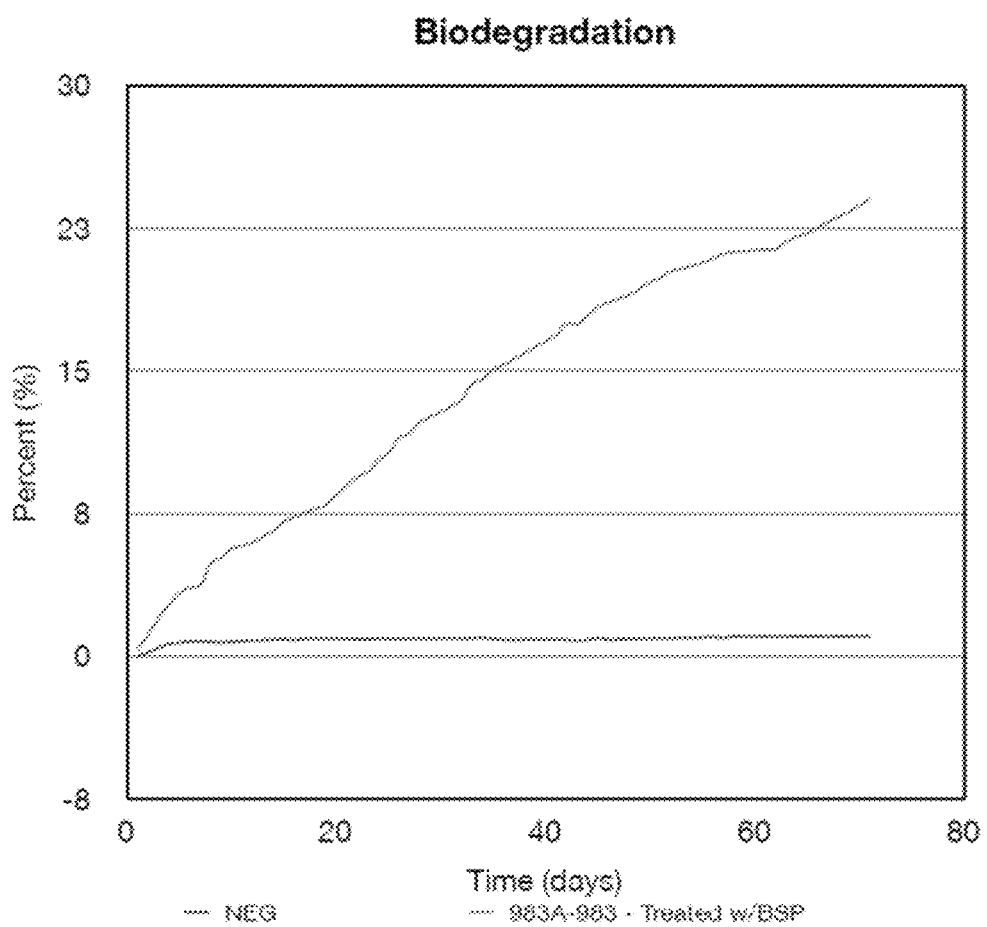

A film was tested for 71 days to determine biodegradability characteristics using biomethane potential testing conducted at a temperature of about 52° C. using an inoculum having about 55% by weight water and about 45% by weight organic solids, to determine the potential for anaerobic biodegradation based on methanogenesis as a percent of total methanogenesis potential. The positive control sample was cellulose and the negative control sample was untreated polyethylene. The film contained 25% starch-based polymer material (with 27% of the starch-based polymer material being formed from glycerin (99% pure) and 73% of the starch-based polymer material being formed from starch), and exhibited <about 1% water). The film included 1% Biosphere® additive; 5% maleic anhydride compatibilizer, and 69% modified LLDPE. The results of the biomethane potential testing of sample number 983 are shown in FIGS. 7A and 7B and in Table 17.

TABLE 17

|  | Inoculum | Negative | Positive | 983 |
|---|---|---|---|---|
| Cumulative Gas Volume (mL) | 1021.1 | 1326.5 | 8225.8 | 10104.5 |
| Percent CH$_4$ (%) | 26.3 | 27.4 | 35.5 | 41.7 |
| Volume CH$_4$ (mL) | 268.4 | 363.3 | 2922.7 | 4214.4 |
| Mass CH$_4$ (g) | 0.19 | 0.26 | 2.09 | 3.01 |
| Percent CO$_2$ (%) | 47.6 | 42.3 | 44.4 | 41.9 |
| Volume CO$_2$ (mL) | 185.7 | 561.2 | 3654.2 | 4230.1 |
| Mass CO$_2$ (g) | 0.95 | 1.10 | 7.18 | 8.31 |
| Sample Mass (g) | 1,000 | 10 | 10 | 20.0 |
| Theoretical Sample Mass (g) | 0.0 | 8.6 | 4.2 | 17.1 |
| Biodegraded Mass (g) | 0.40 | 0.50 | 3.52 | 4.52 |
| Percent Biodegraded (%) |  | 1.1 | 73.9 | 24.0 |
| * Adjusted Percent Biodegraded (%) |  | 1.4 | 100.0 | 32.5 |

Example 9

Eight samples (sample numbers 957-963 and 983; compositions shown in Examples 5 and 7) were tested for 91 days to determine biodegradability characteristics using biomethane potential testing conducted at a temperature of about 52° C. using an inoculum having about 55% by weight water and about 45% by weight organic solids, to determine the potential for anaerobic biodegradation based on methanogenesis as a percent of total methanogenesis potential. The positive control sample was cellulose and the negative control sample was untreated polyethylene. The results are shown in Table 18. The results shown in Table 18 indicate that samples formed from a mixture of a starch-based polymer and a polyolefin based polymer biodegrades an amount that is greater than the amount of the starch-based polymer. In some cases, the sample that biodegraded more than an amount of the starch-based polymer present was free of a biodegradation enhancing additive. Such results are surprising, and particularly advantageous.

TABLE 18

| | % Degraded | | | | |
|---|---|---|---|---|---|
| Item # | 32 Days | 42 Days | 62 Days | 71 Days | 91 Days |
| 957 | 37.50% |  | 48.40% |  | 55.00% |
| 958 | 5.40% |  | 8.10% |  | 10.10% |
| 959 | 2.90% |  | 11.30% |  | 16.00% |
| 960 | 16.00% |  | 30.00% |  | 34.70% |
| 961 | 10.10% |  | 19.40% |  | 21.80% |
| 962 | 14.80% |  | 26.40% |  | 43.90% |
| 963 | 7.60% |  | 28.10% |  | 38.50% |
| 983 |  | 19.20% |  | 32.50% |  |

Example 10

Four samples (sample numbers 100, 200, 300, and 400) were tested for compostability using the ASTM D-6400 standard at the time of filing of this patent application. The ASTM D-6400 standard specifies a phytotoxicity testing procedure, indicates that the biodegradation of articles is to be measured according to the ASTM D-5338-11 test, and that an elemental analysis is to utilize Table 3 of 40 C.P.R. Part 503.13. The compositions of the samples and the biodegradation portion of the compostability test results are shown in Table 19. The starch-based polymeric material was formed from a blend of starches including 90% corn starch and 10% potato starch. The first petrochemical-based polymeric material was a linear low-density polyethylene produced using a metallocene catalyst. The compatibilizer for samples 100 and 200 was a Bynel® compatibilizer from DuPont® and the compatibilizer for samples 300 and 400 was an Amplify™ compatibilizer from Dow®. The biodegradation enhancing additive for samples 100 and 200 was from Biosphere® and the biodegradation enhancing additive for sample 300 was from ENSO. The second petrochemical-based polymeric material was Ecoflex® from BASF, which is a fossil raw materials-based plastic that is compostable according to the ASTM D-6400 standard. The 98 day biodegradability results indicated the test chamber carbon dioxide measurement as a percentage of a theoretical maximum amount of carbon dioxide for the sample after 98 days. The 180 day biodegradability results indicated the test chamber carbon dioxide measurement as a percentage of a theoretical maximum amount of carbon dioxide after 180 days.

Figure 8A:
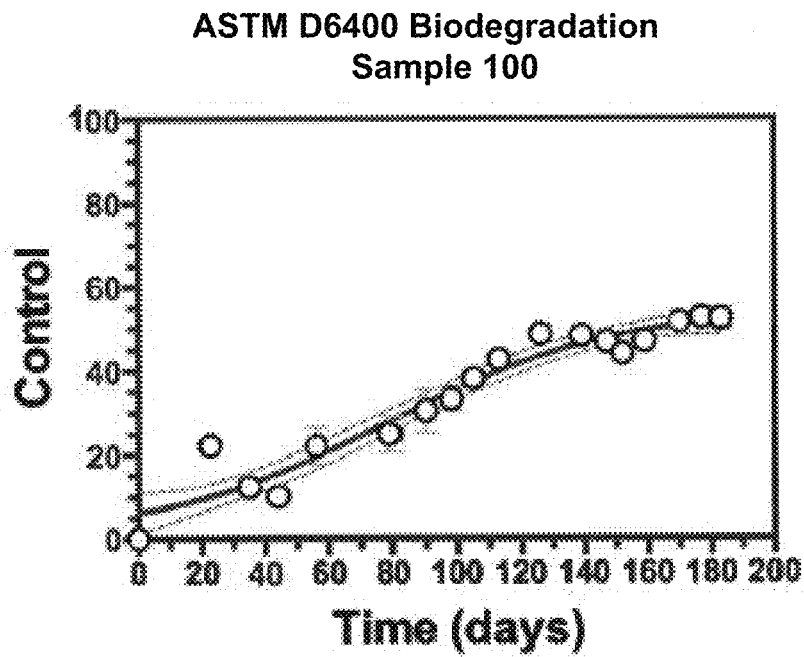
FIG. 8A and FIG. 8B show the results of the biodegradation portion of the ASTM D-6400 test performed according to ASTM D-5338 for a first sample and a second sample formed according to techniques described herein.
Figure 8B:
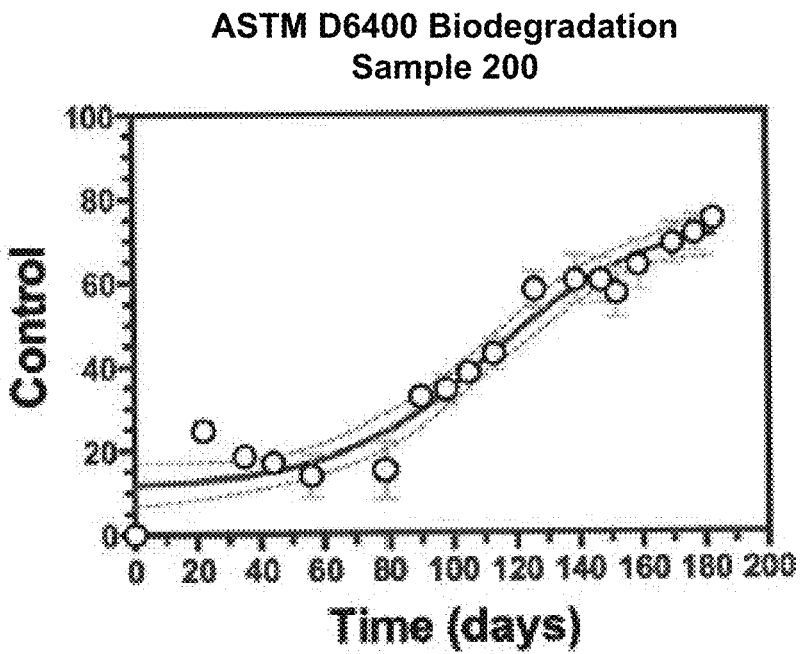
Figure 9A:
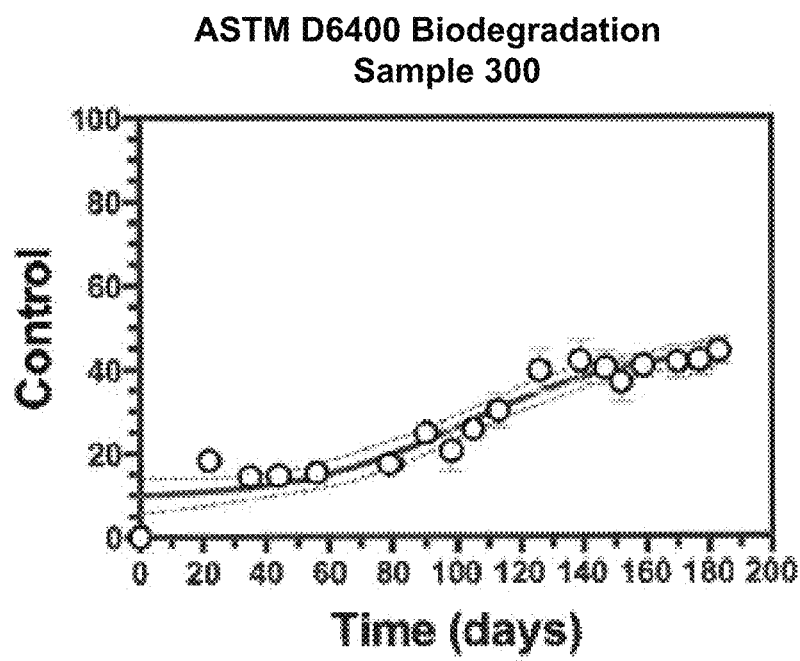
FIG. 9A and FIG. 9B show the results of the biodegradation portion of the ASTM D-6400 test performed according to ASTM D-5338 for a third sample and a fourth sample formed according to techniques described herein.
Figure 9B:
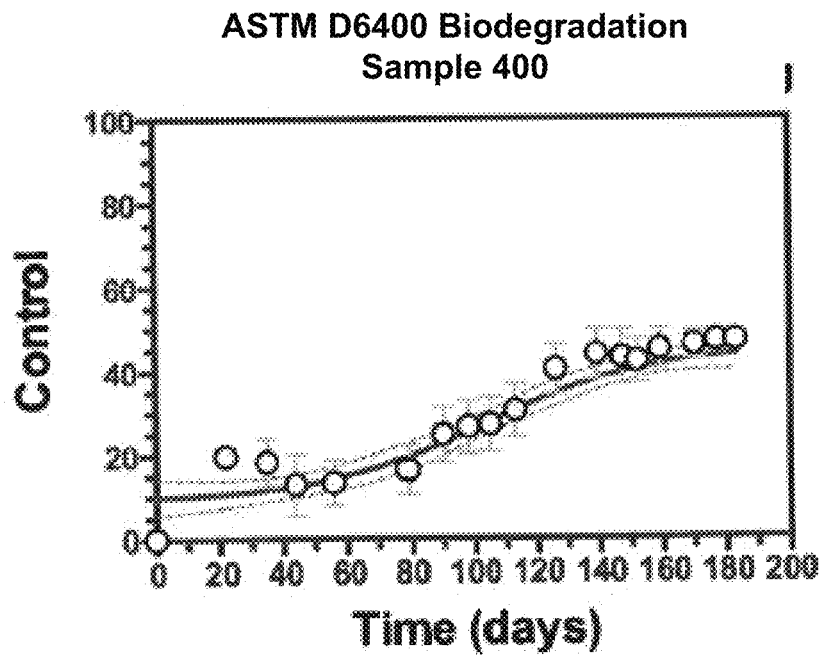

FIG. 8A shows the results of the biodegradation portion of the ASTM D-6400 test performed according to ASTM D-5338 for sample 100. FIG. 8B shows the results of the biodegradation portion of the ASTM D-6400 test performed according to ASTM D-5338 for sample 200. FIG. 9A shows the results of the biodegradation portion of the ASTM D-6400 test performed according to ASTM D-5338 for sample 300 and FIG. 9B shows the results of the biodegradation portion of the ASTM D-6400 test performed according to ASTM D-5338 for sample 400. The results of the biodegradation portion of the ASTM D-6400 test indicate that, after 180 days, an amount of first petrochemical-based polymeric material in samples 100, 300, and 400 has degraded partially because the amount of carbon dioxide measured in the test chamber is greater than the percentage of the starch-based polymeric material included in these samples. Thus, at least a portion of the remainder of the carbon dioxide emissions is due to the degradation of the first petrochemical-based polymeric material. This observation includes sample 400, which is free of a biodegradation enhancing additive. Such a result is surprising and advantageous.

FIG. 10 shows the results of the phytotoxicity portion of the ASTM D-6400 test for sample 100. FIG. 11 shows the results of the phytotoxicity portion of the ASTM D-6400 test for sample 200. FIG. 12 shows the results of the phytotoxicity portion of the ASTM D-6400 test for sample 300. FIG. 13 shows the results of the phytotoxicity portion of the ASTM D-6400 test for sample 400. Passing the phytotoxicity portion of the ASTM D-6400 test indicates that the linear low density polyethylene included in the samples was being degraded without the production of harmful byproducts.

FIG. 14A shows the results of the elemental analysis portion of the ASTM D-6400 test based on Table 3 of 40 C.P.R. Part 503.13 for sample 100. FIG. 14B shows the results of the elemental analysis portion of the ASTM D-6400 test based on Table 3 of 40 C.P.R. Part 503.13 for sample 200. FIG. 15A shows the results of the elemental analysis portion of the ASTM D-6400 test based on Table 3 of 40 C.P.R. Part 503.13 for sample 300. FIG. 15B shows the results of the elemental analysis portion of the ASTM D-6400 test for sample 400. The results for the elemental analysis portion of the ASTM D-6400 test based on Table 3 of 40 C.P.R. Part 503.13 also indicate the absence of harmful byproducts as the samples degraded.

TABLE 19

|  | Sample No. 100 | Sample No. 200 | Sample No. 300 | Sample No. 400 |
| --- | --- | --- | --- | --- |
| Starch-Based Polymeric Material | 30% | 30% | 40% | 25% |
| First Petrochemical-Based Polymeric Material | 64% | 15% | 50% | 70% |
| Compatibilizer | 5% | 5% | 5% | 5% |
| Biodegradation Enhancing Additive | 1% | 1% | 5% | 0% |
| Second Petrochemical-Based Polymeric Material | 0% | 49% | 0% | 0% |
| Film Thickness (mm) | 0.34 | 0.34 | — | 0.44 |
| 98 Day Biodegradability Results | 33% | 29% | 20% | 22% |
| 180 Day Biodegradability Results | 55% | 74% | 45% | 48% |

Example 11

Figure 16:
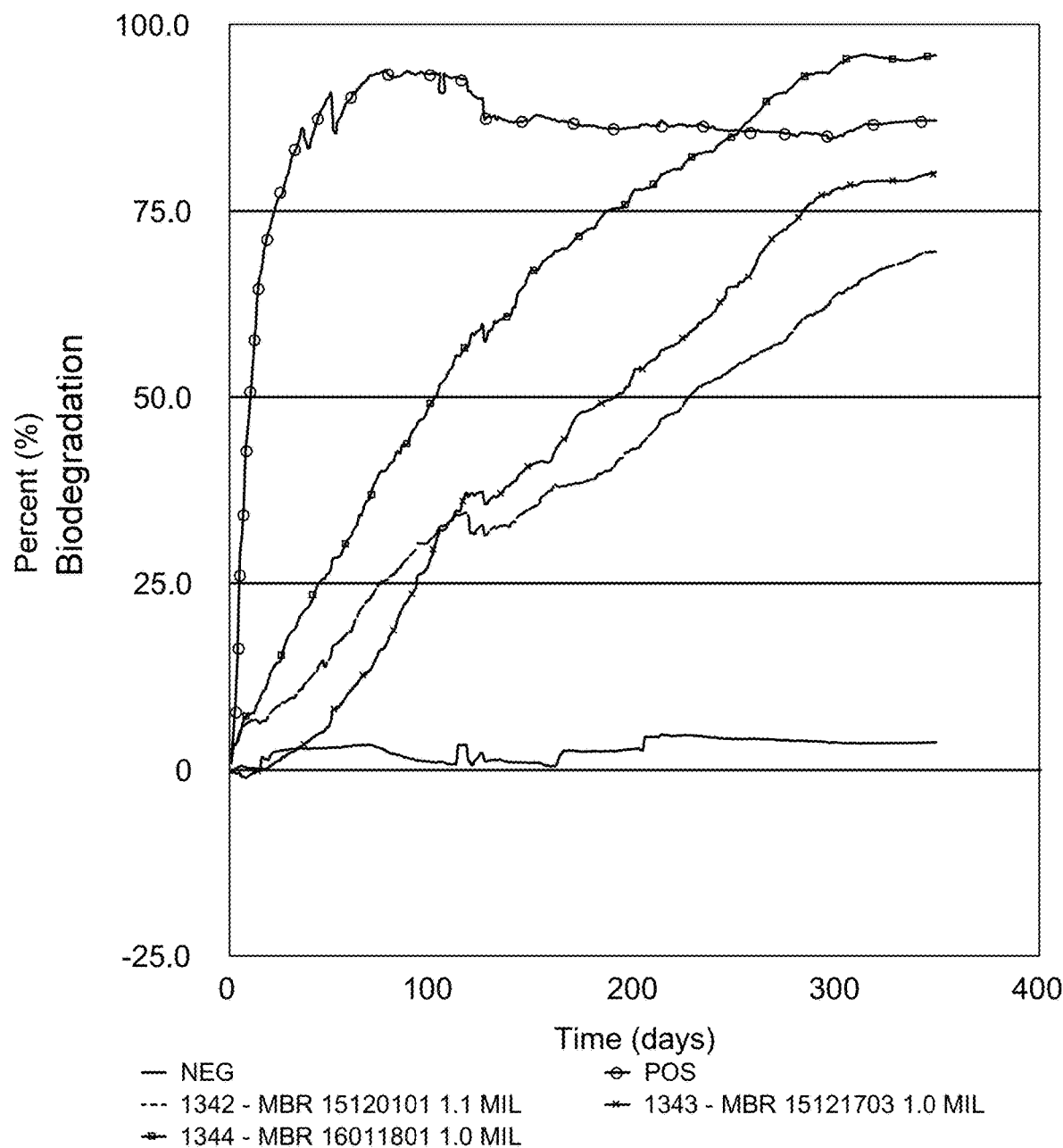
FIG. 16 shows percent biodegradation measured over 349 days according to testing conducted under ASTM D-5511 for three samples formed according to the present disclosure.

Three samples were tested for 349 days to determine biodegradability characteristics according to ASTM D-5511. The test was intended to replicate the conditions of a full-scale anaerobic digester (landfill). The results of the three samples (referred to as 1342, 1343, and 1344) are shown in FIG. 16 and in Table 20. Sample 1342 was formed from 30% ESR (the starch-based polymeric material), 67% PBAT, and 3% compatibilizer, and had a thickness of 1.1 mil. Sample 1343 was formed from 27.5% ESR, 70% PBAT and 2.5% compatibilizer, and had a thickness of 1.0 mil. Sample 1344 was formed from 40% ESR, 56% LLDPE and 4% compatibilizer, and had a thickness of 1.0 mil.

TABLE 20

|  | Inoculum | Negative | Positive | 1342 | 1343 | 1344 |
| --- | --- | --- | --- | --- | --- | --- |
| Cumulative Gas Volume (mL) | 4064.3 | 4898.8 | 12330.2 | 18429.0 | 20233.7 | 31171.1 |
| Percent $CH_4$ (%) | 43.2 | 43.6 | 41.4 | 48.8 | 53.7 | 51.7 |
| Volume $CH_4$ (mL) | 1757.0 | 2135.1 | 5101.0 | 8992.6 | 10865.0 | 16106.6 |
| Mass $CH_4$ (g) | 1.26 | 1.53 | 3.64 | 6.42 | 7.76 | 11.5 |
| Percent $CO_2$ (%) | 40.4 | 37.8 | 41.9 | 35.5 | 35.7 | 38.0 |
| Volume $CO_2$ (mL) | 1643.0 | 1852.9 | 5160.5 | 6547.5 | 7230.7 | 11838.7 |
| Mass $CO_2$ (g) | 3.23 | 3.64 | 10.14 | 12.86 | 14.20 | 23.25 |
| Sample Mass (g) | 10 | 10 | 10 | 20.0 | 20.0 | 20 |
| Theoretical Sample Mass (g) | 0.0 | 8.6 | 4.2 | 9.8 | 9.8 | 13.7 |
| Biodegraded Mass (g) | 1.82 | 2.14 | 5.50 | 8.33 | 9.69 | 14.97 |
| Percent Biodegraded (%) |  | 3.7 | 87.1 | 66.4 | 80.2 | 95.8 |

FIG. 16 shows that after 204 days, the negative control showed 2.5% degradation, the positive control showed 86.5% degradation, sample 1342 showed 43.3% degradation, sample 1343 showed 53.9% degradation, and sample 1344 showed 77.2% degradation. At 349 days, the degradation values are as shown in Table 20.

The biodegradation after 349 days is particularly excellent. For example, while samples including PBAT (1342 and 1343) show very good biodegradation, with the percent biodegraded being far greater than the fraction of the starch-based polymeric material included in the film, sample 1344 is even more surprising, showing nearly 96% biodegradation (even higher than the positive control), where the petrochemical-based polymeric material is polyethylene, which under normal circumstances is not biodegradable (e.g., see the negative control, in Table 20 which was 100% polyethylene). Such biodegradation results are remarkable, and particularly advantageous.

Example 12

Figure 17:
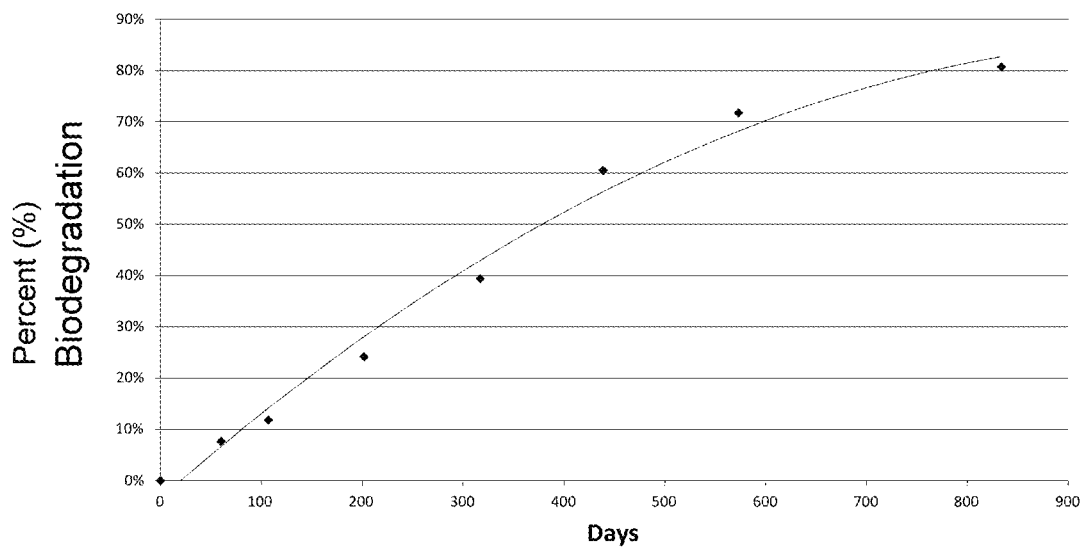
FIG. 17 shows percent biodegradation measured over 843 days according to testing conducted under ASTM D-5526 for potato bags made with 25% ESR, 70% LLDPE, and 5% compatibilizer under simulated landfill conditions.

Potato packaging bags made with a blend of 25% ESR, 70% LLDPE and 5% compatibilizer were tested for anaerobic biodegradation after 60 days, 107 days, 202 days, 317 days, 439 days, 573 days, and 834 days according to ASTM D-5526. The test was intended to replicate the conditions of a full-scale anaerobic digester (landfill). The test was conducted under various conditions, with an inoculum having about 35%, 45%, and 60% organic solids with the balance being water. The results for the inoculum including 35% organic solids (and 65% water) are shown in FIG. 17 and Table 21A. Table 21B shows results for other inoculum values, and for other samples. The potato bags had a thickness of 1.35 mils. These bags are referred to as sample 1072.

TABLE 21A

| 35% Solids @ 60 Days | 35% Solids @ 107 Days | 35% Solids @ 202 Days | 35% Solids @ 317 Days | 35% Solids @ 439 Days | 35% Solids @ 573 Days | 35% Solids @ 834 Days |
|---|---|---|---|---|---|---|
| 7.60% | 11.80% | 24.10% | 39.40% | 60.50% | 71.70% | 80.70% |

The potato bags made with 25% ESR, and 70% LLDPE showed a remarkable 81% biodegradation over 834 days under simulated landfill conditions. The ESR is homogeneously blended with the polyethylene, and advantageously results in the long carbon chains of the polyethylene being broken up, and digested by the same microorganisms that consume the starch-based polymeric ESR material. Such results show that the entire bag, including the polyethylene is being biodegraded into carbon dioxide, methane, and water. Such results are surprising and particularly advantageous.

The testing conducted with 45% organic solids and 60% organic solids also showed results in which the percent of biodegradation exceeded the percent of ESR included in the potato bag. Tests were also run with similar potato bags including 1% of a biodegradation enhancing additive (sample 1073), and other similar potato bags including Ecoflex® compostable resin, and metallocene LLDPE (sample 1075).

TABLE 21B

| | Negative Control Percent Solids | | | Positive Control Percent Solids | | |
|---|---|---|---|---|---|---|
| | 60% | 45% | 35% | 60% | 45% | 35% |
| Percent Biodegraded @ 834 days | 1.20% | 0.5 | 1.5 | 91.2 | 91.2 | 91.4 |

| | Sample 1072 Percent Solids | | | Sample 1073 Percent Solids | | |
|---|---|---|---|---|---|---|
| | 60% | 45% | 35% | 60% | 45% | 35% |
| Percent Biodegraded @ 834 days | 58.3 | 67.7 | 80.7 | 54.5 | 67.9 | 80.3 |

TABLE 21B-continued

| | Sample 1075 Percent Solids | | |
|---|---|---|---|
| | 60% | 45% | 35% |
| Percent Biodegraded @ 834 days | 72.7 | 83.3 | 86.1 |

Example 13

Figure 18:
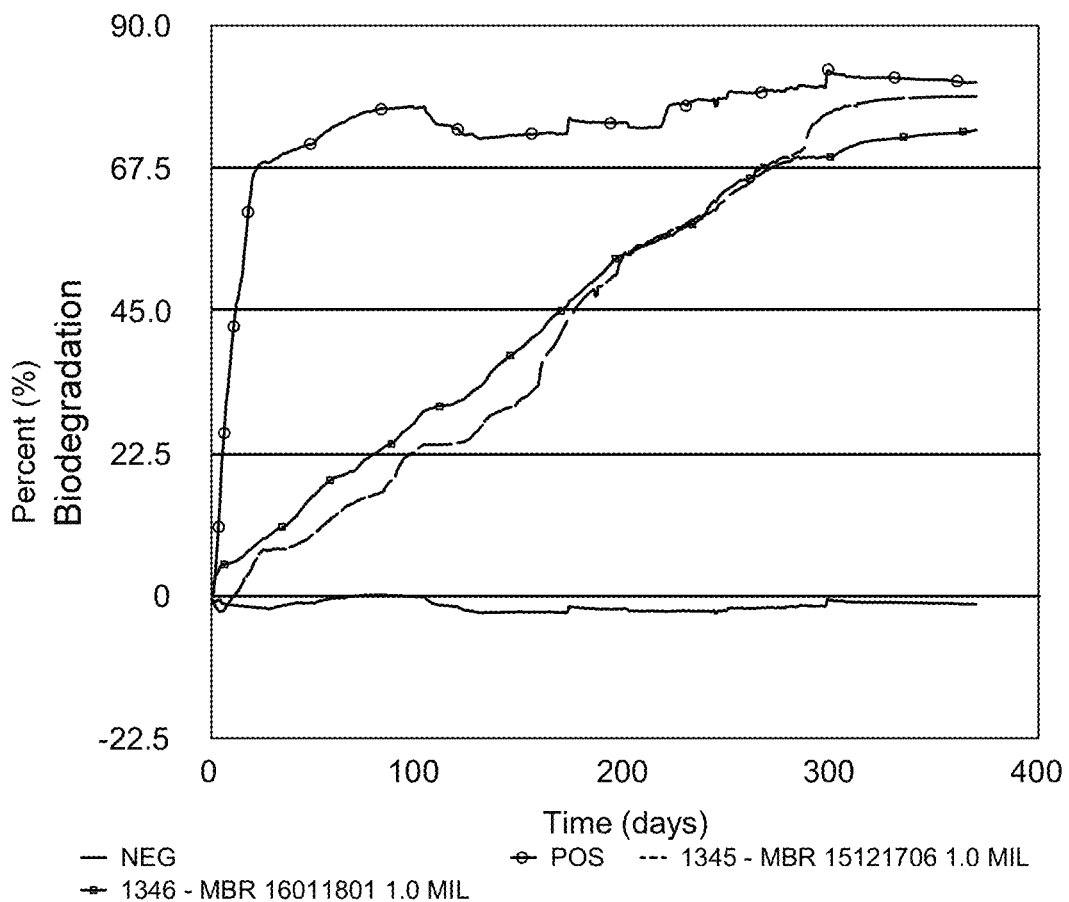
FIG. 18 shows percent biodegradation measured over 370 days according to testing conducted under ASTM D-5338 for various samples made according to the present disclosure, as well as comparative controls.

Films made with a blend of ESR and LLDPE were tested for anaerobic biodegradation after 201 days and 370 days according to ASTM D-5338. The conditions were meant to simulate aerobic digestion and/or industrial compost conditions. The tested films are labeled 1345 and 1346 in Table 22 and FIG. 18, which show the results after 370 days. At 201 days, samples 1345 and 1346 respectively showed adjusted percent biodegraded values of 74.2% and 72.4%, while the negative control showed −3.3% and the positive control showed 100%. FIG. 18 plots actual % biodegradation. Sample 1345 included 25% ESR, 72.5% LLDPE, and 2.5% compatibilizer. Sample 1346 included 40% ESR, 56% LLDPE, and 4% compatibilizer. Both films had a thickness of 1.0 mil.

TABLE 22

| | Inoculum | Negative | Positive | 1345 | 1346 |
|---|---|---|---|---|---|
| Cumulative Gas Volume (mL) | 3168.2 | 2864.3 | 10740.0 | 27603.3 | 24364.9 |
| Percent CO$_2$ (%) | 81.4 | 82.6 | 83.5 | 89.3 | 87.8 |
| Volume CO$_2$ (mL) | 2577.8 | 2366.4 | 8965.3 | 24638.1 | 21400.0 |
| Mass CO$_2$ (g) | 5.06 | 4.65 | 17.61 | 48.40 | 42.04 |
| Sample Mass (g) | 1000 | 10 | 10 | 20.0 | 20.0 |
| Theoretical Sample Mass (g) | 0.0 | 8.6 | 4.2 | 15.0 | 13.7 |
| Biodegraded Mass (g) | 1.38 | 1.27 | 4.80 | 13.20 | 11.46 |
| Percent Biodegraded (%) | | −1.3 | 81.1 | 78.8 | 73.5 |
| Adjusted Percent Biodegraded (%) | | −1.6 | 100.0 | 97.2 | 90.7 |

Example 14

Figure 19:
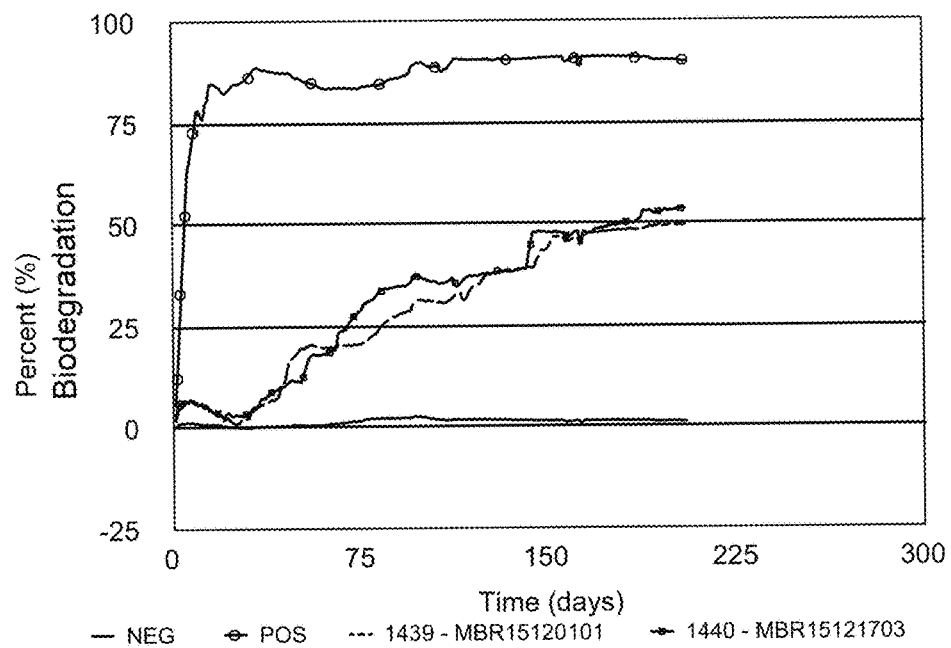
FIG. 19 shows percent biodegradation measured over 205 days according to ASTM D-6691, meant to simulate marine conditions, for various samples made according to the present disclosure, as well as comparative controls.

Films made with a blend of ESR and PBAT were tested for anaerobic biodegradation after 205 days according to ASTM D-6691, which is meant to simulate marine conditions. The tested films are labeled 1439 and 1440 in Table 23 and FIG. 19. At 205 days, samples 1439 and 1440 respectively showed adjusted percent biodegraded values of 49.6% and 53.6%. Sample 1439 included 30% ESR, 67% PBAT, and 3% compatibilizer. Sample 1440 included 27% ESR, 70% PBAT, and 2.5% compatibilizer. Sample film 1439 had a thickness of 1.1 mil, and sample film 1440 had a thickness of 1.0 mil.

TABLE 23

|  | Inoculum | Negative | Positive | 1439 | 1440 |
|---|---|---|---|---|---|
| Cumulative Gas Volume (mL) | 22.0 | 25.4 | 86.7 | 61.6 | 65.2 |
| Percent CO$_2$ (%) | 91.8 | 85.4 | 88.7 | 91.7 | 91.3 |
| Volume CO$_2$ (mL) | 20.2 | 21.7 | 76.9 | 56.4 | 59.5 |
| Mass CO$_2$ (g) | 0.040 | 0.043 | 0.151 | 0.111 | 0.117 |
| Sample Mass (g) |  | 0.080 | 0.080 | 0.080 | 0.080 |
| Theoretical Sample Mass (g) |  | 0.069 | 0.034 | 0.039 | 0.039 |
| Biodegraded Mass (g) | 0.011 | 0.012 | 0.041 | 0.030 | 0.032 |
| Percent Biodegraded (%) |  | 1.2 | 90.0 | 49.6 | 53.6 |

The films showed a greater degree of biodegradation over 205 days relative to the percentage of ESR included in the film. In other words, the long carbon chains of the polymer are being broken up, and digested by the same microorganisms that consume the starch-based polymeric ESR material.

Example 15

Additional manufactured films were tested for biodegradability. Table 24 below summarizes the results of such testing, some of which are described in detail above (e.g., Examples 13 and 14). Such testing shows excellent biodegradability results across a wide range of fractions of carbohydrate-based polymeric materials, and different petrochemical-based polymeric materials, under various simulated conditions (e.g., landfills, composting, marine environments).

TABLE 24

|  | Sample 1072 | Sample MBR 16011801 | Sample MBR 15121706 | Sample MBR 16011801 | Sample MBR 16070601 | Sample MBR 15120101 | Sample MBR 15121703 |
|---|---|---|---|---|---|---|---|
| Test Condition | Landfill ASTM D-5526 | Landfill ASTM D-5511 | Compost ASTM D-5338 | Compost ASTM D-5338 | Compost ASTM D-5338 | Marine ASTM D-6691 | Marine ASTM D-6691 |
| ESR % | 25% | 40% | 25% | 40% | 40% | 30% | 27% |
| Compatibilizer + PE % | 75% | 60% | 75% | 60% | 11% | 3% | 3% |
| PBAT % | 0% | 0% | 0% | 0% | 49% | 67% | 70% |
| Thickness | 1.35 mil | 1 mil | 1 mil | 1 mil | 1.5 mil | 1 mil | 1 mil |
| Days | 573 | 204 | 201 | 201 | 59 | 205 | 205 |
| % Degraded | 71.1% | 77.2% | 74.2% | 72.4% | 96.9% | 49.6% | 53.6% |

IV. Conclusion

In closing, although the various implementations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

In closing, it is to be understood that the embodiments of the inventive features disclosed herein are illustrative of the principles of the inventive features. Other modifications that may be employed are within the scope of the inventive features. Thus, by way of example, but not of limitation, alternative configurations of the inventive features may be utilized in accordance with the teachings herein. Accordingly, the inventive features are not limited to that precisely as shown and described.

The invention claimed is:

1. An article consisting essentially of a blend of:
   (a) from about 5 to 35% by weight of one or more starch-based polymeric materials formed from a starch and a plasticizer; and
   (b) at least 55% by weight of polyethylene;
   wherein the blend of the one or more starch-based polymeric materials and the polyethylene, when formed into a film of 1 mil thickness has a dart drop impact test value of at least 20% greater than a film of the same thickness formed from the polyethylene substantially free of the starch based polymeric material, the at least 20% increase in dart drop being exhibited over the full range of about 5% to 35% by weight of the starch-based polymeric material;
   wherein the starch-based polymeric material has a crystallinity of less than about 20%, and resists recrystallization, a water content of no more than about 2%, and the starch-based polymeric material and polyethylene exhibit a lack of sea-island features when blended together to form the article.

2. The article of claim 1, wherein the one or more starch-based polymeric materials comprises one or more of potato starch, corn starch, or tapioca starch, and the plasticizer comprises glycerin.

3. The article of claim 1, wherein the article is a bag having a thickness from about 0.1 mil to about 4 mils and the bag includes a cavity having a volume from about 1 L to about 100 L.

4. The article of claim 1, wherein:
   the polyethylene comprises about 65% % by weight to about 95% by weight of the article;
   the article has a thickness from about 0.1 mil to about 4 mils; and
   the article has a dart drop impact test value from about 245 g to about 330 g per mil of thickness.

5. The article of claim 4 wherein the one of more starch-based polymeric materials comprise about 15% by weight to about 35% by weight of the article and the polyethylene comprises about 65% by weight to about 80% by weight of the article and the article has a thickness of about 0.8 mil to about 2 mils.

6. The article of claim 1 wherein the dart drop impact test value is at least about 230 g/mil of thickness.

7. The article of claim 1 wherein the starch-based polymeric material from which the article is formed has a crystallinity of less than about 15%.

8. The article of claim 1 wherein the starch-based polymeric material from which the article is formed has a crystallinity of less than about 10%.

9. The article of claim 1 wherein the starch-based polymeric material from which the article is formed has a water content of about 0.4% to about 1.5% by weight.

10. The article of claim 1 wherein the starch-based polymeric material from which the article is formed has a water content of less than about 1.5% by weight.

11. The article of claim 1 wherein when formed into a film of 1 mil of thickness has a tensile strength at break in the machine direction of 3.5 kpsi to about 5.5 kpsi, a tensile strength at break in the transverse direction of 3.2 kpsi to about 5.7 kpsi, an elongation at break in the machine direction of about 550 to about 750% and an elongation at break in the transverse direction of about 575% to about 775%.

12. The article of claim 1, wherein the the article consists essentially of the starch-based polymeric material, the polyethylene, and optionally a compatibilizer.

13. The article of claim 12, wherein polymeric content of the article consists of the starch-based polymeric material, the polyethylene, and optionally a compatibilizer.

14. The article of claim 1 wherein the article includes from about 60% to about 90% by weight of the polyethylene, wherein the article has a dart drop impact test value from 140 g to about 425 g, an elongation at break in the machine direction of at least 610° %, an elongation at break in the transverse direction of at least 630%, a tensile strength at break in the machine direction from 3.5 kpsi to about 5.5 kpsi, and a tensile strength at break in the transverse direction of 3.2 kpsi to about 5.7 kpsi.

15. The article of claim 1 wherein the blend of one or more starch-based polymeric materials and the polyethylene includes 20-30% by weight of the starch-based polymeric material, and exhibits the 20% or greater increase in dart drop impact over the full range of 20% to 30% by weight of the starch-based polymeric material.

16. The article of claim 1 wherein the blend of the one or more starch-based polymeric materials and the polyethylene exhibits an increase in tensile strength as compared to the polyethylene substantially free of the starch-based polymeric material.

17. An article consisting essentially of: from about 20% to 35% by weight of one or more starch-based polymeric materials formed from a starch and a plasticizer; and
  at least 55% by weight of polyethylene;
  wherein the blend of the one or more starch-based polymeric materials and the polyethylene, when formed into a film of 1 mil thickness has a dart drop impact test value of at least 20% greater than a film of the same thickness formed from the polyethylene substantially free of the starch based polymeric material, the 20% or greater increase in dart drop impact being exhibited over the full range of about 200% to 35% by weight of the starch-based polymeric material;
  wherein the starch-based polymeric material has a crystallinity of less than about 20%, and resists recrystallization, a water content of no more than about 2%, and the starch-based polymeric material and polyethylene exhibit a lack of sea-island features when blended together to form the article.

* * * * *